United States Patent
Calvillo et al.

(10) Patent No.: US 10,599,313 B2
(45) Date of Patent: Mar. 24, 2020

(54) SYSTEM FOR HIGH VOLUME DATA ANALYTIC INTEGRATION AND CHANNEL-INDEPENDENT ADVERTISEMENT GENERATION

(71) Applicant: Nanigans, Inc., Boston, MA (US)

(72) Inventors: Ric Calvillo, Chestnut Hill, MA (US); Claude Denton, Lexington, MA (US); Joshua Allen Breckman, Arlington, MA (US); Per Anders Sandell, Boston, MA (US); Derek J. Yimoyines, Winchester, MA (US); Amit Deepak Adur, Chino Hills, CA (US); Christopher Connors, Cambridge, MA (US); Jonathan Palmer, Belmont, MA (US)

(73) Assignee: Nanigans, Inc., Boston, MA (US)

( * ) Notice: Subject to any disclaimer, the term of this patent is extended or adjusted under 35 U.S.C. 154(b) by 116 days.

(21) Appl. No.: 15/290,946

(22) Filed: Oct. 11, 2016

(65) Prior Publication Data
US 2017/0102866 A1  Apr. 13, 2017
US 2017/0262165 A9  Sep. 14, 2017

Related U.S. Application Data

(63) Continuation-in-part of application No. 15/243,680, filed on Aug. 22, 2016, now abandoned, which is a
(Continued)

(51) Int. Cl.
*G06F 3/0484* (2013.01)
*G06Q 30/02* (2012.01)
(Continued)

(52) U.S. Cl.
CPC ........ *G06F 3/04847* (2013.01); *G06F 3/0481* (2013.01); *G06F 3/0485* (2013.01);
(Continued)

(58) Field of Classification Search
CPC ................. G06F 3/0487; G06F 3/0485; G06F 17/30554; G06Q 30/0251; G06Q 30/0277; G06Q 50/01
See application file for complete search history.

(56) References Cited

U.S. PATENT DOCUMENTS 8,402,361 B2 * 3/2013 Goldberg .............. G06F 17/245
715/200
9,619,531 B2   4/2017 Wu
(Continued)

*Primary Examiner* — Keith D Bloomquist
(74) *Attorney, Agent, or Firm* — Wolf, Greenfield & Sacks, P.C.

(57) ABSTRACT

A system and user interface capable of effectively manipulating high volumes of data is provided. The system and/or user interface is specially-configured to aggregate large data volumes and translate the large data volumes into summary information associated with navigable categorizations (e.g., categorizations linked to selectable visualizations in the user interface) that enable dynamic selection and visualization of portions of the large data volumes. In one particular example, the system and/or user interface is adapted to generate selectable panels having a plurality of build or editing tools displayed coextensive with portions of the large volumes of data. Such panels may be particularly useful for generating a placement (e.g., an advertisement) while reviewing or managing large amounts of information, such as ad placement and performance information for hundreds or thousands or advertisements.

20 Claims, 83 Drawing Sheets

Related U.S. Application Data continuation-in-part of application No. 15/206,581, filed on Jul. 11, 2016, now abandoned, which is a continuation-in-part of application No. 15/166,815, filed on May 27, 2016, now Pat. No. 10,410,258, said application No. 15/206,581 is a continuation-in-part of application No. 15/166,852, filed on May 27, 2016, now abandoned, said application No. 15/243,680 is a continuation-in-part of application No. 15/166,815, filed on May 27, 2016, now Pat. No. 10,410,258, and a continuation-in-part of application No. 15/166,852, filed on May 27, 2016, now abandoned, application No. 15/290,946, which is a continuation-in-part of application No. 15/206,581, filed on Jul. 11, 2016, now abandoned, and a continuation-in-part of application No. 15/166,815, filed on May 27, 2016, now Pat. No. 10,410,258, and a continuation-in-part of application No. 15/166,852, filed on May 27, 2016, now abandoned.

(60) Provisional application No. 62/239,145, filed on Oct. 8, 2015, provisional application No. 62/208,241, filed on Aug. 21, 2015, provisional application No. 62/190,451, filed on Jul. 9, 2015, provisional application No. 62/168,303, filed on May 29, 2015.

(51) Int. Cl.
| | |
|---|---|
| *G06F 16/248* | (2019.01) |
| *G06F 16/28* | (2019.01) |
| *G06F 16/9535* | (2019.01) |
| *G06F 16/958* | (2019.01) |
| *G06F 3/0481* | (2013.01) |
| *G06F 3/0485* | (2013.01) |
| *G06Q 50/00* | (2012.01) |

(52) U.S. Cl.
CPC .......... *G06F 16/248* (2019.01); *G06F 16/285* (2019.01); *G06F 16/958* (2019.01); *G06F 16/9535* (2019.01); *G06Q 30/0242* (2013.01); *G06Q 30/0244* (2013.01); *G06Q 30/0251* (2013.01); *G06Q 30/0276* (2013.01); *G06Q 30/0277* (2013.01); *G06Q 50/01* (2013.01); *G06F 3/04842* (2013.01); *G06F 2203/04803* (2013.01)

(56) References Cited

U.S. PATENT DOCUMENTS

| | | | |
|---|---|---|---|
| 9,898,753 | B2 | 2/2018 | Lara et al. |
| 2003/0070167 | A1* | 4/2003 | Holtz ............... G06Q 30/02 705/14.61 |
| 2005/0234960 | A1 | 10/2005 | Chickering et al. |
| 2007/0027758 | A1* | 2/2007 | Collins ............ G06F 17/2785 705/14.53 |
| 2008/0270164 | A1 | 10/2008 | Kidder et al. |
| 2010/0205521 | A1* | 8/2010 | Folting ............ G06F 17/246 715/227 |
| 2010/0251128 | A1 | 9/2010 | Cordasco |
| 2013/0332387 | A1 | 12/2013 | Mirra et al. |
| 2014/0019842 | A1 | 1/2014 | Montagna et al. |
| 2014/0073420 | A1 | 3/2014 | Matthew |
| 2014/0289036 | A1 | 9/2014 | Aurigemma |
| 2015/0095145 | A1 | 4/2015 | Shulman et al. |
| 2015/0186945 | A1 | 7/2015 | Samuel et al. |
| 2015/0213109 | A1 | 7/2015 | Kassko et al. |
| 2015/0242867 | A1 | 8/2015 | Prendergast et al. |
| 2015/0370433 | A1 | 12/2015 | Lam et al. |
| 2015/0379584 | A1 | 12/2015 | Trachtenberg et al. |
| 2016/0078005 | A1 | 3/2016 | Soos |
| 2016/0364093 | A1 | 12/2016 | Denton et al. |
| 2016/0364770 | A1 | 12/2016 | Denton et al. |
| 2016/0364772 | A1 | 12/2016 | Denton et al. |
| 2017/0011418 | A1 | 1/2017 | Denton et al. |
| 2017/0052652 | A1 | 2/2017 | Denton et al. |
| 2018/0005274 | A1 | 1/2018 | Calvillo et al. |

* cited by examiner

FIG. 2 nanigans

Nanigans Marketing  Multi-Channel

Ad List ▶

All ads, and placements were live today, where ad is 8099 selected values.   clear filters — 304

Summary — 308

| Ad | Audience | Context | Creative | Date Created Ad | Strategy Group |
|---|---|---|---|---|---|
| ○ Test_jon | jon_test | 0506 Test Context 3 | 0506 Creative Test 11 | Sep 12, 2015 | ○ Test_twitter_jon |
| ○ IG_SGTest2 1 | IG_SGTest | Insta Context | IG_SGTest 1 | Sep 17, 2015 | ○ IG Test |
| ○ Testing | Expedia Test | Insta Context | IG Launch 8.27.15 | Sep 17, 2015 | ○ IG Test |
| ○ TEST | Sportsbet Demo | SportsbetInstagramContex | Pat Demo Phoco Ad | Sep 14, 2015 | ○ IG Test |
| ○ SB Ad 1 | Sportsbet 10-21 | 58 3 | 53 4 | Sep 14, 2015 | ○ IG Test |
| ○ SB Test | Sportsbet Demo | ... | ... | ... | ○ Sportsbet IG |
| ○ jana test 10 | 0527 smoke 12 | Timeline ios iphone 5 next | 0506 Creative Test 9 | Sep 10, 2015 | ☐ JT Twitter |
| ○ jana test 11 | 0527 smoke 15 | Timeline ios iphone 5 next | 0506 Creative Test 9 | Sep 10, 2015 | ☐ JT Twitter |

FIG. 4B nanigans

◁ nanigans marketing > Multi-Channel

MyAd [Modified ▼]

Placements that were live today

| Summary | | | | | | | |
|---|---|---|---|---|---|---|---|
| Strategy Group | Ad | Ad Acco... | Date Create Ad | Status Ad | Creative | Audience | Context |
| ○ mobile rtb | | | | | | | |
| ▽ ○ IG Test | ▽ Duplicate ad | Nanigan... | Sep 17, 2... | ▯ Paused | 308_250_image_val | Ducks and Goose | Context.3x |
| | △ IG-SGTest 1 | Nanigan... | Sep 17, 2... | △ Error | IG-SGTest 2 | Expedia Test | Insta Context |
| ○ Audience | | | | | | | |
| ▽ Expedia Test | | | | | | | |
| □ Date | | | | | | | |
| ☑ Sep 21, 2015 | | | | | | | |
| | ▯ Can i change a twe | Trida Ch... | Sep 16, 2... | ▯ Paused | ACSmoke Test 7.9 | 0506 Release Test Au | Test.ai_options_cont |
| | ▯ charmander.gif te | Trida Ch... | Sep 11, 2... | ○ Active | charmander | 0506 Release Test Au | 0506 Test Context |
| | ○ Hotel.com test 2 | Trida Ch... | Sep 11, 2... | ○ Active | hotel.com test | 0506 Release Test Au | 0506 Test Context |
| ▯▯ Can i change a Tweet? | | | | | | | |
| 7.15.15 Test | | | | | | | |
| 7.15.15 Test | | | | | | | |
| | ○ 8.27 Batch Test 10 | Trida Ch... | Aug 27, 2... | ○ Active | Batch Test 8/27/15 | Demo-3/11/15 | 0506 Test Context 2 |
| | ○ 8.27 Batch Test 10 | Trida Ch... | Aug 27, 2... | ○ Active | Batch Test 8/27/15 | Demo-3/11/15 2 | 0506 Test Context 2 |
| 7.15.15 Test | | | | | | | |
| 7.15.15 Test | | | | | | | |

FIG. 7A nanigans

◁ nanigans marketing > Multi-Channel

MyAd [Modified ▼]

Placements that were live today

| Summary | | | | | Date Create Status | | | | |
|---|---|---|---|---|---|---|---|---|---|
| | Strategy Group | Ad | Ad Acco... | | Ad | Ad | Creative | Audience | Context |
| ☐ | ▪ mobille rtb | | | | | | | | |
| ☐ | ○ IG Test | ▫Duplicate ad | Nanigan... | | Sep 17, 2... | ιι Paused | 308_250_image_va | Ducks and Goose | Context.3x |
| | | △IG-SGTest 1 | Nanigan... | | Sep 17, 2... | △ Error | IG-SGTest 2 | Expedia Test | Insta Context |
| ☑ | | ▫Can I change a Tweet? | Trida Ch... | | Sep 16, 2... | ιι Paused | ACSmoke Test_7.9 | 0506 Release Test Au | Test.ai_options_cont |
| | ○ Audience | | | | | | | | |
| | ☐ 0506 Release Test Audience | | | | | | | | |
| | ○ Date | | | | | | | | |
| | ☑ Sep 21, 2015 | | | | | | | | |
| ☐ | ▫ 7.15.15 Test | ▫charmander gif tes | Trida Ch... | | Sep 11, 2... | ○ Active | charmander | 0506 Release Test Au | 0506 Test Context |
| ☐ | ▫ 7.15.15 Test | ▫hotels.com test 2 | Trida Ch... | | Sep 11, 2... | ○ Active | hotels.com test | 0506 Release Test Au | 0506 Test Context |
| ☐ | ▫ Gic SG | ○AndrewMcPub Ad | Nanigan... | | Sep 12, 2... | ○ Active | 308_250_image_va | 0517 mcpub audience | 0510 Smoke Test Cor |
| ☐ | ▫ 7.15.15 Test | ○ 8.27 Batch Test 10 | Trida Ch... | | Aug 27, 2... | ○ Active | Batch Test 8/27/15 | Demo-3/11/15 | 0506 Test Context 2 |
| ☐ | ▫ 7.15.15 Test | ○ 8.27 Batch Test 10 | Trida Ch... | | Aug 27, 2... | ○ Active | Batch Test 8/27/15 | Demo-3/11/15 2 | 0506 Test Context 2 | nanigans

▢ nanigans marketing >Multi-Channel

MyAd [Modified ▾]

Placements that were live today

| ☐ Summary | | | | | | | | |
|---|---|---|---|---|---|---|---|---|
| | Strategy Group | Ad | Ad Acco... | Date Create Ad | Status Ad | Creative | Audience | Context |
| ○ | ▫mobille rtb | ▫Duplicate ad | Nanigan... | Sep 17, 2... | ▯Paused | 308_250_image_val | Ducks and Goose | Context.3x |
| ▶ | ○ IG Test | △IG-SGTest 1 | Nanigan... | Sep 17, 2... | △ Error | IG-SGTest 2 | Expedia Test | Insta Context |
| ☑ | ▫Can I change a Tweet? | ▫Can i change a twe | Trida Ch... | Sep 16, 2... | ▯Paused | ACSmoke Test 7.9 | 0506 Release Test Au | Test.ai_options_cont |
| ○ | ☐ 0506 Release Test Audience | | | | | | | |
| | ☐ Audience | | | | | | | |
| | ☐ Date | | | | | | | |
| | ☑ Sep 21, 2015 | | | | | | | |
| ☐ | ▯▯7.15.15 Test | ▫charmmander gif tes | Trida Ch... | Sep 11, 2... | ○ Active | charmmander | 0506 Release Test Au | 0506 Test Context |
| ☐ | ▯▯7.15.15 Test | ○hotels.com test 2 | Trida Ch... | Sep 11, 2... | ○ Active | hotels.com test | 0506 Release Test Au | 0506 Test Context |
| ☐ | ▯▯Gic SG | ▫AndrewMcPub Ad | Nanigan... | Sep 12, 2... | ○ Active | 308_250_image_val | 0517 mcpub audience | 0510 Smoke Test Cor |
| ☐ | ▯▯7.15.15 Test | ○8.27 Batch Test 10 | Trida Ch... | Aug 27, 2... | ○ Active | Batch Test 8/27/15 | Demo-3/11/15 | 0506 Test Context 2 |
| ☐ | ▯▯7.15.15 Test | ○8.27 Batch Test 10 | Trida Ch... | Aug 27, 2... | ○ Active | Batch Test 8/27/15 | Demo-3/11/15 2 | 0506 Test Context 2 |

*FIG. 8A*

New Twitter Audience — 931A

- 931 (overall dialog): 930
- Window: 500

Audience Name — 931B  
Enter a descriptive name for this audience

Audience Label — 931C  
Type to select or enter an audience label

Estimated Audience Reach  
51,288  
New Reach estimations assume all available contexts and an infinite bid. Learn More — 933

Primary Targeting Method  
Keyword — 931D

Keyword Groups — 931E  
This is the user's specified home location, not necessarily their current location

| football x | basketball x | baseball x | Broad Match |
| nike cleats x | new cleats x | baseball x | Exact Match |

○ Add keyword group   ○ Upload keyword list

Keyword Options — 931F

☑ Filter out keyword matches with negative sentiment  
☑ Automatically match searches on relevent trending topics  
☑ Add up to 50 additional keywords recommended by Twiotter

Gender — 931G  
☑ All   ☑ Male   ☑ Female   ☑ Unspecified

Country — 931H  
US x  Quebec x  Paris x

Age Ranges — 931I  
25 —— 34  
25                64+

Language — 931J  
English x

Custom List Exclusions — 931K        ○ Next Custom List  
All Purchaser's Lifetime x Save and build Ads with this Audience  
Save and create another Audience Cancel                                   Save Audience ▼ — 932

| | Ad | Ad Acco... | Date Create Ad | Status Ad | Creative | Audience | Context |
|---|---|---|---|---|---|---|---|
| Summary | | | | | | | |
| ○ Strategy Group | | | | | | | |
| □ mobile rtb | | | | | | | |
| ▽ ○ IG Test | △ Duplicate ad | Nanigan... | Sep 17, 2... | ıı Paused | 308_250_image_va/ | Ducks and Goose | Context.3x |
| ○ Audience | △ IG-SGTest 1 | Nanigan... | Sep 17, 2... | △ Error | IG-SGTest 2 | Expedia Test | Insta Context |
| ▽ ☑ Expedia Test | | | | | | | |
| □ Date | | | | | | | |
| ☑ Sep 21, 2015 | | | | | | | |
| □ ıı Can I change a Tweet? | □ Can I change a twe | Trida Ch... | Sep 16, 2... | ıı Paused | ACSmoke Test 7.9 | 0506 Release Test Au | Test.al options cont |
| □ 7.15.15 Test | ○ charmander.gif te | Trida Ch... | Sep 11, 2... | ○ Active | charmander | 0506 Release Test Au | 0506 Test Context |
| □ 7.15.15 Test | ○ Hotel.com test 2 | Trida Ch... | Sep 11, 2... | ○ Active | hotel.com test | 0506 Release Test Au | 0506 Test Context |
| □ 7.15.15 Test | ○ 8.27 Batch Test 10 | Trida Ch... | Aug 27, 2... | ○ Active | Batch Test 8/27/15 | Demo-3/11/15 | 0506 Test Context 2 |
| □ 7.15.15 Test | ○ 8.27 Batch Test 10 | Trida Ch... | Aug 27, 2... | ○ Active | Batch Test 8/27/15 | Demo-3/11/15 2 | 0506 Test Context 2 | nanigans

◁ nanigans marketing >Multi-Channel

MyAd [Modified ▼]

Placements that were live today

FIG. 10B nanigans

Nanigans Marketing   Multi-Channel

1200

1204

| ☐ Summary | | | | | | |
|---|---|---|---|---|---|---|
| ○ | ▼ Ad | Audience | Context | Creative | Date Created Ad | Strategy Group |
| ☐ ○ | 8.27 Batch Test 1832 | Coleen Test_v2 | 0506 Test Context | Batch Test - 8/27/157 | Aug 27, 2015 | ☐ 7.15.15 Test |
| ☐ ○ | 8.27 Batch Test 1833 | jan's test audience | 0506 Test Context | Batch Test - 8/27/157 | Aug 27, 2015 | ☐ 7.15.15 Test |
| ☐ ○ | 8.27 Batch Test 1834 | zw.test.aueId | 0506 Test Context | Batch Test - 8/27/157 | Aug 27, 2015 | ☐ 7.15.15 Test |
| ☐ ○ | 8.27 Batch Test 1835 | Tricia's Followers | 0506 Test Context | Batch Test - 8/27/157 | Aug 27, 2015 | ☐ 7.15.15 Test |
| ☐ ○ | 8.27 Batch Test 1836 | *AwOO'id/kjdwd | 0506 Test Context | Batch Test - 8/27/157 | Aug 27, 2015 | ☐ 7.15.15 Test |
| ☐ ○ | 8.27 Batch Test 1837 | Todds Keyword Audience | 0506 Test Context | Batch Test - 8/27/157 | Aug 27, 2015 | ☐ 7.15.15 Test |
| ☑ ○ | 8.27 Batch Test 1838 | CC_KW_GA | 0506 Test Context | Batch Test - 8/27/157 | Aug 27, 2015 | ☐ 7.15.15 Test |
| ☑ ○ | 8.27 Batch Test 1839 | CC_KW_GA2 | 0506 Test Context | Batch Test - 8/27/157 | Aug 27, 2015 | ☐ 7.15.15 Test |
| ☑ ○ | 8.27 Batch Test 184 | creating obnoxious tag nam | 0506 Test Context2 | Batch Test - 8/27/157 | Aug 27, 2015 | ☐ 7.15.15 Test |
| | 8.27 Batch Test 1840 | creating pizza keyword audience | 0506 Test Context | | | |
| | ... | ... | ... | ... | ... | ... |
| ☐ ○ | 8.27 Batch Test 1871 | 24JN15 Aud | 0506 Test Context | Batch Test - 8/27/157 | Aug 27, 2015 | ☐ 7.15.15 Test |
| ☐ ○ | 8.27 Batch Test 1872 | Test Audience for Grouping | 0506 Test Context | Batch Test - 8/27/157 | Aug 27, 2015 | ☐ 7.15.15 Test |

To Fig. 12B

FIG. 12A nanigans

◁ nanigans marketing > Multi-Channel

MyAd [Modified ▼]

Placements that were live today

| ☐ Summary | | | | | | | | |
|---|---|---|---|---|---|---|---|---|
| | | | | | Date Create | Status | | |
| ○ Strategy Group | Ad | | Ad Acco... | Ad | Ad | Creative | Audience | Context |
| ☐ mobile rtb | ☐ Duplicate ad | | Nanigan... | Sep 17, 2... | ıı Paused | 308_250_image_val | Ducks and Goose | Context.3x |
| ☑ ○ IG Test | ◁ IG-SGTest 1 | | Nanigan... | Sep 17, 2... | △ Error | IG-SGTest 2 | Expedia Test | Insta Context |
| ☐ ıı Can I change a Tweet? | ☐ Can I change a twe | | Trida Ch... | Sep 16, 2... | ıı Paused | ACSmoke Test_7.9 | 0506 Release Test Au | Test.ai_options_cont |
| ☐ ○ 7.15.15 Test | ○ charmander.gif.te | | Trida Ch... | Sep 11, 2... | ○ Active | charmander | 0506 Release Test Au | 0506 Test Context |
| ☐ ○ 7.15.15 Test | ○ Hotel.com test 2 | | Trida Ch... | Sep 11, 2... | ○ Active | hotel.com test | 0506 Release Test Au | 0506 Test Context |
| ... | ... | | | | | | | |
| ☐ ıı 7.15.15 Test | ○ 8.27 Batch Test 10 | | Trida Ch... | Aug 27, 2... | ○ Active | Batch Test 8/27/15 | Demo-3/11/15 | 0506 Test Context 2 |
| ☐ ıı 7.15.15 Test | ○ 8.27 Batch Test 10 | | Trida Ch... | Aug 27, 2... | ○ Active | Batch Test 8/27/15 | Demo-3/11/15 2 | 0506 Test Context 2 |

Table Selection

1 Strategy Group
- Edit
- Edit in New Tab
- Activate [0 Valid]
- Pause
- Clone  *1302*
- Delete 1 Ad
- Delete
- Un-delete [0 Valid]
- Rename
- Activate [0 Valid]
- Redeploy
- Change Strategy Group
- Manage tags [Tag]

daude@nanigans.com ▼

*1300*
*1304*

|| Chart ∨  □ Data ∨  ▼ Filters  □ Attributes  ıl Metrics  □ Today ∨

○ Planned Ads  8099  ▶      ○ Build Now  ▶

| Ad Co... | Audio... | Conte... |
|---|---|---|
| 263 | 92 | 28 |
| 1 | 1 | 1 |
| 1 | 1 | 1 |
| 1 | 1 | 1 |
| 1 | 1 | 1 |
| ••• | ••• | ••• |
| 1 | 1 | 1 |
| 1 | 1 | 1 |

From Fig. 13A

From Fig. 13A nanigans

◁ nanigans marketing › Multi-Channel

MyAd [Modified ▼]

Placements that were live today

| ☐ Summary | | | | | | | | |
|---|---|---|---|---|---|---|---|---|
| | Strategy Group | Ad | Ad Acco... | Date Create Ad | Status Ad | Creative | Audience | Context |
| ☐ | ▲ mobille nb | □ Duplicate ad | Nanigan... | Sep 17, 2... | □ Paused | 308_250_image_va | Ducks and Goose | Context.3x |
| ☐ | ○ IG Test | ◁ IG-SGTest 1 | Nanigan... | Sep 17, 2... | △ Error | IG-SGTest 2 | Expedia Test | Insta Context |
| ☑ | □ Can I change a Tweet? | □ Can I change a twe | Trida Ch... | Sep 16, 2... | □ Paused | ACSmoke Test 7.9 | 0506 Release Test Au | Test.ai_options_cont |
| | ☑ 0506 Release from Audience | | | | | | | |
| | ○ Audience | | | | | | | |
| | □ Date | | | | | | | |
| | ☑ Sep 21, 2015 | | | | | | | |

| ☐ | ▲ 7.15.15 Test | ○ charmander.gif te | Trida Ch... | Sep 11, 2... | ○ Active | charmander | | |
| ☐ | ▲ 7.15.15 Test | ○ Hotel.com test 2 | Trida Ch... | Sep 11, 2... | ○ Active | hotel.com test | | |

...

| ☐ | ▲ 7.15.15 Test | ○ 8.27 Batch Test 10 | Trida Ch... | Aug 27, 2... | ○ Active | Batch Test 8/27/15 | 0506 Release Test Au | 0506 Test Context |
| ☐ | ▲ 7.15.15 Test | ○ 8.27 Batch Test 10 | Trida Ch... | Aug 27, 2... | ○ Active | Batch Test 8/27/15 | 0506 Release Test Au | 0506 Test Context |

...

| | | | | | | 0506 Release Test Au | 0506 Test Context 2 |
| | | | | | | Demo-3/11/15 | 0506 Test Context 2 |
| | | | | | | Demo-3/11/15 2 | |

Table Selection

1 Placement Selected

Placement Status
|| Pause [0 Valid]
▲ Unpause
○ End
○ Redeploy
☐ Reevaluation
☐ Automate Bid
☐ Schedule
○ Clear Loss History Manual Bidding and Budgeting
○ Adjust Bid
○ Adjust Budget Campaign Management
○ Change Strategy Group
○ Clone daude@nanigans.com ▶ il Chart ˅  ☐ Data ˅  ▼ Filters  ☐ Attributes  il Metrics  ☐ 3/21/2015 to 8/21/2015 ˅

From Fig. 15A

From Fig. 15A

*FIG. 15B*

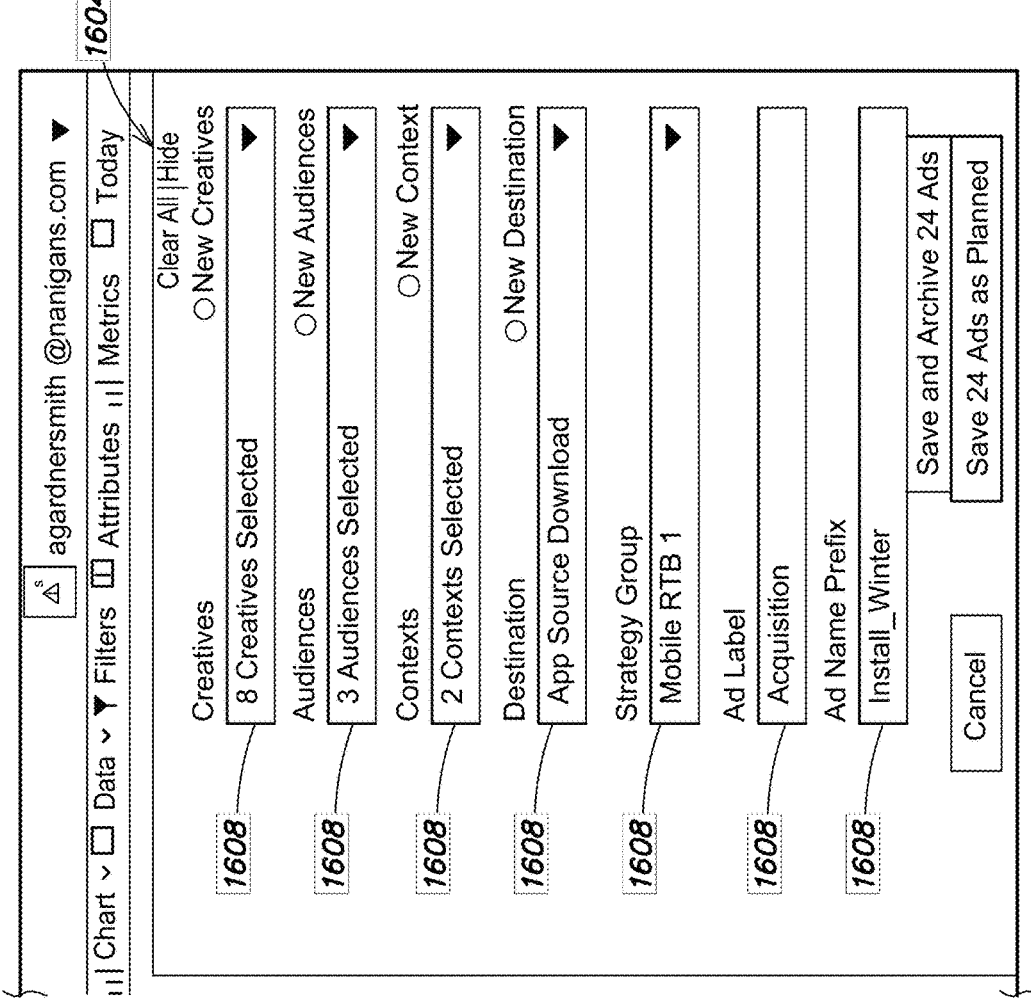
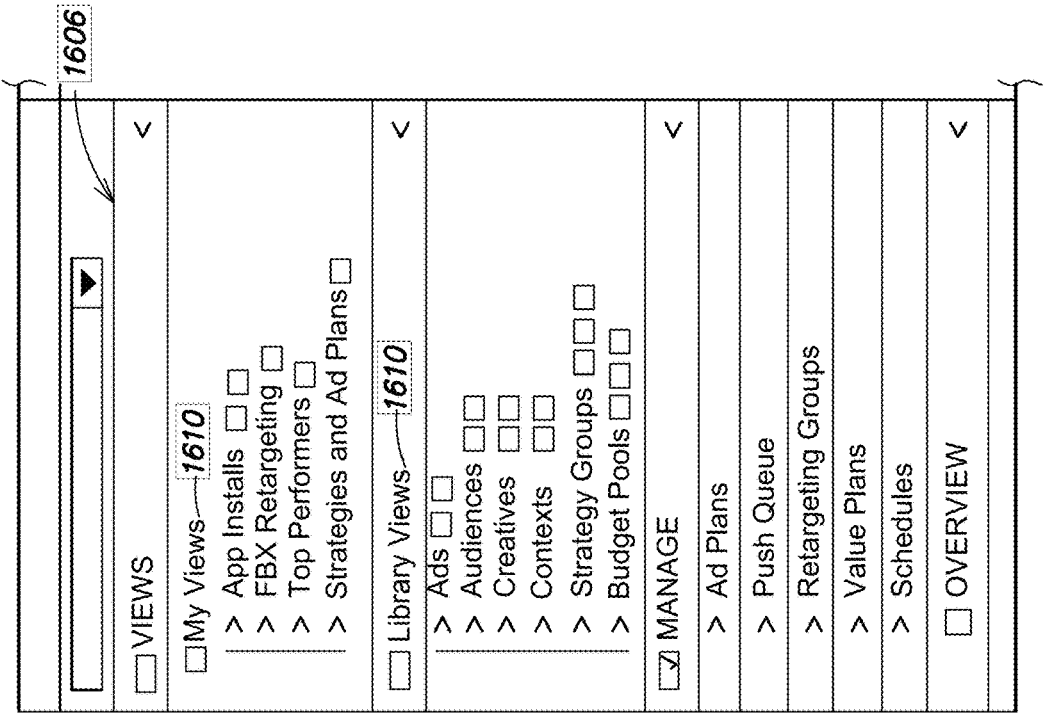
FIG. 16B
FIG. 16C

Ad Preview

□ AllModern

[Shop Now] ⌃ Like Page

AllModern: The Largest Selection of Modern Design Online.

Like Comment Share

View Ad Plan

⌂ Nanigans Object Heirarchy    ☐ Creative Details    ○ Targeting

○ Location: United States (US)
↳ Age 30-60
↳ Gender: Female, Male
↳ Custom Audiences: 4.14 LaS
↳ Advanced: Relationship Single

↙ 3702

Hierarchy nav

Advanced Targeting:
Relationship, Single

Country: US 16,000,000
Age: 25-35 8,000,000
Gender: Male, Female 7,000,000
Custom Audiences: 4.14 LaS 2,000,000
Relationship, Single 400,000

↙ 3700

Audience

FIG. 42 nanigans AdEngine ≡

AllModern    Performance Analysis

Placements ▶

Ads that were live today with fees

| Summary Placeme... | Placeme... | AI Stage | Image/Vid... | Ad Plan | Budget Pool | Strategy Gro... | Reach | Current ... | Current ... |
|---|---|---|---|---|---|---|---|---|---|
| 1802069009 | Active | 4 | | Gate Desk F... | Gateway [25] | Gate Desk Fe... | 880000 | $1.80 | CPC |
| | | | | Gate Desk F... | Gateway [25] | Gate Desk Fe... | 1520000 | $1.80 | CPC |
| | | | | Gate Desk F... | Gateway [25] | Gate Desk Fe... | 800000 | $1.80 | CPC |
| | | | | Gate Desk F... | Gateway [25] | Gate Desk Fe... | 1520000 | $1.80 | CPC |
| ... | | | | ... | | ... | | | |
| 1801112633 | 4 | | | Gate Desk F... | Gateway [25] | Gate Desk Fe... | 1020000 | $1.80 | CPC |

Overlay menu (2204):
- Placement Summary
- AI Logs
- Placement Performance
- Only show this Placement ID
- Exclude this Placement ID
- Add Filters

| Spend | Impressi... | Clicks | CTR | CPC | Effecti... | A1 (reg) | A2 (ad...) | CPA 1(... | CPA 2(... | AR1 (r... | AR2 (a... | Purch... | Yield R... | Revenue |
|---|---|---|---|---|---|---|---|---|---|---|---|---|---|---|
| $550.84 | 60,749 | 327 | 0.54% | $1.68 | $9.07 | 96 | 11 | $5.74 | $50.08 | 29.36% | 3.36% | 3 | 74.04% | $407.83 |
| $111.63 | 13,404 | 63 | 0.47% | $1.77 | $8.33 | 19 | 3 | $5.88 | $37.21 | 30.16% | 4.76% | 0 | 0.00% | $0.00 |
| $94.01 | 9,313 | 57 | 0.61% | $1.65 | $10.09 | 19 | 0 | $4.95 | $0.00 | 33.33% | 0.00% | 0 | 0.00% | $0.00 |
| $90.60 | 8,252 | 52 | 0.63% | $1.74 | $10.98 | 11 | 1 | $8.24 | $90.60 | 21.15% | 1.92% | 0 | 0.00% | $0.00 |
| ... | | | | | ... | | | | ... | | | | ... | |
| $4.28 | 647 | 3 | 0.46% | $1.43 | $6.62 | 0 | 0 | $0.00 | $0.00 | 0.00% | 0.00% | 0 | 0.00% | $0.00 |

*FIG. 43B* nanigans AdEngine ≡

AllModern   Performance Analysis

Placements ▶

Ads that were live today with fees

| Summary Placeme... | Placeme... | AI Stage | Image/Vid... | Ad Plan | Budget Pool | Strategy Gro... | Reach | Current ... | Current ... |
|---|---|---|---|---|---|---|---|---|---|
| 1802069009 | Active | 4 | | Gate Desk F... | Gateway [25] | Gate Desk Fe... | 880000 | $1.80 | CPC |
| 180265 | | | | | Gateway [25] | Gate Desk Fe... | 1520000 | $1.80 | CPC |
| 18021 | | | | | Gateway [25] | Gate Desk Fe... | 800000 | $1.80 | CPC |
| 1802165987 | Active | 4 | | Gate Desk F... | Gateway [25] | Gate Desk Fe... | 1520000 | $1.80 | CPC |
| ... | | | | ... | | ... | | | ... |
| 1801112633 | | | | Gate Desk F... | Gateway [25] | Gate Desk Fe... | 1020000 | $1.80 | CPC |

Popup menu:
- ⟲ View on Facebook
- ⟲ View on Facebook Ads Manager
- ▼ Only show this Image/Video (small)
- ✎ Exclude this Image/Video (small)
- ▼ Add Filters To Fig. 44B →     To Fig. 44B →

*FIG. 44A*

| Spend | Impressi... | Clicks | CTR | CPC | Effecti... | A1 (reg) | A2 (ad... | CPA 1 (... | CPA 2 (... | AR1 (r... | AR2 (a... | Purch... | Yield R... | Revenue |
|---|---|---|---|---|---|---|---|---|---|---|---|---|---|---|
| $550.84 | 60,749 | 327 | 0.54% | $1.68 | $9.07 | 96 | 11 | $5.74 | $50.08 | 29.36% | 3.36% | 3 | 74.04% | $407.83 |
| $111.63 | 13,404 | 63 | 0.47% | $1.77 | $8.33 | 19 | 3 | $5.88 | $37.21 | 30.16% | 4.76% | 0 | 0.09% | $0.00 |
| $94.01 | 9,313 | 57 | 0.61% | $1.65 | $10.09 | 19 | 0 | $4.95 | $0.00 | 33.33% | 0.00% | 0 | 0.00% | $0.00 |
| $90.60 | 8,252 | 52 | 0.63% | $1.74 | $10.98 | 11 | 1 | $8.24 | $90.60 | 21.15% | 1.92% | 0 | 0.00% | $0.00 |
| ... | | | | | ... | | | | ... | | | | ... | |
| $4.28 | 647 | 3 | 0.46% | $1.43 | $6.62 | 0 | 0 | $0.00 | 0.00% | 0.00% | 0.00% | 0 | 0.00% | $0.00 |

FIG. 46A nanigans AdEngine ≡

AllModern    Performance Analysis

Placements [Modified ▼]

Ads that were live today with fees

| Summary Placeme... | Placeme... | At Stage | Image/Vid... | Ad Plan | Budget Pool | Strategy Gro... | Reach | Current ... | Current ... |
|---|---|---|---|---|---|---|---|---|---|
| 1802069009 | Active | 4 | | Gate Desk F... | Gateway [25] | Gate Desk Fe... | 880000 | $1.80 | CPC |
| Ad Preview AllModern | Like Page | | Creative Details | | | Placement Attributes | | | |
| | | | Ad Type: Unpublished Page Post (Link) Destination Name: Denny Designs to BBB ◯ Creative Ad Set: 5333 Creative Group: Jonathon Adler View on Facebook View on Facebook Ads Manager | | | Date Created: April 15, 2014 Date Ended: Bid Type: CPC Current Bid: $1.80 FB ad account set budget: $810.40 FB ad account daily budget: $500,000.00 Credit: $0.00 | | | |
| 1801933387 | Active | 4 | | Gate Desk F... | Gateway [25] | Gate Desk Fe... | 1120000 | $1.80 | CPC |
| ••• | | | | | | option showing more prominent column headers similar to this | | | |
| 1802068993 | Active | 4 | | Gate Desk F... | Gateway [25] | | | | |

| Spend | Impressi... | Clicks | CTR | CPC | Effecti... | A1 (reg) | A2 (ad... | CPA 1(... | CPA2(... | AR1 (r... | AR2 (a... | Purch... | Yield R... | Revenue |
|---|---|---|---|---|---|---|---|---|---|---|---|---|---|---|
| $550.84 | 60,749 | 327 | 0.54% | $1.68 | $9.07 | 96 | 11 | $5.74 | $50.08 | 29.36% | 3.36% | 3 | 74.04% | $407.83 |
| | Placement Structure & Status | | | | | Targeting | | | | | | | | |
| | AI Stage: 4 | | | | | Age: 30-64 | | | | | | | | |
| | Budget Post Gateway 25 | | | | | Location: US | | | | | | | | |
| | Strategy Group: Gate Desk Feed CPC (DLX) Min CPA) | | | | | Gender: Male | | | | | | | | |
| | Strategy Group Status: Active | | | | | Delivery Location: Desktop News Feed | | | | | | | | |
| | Ad Plan: Gate Desk Feed | | | | | Custom Audience: 4.14 LaS | | | | | | | | |
| | FB ad account: fbadvertising@allmodern.com | | | | | Inventory Source: FB | | | | | | | | |
| | FB Campaign ID: 6019477153 | | | | | Connections Group: Exclude AM FB [38176] | | | | | | | | |
| | FB ad set Name: Nanigans_185_487749_AdSet | | | | | Product Category: 0 | | | | | | | | |
| | FB ad set Status: Active | | | | | Reach: 240,000 | | | | | | | | |
| | FB Ad Set ID: 6019447727353 | | | | | Demo Set ID: 27504 | | | | | | | | |
| | more | | | | | | | | | | | | | |
| $0.89 | 780 | 4 | 0.51% | $1.72 | $8.84 | 2 | 0 | $3.45 | $0.00 | 0.00% | 0.00% | 0 | 0.00% | $0.00 |
| $94.01 | 9,315 | 57 | 0.61% | $1.65 | $10.09 | 19 | 0 | $4.95 | $0.00 | 33.33% | 0.00% | 0 | 0.00% | $0.00 |
| ... | | | | | | | | ... | | | | | ... | |
| $7.58 | 1,121 | 4 | 0.36% | $1.89 | $6.76 | 3 | 0 | $2.53 | | 75.00% | 0.00% | 0 | 0.00% | $0.00 |

FIG. 46B nanigans AdEngine

AllModern   Performance Analysis

Placements  [Modified ▼]

Ads that were live today with fees

| Summary Placeme... | Placeme... | AI Stage | Image/Vid... | Ad Plan | Budget Pool | Strategy Gro... | Reach | Current ... | Current ... |
|---|---|---|---|---|---|---|---|---|---|
| 1802069009 Active | | 4 | | Gate Desk F... | Gateway [25] *4702* | Gate Desk Fe... | 880000 | $1.80 | CPC *4704* |
| Ad Preview AllModern | Like Page | | | Creative Details<br>Placement Attributes<br>Placement Structure & Status ›<br>Targeting<br>View on Facebook<br>View on Facebook Ads Manager<br>View AI Logs | | AI Stage: 4<br>Budget Post Gateway 25<br>Strategy Group: Gate Desk Feed CPC (DLX) Min CPA)<br>Strategy Group Status: Active<br>Ad Plan: Gate Desk Feed<br>FB ad account: fbadvertising@allmodern.com<br>FB Campaign ID: 6019447/153<br>FB ad set Name: Nanigans_185_487449_AdSet<br>FB ad set Status: Active<br>FB Ad Set ID: 6019447727353<br>FB Assigned ID: 6019447840153 | | | |
| 1801933387 Active | | 4 | | Gate Desk F... | Gateway [25] | Gate Desk Fe... | 1120000 | $1.80 | CPC |
| 1801112633 Active | | 4 | | Gate Desk F... | Gateway [25] | Gate Desk Fe... | 1020... | | |

Option showing side tabs to show less information at once

| Spend | Impressi... | Clicks | CTR | CPC | Effecti... | A1 (reg) | A2 (ad... | CPA 1(... | CPA 2(... | AR1 (r... | AR2 (a... | Purch... | Yield R... | Revenue |
|---|---|---|---|---|---|---|---|---|---|---|---|---|---|---|
| $550.84 | 60,749 | 327 | 0.54% | $1.68 | $9.07 | 96 | 11 | $5.74 | $50.08 | 29.36% | 3.36% | 3 | 74.04% | $407.83 |
| $111.63 | 13,404 | 53 | 0.47% | $1.77 | $8.83 | 19 | 3 | $5.88 | $37.21 | 30.16% | 3.36% | 0 | 0.00% | $0.00 |

View old Placement Details

| $0.89 | 780 | 4 | 0.51% | $1.72 | $8.84 | 2 | 0 | $3.45 | $0.00 | 0.00% | 0.00% | 0 | 0.00% | $0.00 |
| $94.01 | 9,315 | 57 | 0.61% | $1.65 | $10.09 | 19 | 0 | $4.95 | $0.00 | 33.33% | 0.00% | 0 | 0.00% | $0.00 |
| ••• | ••• | | | | ••• | | | ••• | ••• | | | | | ••• |
| $7.58 | 1,121 | 4 | 0.36% | $1.89 | $6.76 | 3 | 0 | $2.53 | $0.00 | 75.00% | 0.00% | 0 | 0.00% | $0.00 |

*FIG. 47B*

| Spend | Impressi... | Clicks | CTR | CPC | Effecti... | A1 (reg) | A2 (ad... | CPA 1 (... | CPA 2 (... | AR1 (r... | AR2 (a... |
|---|---|---|---|---|---|---|---|---|---|---|---|
| $457.91 | 53,127 | 368 | 0.69% | $1.24 | $8.62 | 105 | | $4.36 | $91.58 | 28.53% | 1.36% |
| $57.96 | 3,828 | 57 | 0.57% | $1.57 | $15.14 | 7 | | $8.28 | $0.00 | 18.92% | 0.00% |

Placement Structure & Status

AI Stage: 4
Budget Post Gateway: 25
Strategy Group: Gate Desk Feed CPC (DLX) Min CPA)
Strategy Group Status: Active
Ad Plan: Gate Desk Feed
FB ad account: fbadvertising@allmodern.com
FB Campaign ID: 6019447727153
FB ad set Name: Nanigans_185_487749_AdSet
FB ad set Status: Active
FB Ad Set ID: 6019447727353
FB Assigned ID: 6019447846153
more Targeting Age: 30-64
Location: US
Gender: Male
Delivery Location: Desktop News Feed
Custom Audience: 4.14 LaS
Inventory Source: FB
Connection Group: Exclude AM FB [38176]
Product Category: 0
Reach: 240,000
Demo Set ID: 27504

| $54.80 | 6,626 | 32 | 0.48% | $1.72 | $8.48 | 13 | 1 | $4.22 | $54.89 | 40.63% | 3.13% |
| $36.16 | 4,501 | 36 | 0.80% | $1.06 | $8.48 | 10 | 0 | $3.82 | $0.00 | 27.78% | 0.00% |

| Spend | Impressi... | Clicks | CTR | CPC | Effecti... | A1 (reg) | A2 (ad... | CPA 1 (... | CPA 2 (... | AR1 (r... | AR2 (a... |
|---|---|---|---|---|---|---|---|---|---|---|---|
| $457.91 | 53,127 | 368 | 0.69% | $1.24 | $8.62 | 105 | | $4.36 | $91.58 | 28.53% | 1.36% |
| $57.96 | 3,828 | 57 | 0.57% | $1.57 | $15.14 | 7 | | $8.28 | $0.00 | 18.92% | 0.00% |

Placement Structure & Status

AI Stage: 4
Budget Post Gateway: 25
Strategy Group: Gate Desk Feed CPC (DLX) Min CPA)
Strategy Group Status: Active
Ad Plan: Gate Desk Feed
FB ad account: fbadvertising@allmodern.com
FB Campaign ID: 6019447727153
FB ad set Name: Nanigans_185_487749_AdSet
FB ad set Status: Active
FB Ad Set ID: 6019447727353
FB Assigned ID: 6019447846153
more Targeting Age: 30-64
Location: US
Gender: Male
Delivery Location: Desktop News Feed
Custom Audience: 4.14 LaS
Inventory Source: FB
Connection Group: Exclude AM FB [38176]
Product Category: 0
Reach: 240,000
Demo Set ID: 27504

| | | | | | | | | | | | |
|---|---|---|---|---|---|---|---|---|---|---|---|
| $0.00 | 50 | 0 | 0.00% | $0.00 | $0.00 | 0 | | $0.00 | $0.00 | 0.00% | 0.00% |
| $0.00 | 0 | 0 | 0.00% | $0.00 | $0.00 | 0 | | $0.00 | $0.00 | 0.00% | 0.00% |
| $0.00 | 0 | 0 | 0.00% | $0.00 | $0.00 | 0 | | $0.00 | $0.00 | 0.00% | 0.00% |

AllModern Performance Analysis

Placement 1801287552 ▶

Ads that were live today with fees, where Placement ID is 1802060009 clear filters

| | ::: Data ∨ | ▼ Filters | ☐ Attributes | ,ıl Metrics | ☐ Today |

Ad Preview
AllModern Like Page

Creative Details
Ad Type: Unpublished Page Post (Link)
Destination Name: Denny Designs to BBB ○, View on facebook
View on Facebook Ads Manager
View al Logs
View ad Placement Details

Placement Attributes
Date Created: April 15, 2014
Date Ended:
Credit: $0.00
Bid Type: CPC
Current Bid: $1.80
FB ad account set budget: $810.40
FB ad account daily budget: $500,000.00

Placement Structure & Status
AI Stage: 4
Budget Post Gateway: 25
Strategy Group: Gate Desk Feed CPC (DLX) Min CPA)
Strategy Group Status: Active
Ad Plan: Gate Desk Feed
FB ad account: fbadvertising@allmodern.com
FB Campaign ID: 6019477153
FB ad set Name: Nanigans_185_487749_AdSet
FB ad set Status: Active
FB Ad Set ID: 6019447727353
FB Assigned ID: 6019447846153

Targeting
Age: 30-64
Location: US
Gender: Male
Delivery Location: Desktop News Feed
Custom Audience: 4.14 LaS
Inventory Source: FB
Connection Group: Exclude AM FB [38176]
Product Category: 0
Reach: 240,000
Demo Set ID: 27504

5200

View: Impressions ∨ [×]

*FIG. 52A*

SYSTEM FOR HIGH VOLUME DATA ANALYTIC INTEGRATION AND CHANNEL-INDEPENDENT ADVERTISEMENT GENERATION

RELATED APPLICATIONS

This application is a continuation-in-part of and claims priority under § 120 to: U.S. patent application Ser. Nos. 15/243,680, entitled "SYSTEM FOR HIGH VOLUME DATA ANALYTICS AND DATA INGESTION," filed on Aug. 22, 2016, and 15/206,581, entitled "SYSTEM AND METHOD FOR ACCOUNT INGESTION," filed on Jul. 11, 2016, and 15/166,815, entitled "GRAPHICAL USER INTERFACE FOR HIGH VOLUME DATA ANALYTICS," filed on May 27, 2016, and Ser. No. 15/166,852, entitled "SYSTEM FOR HIGH VOLUME DATA ANALYTIC INTEGRATION AND CHANNEL-INDEPENDENT ADVERTISEMENT GENERATION," filed on May 27, 2016; and this application also claims priority under 35 U.S.C. §119(e) to U.S. Provisional Application Serial No. 62/239,145 entitled "SYSTEM FOR HIGH VOLUME DATA ANALYTIC INTEGRATION AND CHANNEL-INDEPENDENT ADVERTISEMENT GENERATION," filed on Oct. 8, 2015.

U.S. patent application Ser. No. 15/243,680, entitled "SYSTEM FOR HIGH VOLUME DATA ANALYTICS AND DATA INGESTION," filed on Aug. 22, 2016, is a continuation-in-part of and claims priority under § 120 to U.S. patent application Ser. No. 15/206,581, entitled "SYSTEM AND METHOD FOR ACCOUNT INGESTION," filed Jul. 11, 2016, which is a continuation-in-part of U.S. patent application Ser. Nos. 15/166,815, entitled "GRAPHICAL USER INTERFACE FOR HIGH VOLUME DATA ANALYTICS," filed on May 27, 2016, and 15/166,852, entitled "SYSTEM FOR HIGH VOLUME DATA ANALYTIC INTEGRATION AND CHANNEL-INDEPENDENT ADVERTISEMENT GENERATION," filed on May 27, 2016; each of which application Ser. Nos. 15/166,815 and 15/166,852 claims priority under 35 U.S.C. § 119(e) to U.S. Provisional Application Ser. No. 62/168,303 entitled "GRAPHICAL USER INTERFACE FOR HIGH VOLUME DATA ANALYTICS," filed on May 29, 2015, U.S. Provisional Application Ser. No. 62/190,451 entitled "SYSTEM AND METHOD FOR ACCOUNT INGESTION," filed on Jul. 9, 2015, U.S. Provisional Application Ser. No. 62/208,241 entitled "SYSTEM FOR HIGH VOLUME DATA ANALYTICS AND DATA INGESTION," filed on Aug. 21, 2015, and U.S. Provisional Application Ser. No. 62/239,145 entitled "SYSTEM FOR HIGH VOLUME DATA ANALYTIC INTEGRATION AND CHANNEL-INDEPENDENT ADVERTISEMENT GENERATION," filed on Oct. 8, 2015. U.S. patent application Ser. No. 15/206,581, entitled "SYSTEM AND METHOD FOR ACCOUNT INGESTION," filed on Jul. 11, 2016 claims priority under 35 U.S.C. § 119(e) to U.S. Provisional Application Ser. No. 62/190,451 entitled "SYSTEM AND METHOD FOR ACCOUNT INGESTION," filed on Jul. 9, 2015, U.S. Provisional Application Ser. No. 62/208,241 entitled "SYSTEM FOR HIGH VOLUME DATA ANALYTICS AND DATA INGESTION," filed on Aug. 21, 2015, and U.S. Provisional Application Ser. No. 62/239,145 entitled "SYSTEM FOR HIGH VOLUME DATA ANALYTIC INTEGRATION AND CHANNEL-INDEPENDENT ADVERTISEMENT GENERATION," filed on Oct. 8, 2015. U.S. patent application Ser. No. 15/243,680, entitled "SYSTEM FOR HIGH VOLUME DATA ANALYTICS AND DATA INGESTION," filed Aug. 22, 2016, is a continuation-in-part of and claims priority under § 120 to U.S. Patent Application Serial Nos.: 15/166,815, entitled "GRAPHICAL USER INTERFACE FOR HIGH VOLUME DATA ANALYTICS," filed on May 27, 2016, and 15/166,852, entitled "SYSTEM FOR HIGH VOLUME DATA ANALYTIC INTEGRATION AND CHANNEL-INDEPENDENT ADVERTISEMENT GENERATION," filed on May 27, 2016; and also claims priority to Provisional Application Ser. No. 62/208,241 entitled "SYSTEM FOR HIGH VOLUME DATA ANALYTICS AND DATA INGESTION," filed on Aug. 21, 2015, and U.S. Provisional Application Ser. No. 62/239,145 entitled "SYSTEM FOR HIGH VOLUME DATA ANALYTIC INTEGRATION AND CHANNEL-INDEPENDENT ADVERTISEMENT GENERATION," filed on Oct. 8, 2015.

All of the above identified applications are incorporated herein by reference in their entirety.

BACKGROUND

Conventional systems provide some features to manage large numbers of placements (e.g., advertisements) and further provide for management of those placements over a number of delivery channels. Some drawbacks to existing systems include the inability to effectively manage and access high data volumes associated with large numbers of active placements. Further difficulties are presented when the active placements cross delivery channels (e.g., social media networks, blogs, live feeds, service sites, etc.). Often, the end user suffers from these difficulties and can be overwhelmed by the volume of information and the inability to drill into relevant information while preserving context.

SUMMARY

According to various aspects of the present invention, a system and user interface capable of effectively manipulating high volumes of data is provided. The system and/or user interface is specially-configured to aggregate large data volumes and translate the large data volumes into summary information including navigable categorizations (e.g., categorizations linked to selectable visualizations in the user interface) that enable dynamic selection and visualization of portions of the large data volumes. In one example, the system and/or user interface is adapted to generate selectable panels having a plurality of build or editing tools displayed coextensive with portions of the large volumes of data. Such panels may be particularly useful for generating a placement (e.g., an advertisement) while reviewing or managing large amounts of information, such as ad placement and performance information for hundreds or thousands or advertisements.

According to one embodiment, the plurality of build and/or editing tools are configured in the user interface to be accessible co-extensive with visualizations of the large data volumes (including, for example, performance information and grouping information for thousands of placements). In some implementations a build panel interface provides access to the build and/or editing tools that is displayed in conjunction with the large data volumes shown a main display. The user interface generates the build panel to include continuous state monitoring and updating. In one example, the continuous state monitoring and updating includes, persistence of any selection with in the large data volumes. For example, selection of an placement in a main portion of the display is configured to capture associated information for the placement, and populate the associated information as selections in the build panel for creating new placements.

According to one embodiment, the user interface is configured to constantly monitor selections in the main body of the display, so information from any number of placements can be captured and persisted through a series of build tools shown in the build panel. In further embodiments, additional selections in the main body of the display trigger updates in information throughout a series of build tools shown in the build panel. In another embodiment, each of the build tools can be displayed as its own element or sub-display in the build panel. The system can be configured to enable user navigation through the elements or sub-displays as a sequence to build new placements. Further, the system enables selection of the elements or sub-displays out of order, and enables re-visiting of any element or sub-display, all without leaving the context provided via the main body of the display. Providing real time access to users to constantly updating information on any number of placements while enabling construction of new placements significantly improves the execution efficiency of the underlying system. Rather than forcing the user to navigate through numbers of different displays to simply access relevant information, the novel user interface not only enables access but reduces computer operations necessary to capture the same information and to utilize that information in build environments. In some embodiments, the user interface manages constantly updating information obtained on large volumes of placements, and enables transitions to and between management displays and management functions while preserving contextual information relevant to the management displays and management functions. In some embodiments, the transitions between views and/or the introduction of management function displays are configured to automatically resize currently visualized metrics and selectively obscure other metrics to transition management functional visualizations into the current display.

It is appreciated that in conventional systems for developing placements (e.g., advertisements), there is often a lag and disconnect between the system for analyzing success or failure advertisements (e.g., those placed on the Internet and in on-line applications (e.g., FACEBOOK)), and using such information for creating new advertisements. Such conventional analysis processes are generally manual ones involving a great amount of time and effort as there is often no link between the systems that permit users to view the performance of existing advertisements and the systems used to create new advertisements.

According to various aspects, a system and associated user interfaces are provided that permit a user to more easily analyze the performance of existing placements (e.g., advertisements) and use such information to improve the chances of success for new placements. According to further aspects, a system is provided that permits high data volume visualization (e.g., 50K, 60K, 70K, 80K, 90K, 100K, 110K+ rows of individual ad placement instances and data in a table), such as advertising data. In at least one embodiment, the system includes at least one processor operatively connected to a memory, the at least one processor when executing, is configured to manage display of high data volumes in a user interface, generate a user interface ("UI") configured to dynamically generate a visual display of high data volumes, the data including advertising data corresponding to at least a first advertisement, responsive to selection within the visual display of the advertising data of a build function, capturing constituent elements of one or more placements (e.g., advertisements that are shown), wherein the constituent elements of the one or more placements include at least a creative parameter, an audience parameter, and a context parameter, and maintain the visual display of the high data volumes, including persisting display of the advertising data and automatically generating a build panel including one or more selectable build tools corresponding to generation of at least a second advertisement.

In one embodiment, the UI component is adapted to automatically generate and visualize the build panel responsive to activation of a build indicator included in the visual display of the high data volumes, wherein a main body of the visual display of high data volumes resizes responsive to visualization of the build panel. According to an embodiment, the UI component is further adapted to automatically generate an editing panel including one or more selectable edit tools corresponding to the at least first advertisement, and automatically generate and visualize the build panel responsive to activation of a build indicator included in the editing panel, wherein a main body of the visual display of high data volumes resizes responsive to visualization of the build panel. In a further embodiment, the UI component is further adapted to terminate visualization of the build panel and automatically resize the main body of the visual display. The resizing operations and selective obscuring of data can be specifically tailored to the management functions being accessed. In one example, the user interface is configured to analyze a current view state (including, for example, data fields being visualized) to determine what data visualizations to resize and what data visualizations to obscure with an introduction of a management display panel. Tailored resizing and/or obscuring of information enables the system to present contextual data to the used relevant to the management functions and reduces the need for the user to transition through multiple display screens to obtain necessary information.

According to one embodiment, the UI component is adapted to display the advertising data corresponding to the at least first advertisement in a selectable pivot table display. In an embodiment, the advertising data includes advertising data metrics, and the UI component is further adapted to analyze and group the advertising data metrics into an advertising demographic hierarchy (e.g., advertising location, advertising target, advertising type, age group, budget pool, strategy group, ad set, individual placement, gender, custom audience, relationship, among others) adapted for display in the visual display of the high data volumes. In a further embodiment, the UI component is further adapted to dynamically generate information dimension visual displays on historical advertising metrics responsive to user selection of information dimensions associated with the at least first advertisement.

In one embodiment, the one or more selectable build tools are adapted to define advertisement parameters of the at least a second advertisement including a creative parameter, an audience parameter, and a context parameter, wherein the creative parameter corresponds to content, the audience parameter corresponds to a targeted audience, and the context parameter corresponds to a method of targeting the targeted audience. In a further embodiment, the creative parameter, audience parameter, and context parameter include generic field data translated in a destination language format. In one embodiment, at least one of the creative parameter, audience parameter, and context parameter of the at least second advertisement includes a constituent element of the at least first advertisement. According to one embodiment, the second advertisement further includes a third advertisement, and wherein the one or more selectable build tools are adapted to define advertisement parameters simultaneously for the second advertisement and the third advertisement. In one embodiment, the at least one processor is further adapted to execute a series of build validation rules corresponding to at least one of the creative parameter, the audience parameter, and the context parameter, of the at least second advertisement and wherein the UI component is further adapted to dynamically generate a validation display, the validation display including a result of the execution of the build validation rules. In one embodiment the build panel including one or more selectable build tools corresponding to generation of the at least second advertisement further includes a plurality of selectable tabs, each tab of the plurality corresponding to one of the creative parameter, the audience parameter, and the context parameter of the at least second advertisement, the activation of which causes the UI component to transition the build panel to a display corresponding to the selected tab. In a further embodiment, the plurality of selectable tabs is arranged in a vertical orientation along a perimeter of the build panel.

According to another aspect, a system is provided that permits generating and displaying a graphic user interface for high volume data. In one embodiment the system includes at least one processor operatively connected to a memory, the at least one processor when executing, adapted to generate performance information corresponding to advertisement data for a plurality of advertisements, and a user interface ("UI") component adapted to receive the performance information corresponding to the plurality of advertisements, analyze and group the performance information into an advertising demographic hierarchy adapted for display in a selectable visual interface, responsive to selection within the visual display of the advertising, capturing constituent elements of one or more placements (e.g., advertisements), wherein the constituent elements of the one or more placements include at least a creative parameter, an audience parameter, and a context parameter, and generate and visualize a build panel in the selectable visual interface coextensive with the advertising demographic hierarchy, the build panel providing a plurality of selectable build tools corresponding to generation of a new advertisement.

In one embodiment, the UI component is adapted to automatically generate the build panel responsive to activation of at least a build indicator included in the selectable visual interface, wherein a main body of the selectable visual interface resizes responsive to visualization of the build panel. According to another embodiment, wherein the UI component is further adapted to generate an editing panel for display in the selectable visual interface coextensive with the advertising demographic hierarchy, the editing panel providing a plurality of selectable edit tools corresponding to management of the performance information, and automatically generate and visualize the build panel responsive to activation of at least a build indicator included in the editing panel, wherein a main body of the selectable visual interface resizes responsive to visualization of the build panel. In a further embodiment, the UI component is further adapted to terminate visualization of the build panel and automatically resize the main body of the visual display.

According to one embodiment, the UI component is further adapted to dynamically generate visual displays on the performance information responsive to user selection of information dimensions associated with at least one advertisement of the plurality of advertisements. In an embodiment, the plurality selectable build tools are adapted to define advertisement parameters of the new advertisement including a creative parameter, an audience parameter, and a context parameter, wherein the creative parameter corresponds to content, the audience parameter corresponds to a targeted audience, and the context parameter corresponds to a method of targeting the targeted audience.

According to various aspects, a system is provided that permits generating and displaying a graphical user interface for high volume data, the system including at least one processor operatively connected to a memory, the at least one processor when executing, adapted to analyze and group advertising data into an advertising demographic hierarchy, determine summary information for the advertising data in each level of the advertising demographic hierarchy, and generate a navigable user interface display including a visual display of the advertising demographic hierarchy, and a build panel including one or more selectable build tools corresponding to generation of at least a first new advertisement.

In one embodiment, the advertising data includes advertising metrics (e.g., site, budget pool, strategy group, ad set, placement, among other options). According to a further embodiment, the build panel is viewable coextensive with the visual display of the advertising demographic hierarchy along a perimeter of the visual display of the advertising demographic hierarchy.

One aspect is directed to system for high volume data visualization. In one embodiment the system includes at least one processor operatively connected to a memory, the at least one processor adapted to execute a plurality of system layers, wherein the system layers include a data analytics layer adapted to organize and render recursive advertisement data hierarchies such that the recursive hierarchies define sub-sets of hierarchical advertisement data, the recursive advertisement data hierarchies being displayed in a visual display, an advertisement build layer adapted to receive definition a plurality of build parameters of a new advertisement, the plurality of build parameters including a creative parameter, an audience parameter, and a context parameter, the build parameters defined according to activation of build tools provided in a build panel displayed in the visual display coextensive with the recursive advertisement data hierarchies, and a campaign configuration layer adapted to define a rules-based campaign configuration.

In one embodiment, the system layers include a data management layer interconnected with the data analytics layer, the data management layer being adapted to manage advertisement data metrics corresponding to the recursive advertisement data hierarchies. According to one embodiment, the system layers include a cross-channel generics layer interconnected with the advertisement build layer and the data analytics layer, the cross-channel generics layer adapted to import advertisement data from data analytics layer to define at least one of the creative parameter, audience parameter, and context parameter for the new advertisement.

According to one embodiment, the system layers include an advertisement representation layer interconnected with at least the cross-channel generics layer, the advertisement representation layer adapted to assemble the new advertisement based on the defined advertisement parameters, wherein each advertisement parameter includes generic field data. In one embodiment, the system layers include a channel translation layer, the channel translation layer adapted to translate the generic field data to a format of a channel destination. According to one embodiment, the system layers include a predictive, analytics, and optimization layer interposed between the advertisement representation layer and the campaign configuration layer, the predictive, analytics, and optimization layer adapted to provide one or more advertisement parameter suggestions.

According to one aspect a user interface for high volume data visualization, analysis, and management are provided. The user interface comprises at least one processor operatively connected to a memory, the at least one processor when executing, configured to manage display of high data volumes in a user interface, a user interface ("UI") component, executed by the at least one processor, configured to dynamically generate a visual display of high data volumes, the data including placement data corresponding to at least a first placement for electronic delivery through at least one electronic media channel, responsive to selection within the visual display of data associated with a plurality of placements of a build function, capture constituent elements of one or more placements selected in the user interface, wherein the constituent elements of the one or more placements include at least a creative parameter, an audience parameter, and a context parameter, and maintain in a first portion of the visual display, the display of the high data volumes and the placement data, wherein the UI component is further configured to automatically persist and resize at least a portion of the high data volume including the placement data in the first portion of the visual display, selectively eliminate content shown in the first portion of the visual display based on a visualization threshold; and generate a build panel display including one or more selectable build tools corresponding to generation of at least a second placement in a second portion of the visual display.

According to one embodiment, the UI component is configured to automatically resize content in the first display to preserve the display of as much content as possible while the build panel is visualized. For example, All the displayed columns of placement data will be resized and persisted in the current view so long as the displayed columns would not be smaller than a percentage of the current display screen. The UI component can tailor or select the percentage based on properties of the current display (e.g., conventional monitor of 22-26" percentage can be ⅒, 1/20, 1/30, 1/40 of the display screen, for a mobile device ⅕, ⅙, etc.). In another example, the UI component can be configured to resize content smaller until reaching a specific font size 6, 7, 8, 9, etc., or until reducing a prior display size for example, by 20%, 25%, or 30%, etc.). Once the display threshold is reached display columns of content, for example, can be eliminated to maintain the content display above the threshold. In instance, display columns are eliminated from right to left from the display screen.

According to one embodiment, the UI component is configured to automatically generate and visualize the build panel in the second portion of the visual display responsive to activation of a build indicator included in the visual display of the high data volumes, wherein a main body of the visual display of high data volumes resizes responsive to visualization of the build panel to become the first portion of the visual display. According to one embodiment, the UI component is further configured to automatically generate an editing panel including one or more selectable edit tools, wherein the edit tools capture and provide prefilled data fields corresponding to the at least a first placement or data structure visually selected in the main body of the display, and automatically generate and visualize the build panel responsive to activation of a build indicator associated with the editing panel, wherein a main body of the visual display of high data volumes resizes responsive to visualization of the build panel. According to one embodiment, the UI component is further configured to, render the editing panel as an element of the build panel, and enable navigation between the build panel elements and the editing panel responsive to selection of respective tabs displayed in the build panel.

According to one embodiment, the UI component is configured to display the advertising data corresponding to the at least first advertisement in a selectable pivot table display. According to one embodiment, the placement data includes advertising data metrics, and the UI component is further configured to analyze and group the placement data metrics into an advertising demographic hierarchy adapted for display in the visual display of the high data volumes. According to one embodiment, the UI component is further configured to dynamically generate information dimension visual displays on historical advertising metrics responsive to user selection of information dimensions associated with the at least first advertisement. According to one embodiment, the one or more selectable build tools are configured to define advertisement parameters of the at least second advertisement including a creative parameter, an audience parameter, and a context parameter, wherein the creative parameter corresponds to content, the audience parameter corresponds to a targeted audience, and the context parameter corresponds to a method of targeting the targeted audience.

According to one embodiment, the creative parameter, audience parameter, and context parameter include generic field data translated in a destination language format. According to one embodiment, at least one of the creative parameter, audience parameter, and context parameter of the at least second advertisement includes a constituent element of the at least first advertisement. According to one embodiment, the second advertisement further includes a third advertisement, and wherein the one or more selectable build tools are configured to define advertisement parameters simultaneously for the second advertisement and the third advertisement. According to one embodiment, the at least one processor is further configured to execute a series of build validation rules corresponding to at least one of the creative parameter, the audience parameter, and the context parameter, of the at least second advertisement and wherein the UI component is further configured to dynamically generate a validation display, wherein the validation display including a result of the execution of the build validation rules.

According to one embodiment, the user interface component is further configured to generate the build panel including one or more selectable build tools corresponding to generation of the at least second advertisement, wherein the display of the build panel includes a plurality of selectable tabs, each tab of the plurality corresponding to one of the creative parameter, the audience parameter, and the context parameter of the at least second advertisement, the activation of which causes the UI component to transition the build panel to a display corresponding to the selected tab, and wherein the plurality of selectable tabs are displayed in the user interface responsive to accessing associated build functions in the build panel.

According to one embodiment, the plurality of selectable tabs is arranged in a vertical orientation along a perimeter of the build panel. According to one embodiment, the user interface of claim 1, wherein the user interface component is further configured to render a first sub-set of hierarchical advertisement data, and render selections of additional sub-sets of hierarchical advertisement data responsive to scrolling through a prior sub-set of advertisement data. According to one embodiment, the user interface component is further configured to access a data analytics layer, wherein the analytics layer is configured to generate recursive advertisement data hierarchies such that the recursive hierarchies define sub-sets of hierarchical advertisement data, the recursive advertisement data hierarchies.

According to one embodiment, the data analytics layer is further configured to recursively partition advertisement data until a respective partition of the advertisement data can be loaded via the user interface component in less than one second. According to one embodiment, the user interface component is configured to monitor rendering time on user devices. According to one embodiment, the user interface component is configured to access or derive a rendering time responsive to analyzing historic data (e.g., generate average rendering time per row of data, generate average rendering time per row of data filtered by device class or type (e.g., mobile device, laptop, etc.) or type of network, among other options). According to one embodiment, the data analytics layer is further configured to determine partition size based on evaluation of at least historic data of rendering time.

According to one aspect a system for generating and displaying a graphical user interface for high volume data is provided. The system comprises at least one processor operatively connected to a memory, the at least one processor when executing, adapted to, analyze and group advertising data into an advertising demographic hierarchy, determine summary information for the advertising data in each level of the advertising demographic hierarchy, and a navigable user interface display including, a visual display of the advertising demographic hierarchy, and a build panel visualization including one or more selectable build tools corresponding to generation of at least a first new advertisement, wherein the system is configured to trigger visualization of the build panel responsive to selection with the navigable user interface, and responsive to selection display a transition whereby the build panel is introduced into the navigable user interface from a boarder position, and the prior visualized display is automatically resized to incorporate the visualization of the build panel.

According to one aspect a system for high volume data visualization, analysis, and management, are provided. The system comprises at least one processor operatively connected to a memory, the at least one processor when executing, configured to manage display of high data volumes in a user interface, a user interface ("UI") component, executed by the at least one processor, configured to, dynamically generate a visual display of high data volumes, the data including placement data corresponding to at least a first placement for electronic delivery through at least one electronic media channel, responsive to selection within the visual display of data associated with a plurality of placements of a build function, capture constituent elements of one or more placements selected in the user interface, wherein the constituent elements of the one or more placements include at least a creative parameter, an audience parameter, and a context parameter, and maintain in a first portion of the visual display, the display of the high data volumes and the placement data, wherein the UI component is further configured to, automatically persist and resize at least a portion of the high data volume including the placement data in the first portion of the visual display, and generate a build panel display including one or more selectable build tools corresponding to generation of at least a second placement in a second portion of the visual display. According to one embodiment, the UI component is configured to automatically generate and visualize the build panel in the second portion of the visual display responsive to activation of a build indicator included in the visual display of the high data volumes, wherein a main body of the visual display of high data volumes resizes responsive to visualization of the build panel to become the first portion of the visual display. According to one embodiment, the UI component is further configured to automatically generate an editing panel including one or more selectable edit tools, wherein the edit tools capture and provide prefilled data fields corresponding to the at least a first placement or data structure visually selected in the main body of the display, and automatically generate and visualize the build panel responsive to activation of a build indicator associated with the editing panel, wherein a main body of the visual display of high data volumes resizes responsive to visualization of the build panel.

According to one embodiment, the UI component is further configured to render the editing panel as an element of the build panel, and enable navigation between the build panel elements and the editing panel responsive to selection of respective tabs displayed in the build panel. According to one embodiment, the UI component is configured to display the advertising data corresponding to the at least first advertisement in a selectable pivot table display. According to one embodiment, the placement data includes advertising data metrics, and the UI component is further configured to analyze and group the placement data metrics into an advertising demographic hierarchy adapted for display in the visual display of the high data volumes. According to one embodiment, the UI component is further configured to dynamically generate information dimension visual displays on historical advertising metrics responsive to user selection of information dimensions associated with the at least first advertisement.

According to one embodiment, the one or more selectable build tools are configured to define advertisement parameters of the at least second advertisement including a creative parameter, an audience parameter, and a context parameter, wherein the creative parameter corresponds to content, the audience parameter corresponds to a targeted audience, and the context parameter corresponds to a method of targeting the targeted audience. According to one embodiment, the creative parameter, audience parameter, and context parameter include generic field data translated in a destination language format. According to one embodiment, at least one of the creative parameter, audience parameter, and context parameter of the at least second advertisement includes a constituent element of the at least first advertisement. According to one embodiment, the at least second advertisement further includes a third advertisement, and wherein the one or more selectable build tools are configured to define advertisement parameters simultaneously for the second advertisement and the third advertisement. According to one embodiment, the at least one processor is further configured to execute a series of build validation rules corresponding to at least one of the creative parameter, the audience parameter, and the context parameter, of the at least second advertisement and wherein the UI component is further configured to dynamically generate a validation display, wherein the validation display including a result of the execution of the build validation rules.

According to one embodiment, the user interface component is further configured to generate the build panel including one or more selectable build tools corresponding to generation of the at least second advertisement, wherein the display of the build panel includes a plurality of selectable tabs, each tab of the plurality corresponding to one of the creative parameter, the audience parameter, and the context parameter of the at least second advertisement, the activation of which causes the UI component to transition the build panel to a display corresponding to the selected tab, and wherein the plurality of selectable tabs are displayed in the user interface responsive to accessing associated build functions in the build panel. According to one embodiment, the plurality of selectable tabs is arranged in a vertical orientation along a perimeter of the build panel.

According to one aspect a computer implemented method for high volume data visualization, analysis, and management are provided. The method comprises dynamically generating, by at least one processor, a visual display of high data volumes, the data including placement data corresponding to at least a first placement for electronic delivery through at least one electronic media channel, capturing, by the at least one processor, constituent elements of one or more placements selected in the user interface, responsive to selection within the visual display of data associated with a plurality of placements of a build function, wherein the constituent elements of the one or more placements include at least a creative parameter, an audience parameter, and a context parameter, and maintaining, by the at least one processor, in a first portion of the visual display, the display of the high data volumes and the placement data, wherein the act of maintaining includes acts of automatically persisting and resizing at least a portion of the high data volume including the placement data in the first portion of the visual display, and generating a build panel display including one or more selectable build tools corresponding to generation of at least a second placement in a second portion of the visual display.

According to one embodiment, the method automatically generating and visualizing the build panel in the second portion of the visual display responsive to activation of a build indicator included in the visual display of the high data volumes, includes an act of resizing a main body of the visual display of high data volumes responsive to visualization of the build panel, and wherein the resized main body becomes the first portion of the visual display. According to one embodiment, the method further comprises automatically generating an editing panel including one or more selectable edit tools, wherein the edit tools capture and provide prefilled data fields corresponding to the at least a first placement or data structure visually selected in the main body of the display, automatically generating and visualizing the build panel responsive to activation of a build indicator associated with the editing panel, and resizing a main body of the visual display of high data volumes responsive to visualization of the build panel.

According to one embodiment, the method, further comprises rendering the editing panel as an element of the build panel, and enabling navigation between the build panel elements and the editing panel responsive to selection of respective tabs displayed in the build panel. According to one embodiment, the method further comprising displaying the advertising data corresponding to the at least first advertisement in a selectable pivot table display. According to one embodiment, the placement data includes advertising data metrics, and the method further comprise analyzing and grouping the placement data metrics into an advertising demographic hierarchy adapted for display in the visual display of the high data volumes. According to one embodiment, the method further comprises dynamically generating information dimension visual displays on historical advertising metrics responsive to user selection of information dimensions associated with the at least first advertisement.

According to one embodiment, the method defining advertisement parameters of the at least second advertisement including a creative parameter, an audience parameter, and a context parameter, wherein the creative parameter corresponds to content, the audience parameter corresponds to a targeted audience, and the context parameter corresponds to a method of targeting the targeted audience with the one or more selectable build tools in the user interface. According to one embodiment, the method further comprises an act of translating the creative parameter, audience parameter, and context parameter into a destination language format. According to one embodiment, at least one of the creative parameter, audience parameter, and context parameter of the at least second advertisement includes a constituent element of the at least first advertisement. According to one embodiment, the at least second advertisement further includes a third advertisement, and the method further comprises defining advertisement parameters simultaneously for the second advertisement and the third advertisement with the one or more selectable build tools.

According to one aspect system for generating and displaying a graphical user interface for high volume data, the system are provided. The system comprises at least one processor operatively connected to a memory, the at least one processor when executing, adapted to analyze and group advertising data into an advertising demographic hierarchy, determine summary information for the advertising data in each level of the advertising demographic hierarchy, and a navigable user interface display including a visual display of the advertising demographic hierarchy, and a build panel visualization including one or more selectable build tools corresponding to generation of at least a first new advertisement wherein the system is configured to trigger visualization of the build panel responsive to selection with the navigable user interface, and responsive to selection display a transition whereby the build panel is introduced into the navigable user interface from a boarder position, and the prior visualized display is automatically resized to incorporate the visualization of the build panel.

According to one aspect a system for high volume data visualization is provided. The system comprises at least one processor operatively connected to a memory, the at least one processor adapted to execute a plurality of system layers, wherein the system layers include a data analytics layer adapted to organize and render recursive advertisement data hierarchies such that the recursive hierarchies define sub-sets of hierarchical advertisement data, the recursive advertisement data hierarchies being displayed in a visual display, an advertisement build layer adapted to receive definition a plurality of build parameters of a new advertisement, the plurality of build parameters including a creative parameter, an audience parameter, and a context parameter, the build parameters defined according to activation of build tools provided in a build panel displayed in the visual display coextensive with the recursive advertisement data hierarchies, and a campaign configuration layer adapted to define a rules-based campaign configuration.

According to one embodiment, the system layers include a data management layer interconnected with the data analytics layer, the data management layer being adapted to manage advertisement data metrics corresponding to the recursive advertisement data hierarchies. According to one embodiment, the system layers include a cross-channel generics layer interconnected with the advertisement build layer and the data analytics layer, the cross-channel generics layer adapted to import advertisement data from data analytics layer to define at least one of the creative parameter, audience parameter, and context parameter for the new advertisement. According to one embodiment, the system layers include an advertisement representation layer interconnected with at least the cross-channel generics layer, the advertisement representation layer adapted to assemble the new advertisement based on the defined advertisement parameters, wherein each advertisement parameter includes generic field data.

According to one embodiment, the system layers include a channel translation layer, the channel translation layer adapted to translate the generic field data to a format of a channel destination. According to one embodiment, the system layers include a predictive, analytics, and optimization layer interposed between the advertisement representation layer and the campaign configuration layer, the predictive, analytics, and optimization layer adapted to provide one or more advertisement parameter suggestions.

According to one aspect system for generating and displaying a graphical user interface for high volume data is provided. The system comprises at least one processor operatively connected to a memory, the at least one processor when executing, adapted to analyze and group advertising data into an advertising demographic hierarchy, determine summary information for the advertising data in each level of the advertising demographic hierarchy, and generate a navigable user interface display including a visual display of the advertising demographic hierarchy, and a build panel including one or more selectable build tools corresponding to generation of at least a first new advertisement.

According to one embodiment, the advertising data includes advertising metrics (e.g., site, budget pool, strategy group, ad set, placement, among other options). According to one embodiment, the build panel is viewable coextensive with the visual display of the advertising demographic hierarchy along a perimeter of the visual display of the advertising demographic hierarchy.

According to one aspect, a system for high volume data visualization is provided. The system comprising at least one processor operatively connected to a memory, the at least one processor adapted to execute a plurality of system layers, wherein the system layers include a data analytics layer adapted to organize recursive placement data hierarchies such that the recursive hierarchies define sub-sets of hierarchical placement data, the recursive placement data hierarchies being displayed in a visual display, a placement build layer adapted to receive definition a plurality of build parameters of a new placement, the plurality of build parameters including a creative parameter, an audience parameter, and a context parameter, the build parameters defined according to activation of build tools provided in a build panel displayed in the visual display coextensive with the recursive placement data hierarchies, a campaign configuration layer adapted to define a rules-based campaign configuration; and a visualization layer configured to: dynamically generate a visual display of the recursive placement data hierarchies in a first portion of a display on a user interface, automatically persist and resize at least a portion of the display of the recursive placement data hierarchies in the first portion of the visual display, and generate a build panel display including one or more selectable build tools corresponding to generation of at least a second placement in a second portion of the visual display responsive to user selection of a build function in the user interface.

According to one embodiment, the recursive placement data hierarchies are organized into further categorization hierarchies, (e.g., grouping of placements into Audience (e.g., population target of placement), Strategy Groups (e.g., organization of placements on business objectives), Budget Pools (e.g., spend accounts), Ad Plan (e.g., grouping of placements on common plan), and the user interface is configured to display the categorization hierarchies and rows in a dynamic table that contain the recursive hierarchies. According to one embodiment, the user interface is further configured to accept user specification of categorization hierarchies to filer display of placements.

According to one embodiment, the user interface is further configured to render categorization hierarchies by indenting each hierarchical layers organized within another hierarchical layer (e.g., to appear as indented rows). According to one embodiment, the user interface is further configured to render a first one of the sub-sets of hierarchical placement data, wherein the first sub-set is organized and displayed as rows associated with individual placements having associated performance information displayed as columns in the rows. According to one embodiment, the visualization layer is configured to manage display of the sub-sets of the hierarchical placement data such that a currently visualized sub-set can be communicated and displayed on a browser within a display threshold (e.g., less than 1 second, less than 0.5 seconds, etc.).

According to one embodiment, the visualization layer is configured to manage transitions between the sub-sets of the hierarchical placement data. (e.g., first, second, third, fourth, fifth, six, seventh, eighth, ninth, tenth, eleventh, twelfth, thirteenth, fourteenth, fifteenth, sixteenth, seventeenth, eighteenth, nineteenth, twentieth, etc.). According to one embodiment, the visualization layer manages the transitions between the sub-sets of the hierarchical placement data sequentially, responsive to scrolling actions in the user interface. According to one embodiment, the system layers include a data management layer interconnected with the data analytics layer, the data management layer being adapted to manage placement data metrics corresponding to the recursive placement data hierarchies.

According to one embodiment, wherein the system layers include a cross-channel generics layer interconnected with the placement build layer and the data analytics layer, the cross-channel generics layer adapted to import placement data from data analytics layer to define at least one of the creative parameter, audience parameter, and context parameter for the new placement. According to one embodiment, the system layers include an placement representation layer interconnected with at least the cross-channel generics layer, the placement representation layer adapted to assemble the new placement based on the defined placement parameters, wherein each placement parameter includes generic field data. According to one embodiment, the system layers include a channel translation layer, the channel translation layer adapted to translate the generic field data to a format of a channel destination.

According to one embodiment, the system layers include a predictive, analytics, and optimization layer interposed between the placement representation layer and the campaign configuration layer, the predictive, analytics, and optimization layer adapted to provide one or more placement parameter suggestions.

According to one aspect, a system for generating and displaying a graphical user interface for high volume data is provided. The system comprises at least one processor operatively connected to a memory, the at least one processor when executing, adapted to: analyze and group placement data into a placement demographic hierarchy; determine summary information for the placement data in each level of the placement demographic hierarchy; and generate a navigable user interface display including: a visual display of the placement demographic hierarchy; and a build panel including one or more selectable build tools corresponding to generation of at least a first new placement.

According to one embodiment, the placement data includes placement metrics (e.g., site, budget pool, strategy group, ad set, placement, among other options). According to one embodiment, the build panel is viewable coextensive with the visual display of the placement demographic hierarchy along a perimeter of the visual display of the placement demographic hierarchy.

According to one aspect, a system for generating and displaying a graphical user interface for high volume data is provided. The system comprises at least one processor operatively connected to a memory, the at least one processor when executing, adapted to: analyze and group placement data into a placement demographic hierarchy; determine summary information for the placement data in each level of the placement demographic hierarchy; and generate a navigable user interface display including: a visual display of the placement demographic hierarchy; and a build panel visualization including one or more selectable build tools corresponding to generation of at least a first new placement wherein the system is configured to trigger visualization of the build panel responsive to selection with the navigable user interface, and responsive to selection display a transition whereby the build panel is introduced into the navigable user interface from a boarder position, and the prior visualized display is automatically resized to incorporate the visualization of the build panel.

According to one embodiment, the system is configured to: automatically generate an editing panel including one or more selectable edit tools, wherein the edit tools capture and provide prefilled data fields corresponding to the at least a first placement or data structure visually selected in the main body of the navigable user interface display; and automatically generate and visualize the build panel responsive to activation of a build indicator associated with the editing panel, wherein a main body of the navigable user interface display resizes responsive to visualization of the build panel. According to one embodiment, the system is configured to: render the editing panel as an element of the build panel; and enable navigation between the build panel elements and the editing panel responsive to selection of respective tabs displayed in the build panel. According to one embodiment, the system is configured to display the placement data corresponding to the at least first placement in a selectable pivot table display.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE FIGURES

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 2 shows a view of an example user interface, according to various aspects and embodiments;

FIGS. 3A-B show a view of an example user interface, according to various aspects and embodiments;

FIGS. 4A-B show a view of an example user interface, according to various aspects and embodiments;

FIGS. 5A-B show a view of an example user interface, according to various aspects and embodiments;

FIGS. 6A-B show a view of an example user interface, according to various aspects and embodiments;

FIGS. 7A-B show a view of an example user interface, according to various aspects and embodiments;

FIGS. 8A-B show a view of an example user interface, according to various aspects and embodiments;

FIGS. 9A-D show views of example user interfaces, according to various aspects and embodiments;

FIGS. 10A-B show a view of an example user interface, according to various aspects and embodiments;

FIGS. 12A-B show a view of an example user interface, according to various aspects and embodiments;

FIGS. 13A-B show a view of an example user interface, according to various aspects and embodiments;

FIGS. 14A-B show a view of an example user interface, according to various aspects and embodiments;

FIGS. 15A-B show a view of an example user interface, according to various aspects and embodiments;

FIGS. 16A-C show a view of an example user interface, according to various aspects and embodiments;

FIGS. 25A-C show example views of example user interfaces, according to one embodiment;

FIGS. 26-42 show example views of example user interfaces according to one embodiment;

FIGS. 43A-B show an example view of an example user interface according to one embodiment;

FIGS. 44A-B show an example view of an example user interface according to one embodiment;

FIGS. 45A-B show an example view of an example user interface according to one embodiment;

FIGS. 46A-B show an example view of an example user interface according to one embodiment;

FIGS. 47A-B show an example view of an example user interface according to one embodiment;

FIGS. 48A-B show an example view of an example user interface according to one embodiment;

FIGS. 49A-B show an example view of an example user interface according to one embodiment;

FIGS. 50-51 show example views of example user interfaces according to one embodiment;

FIGS. 52A-B show an example view of example user interface according to one embodiment;

DETAILED DESCRIPTION

Figure 1A:
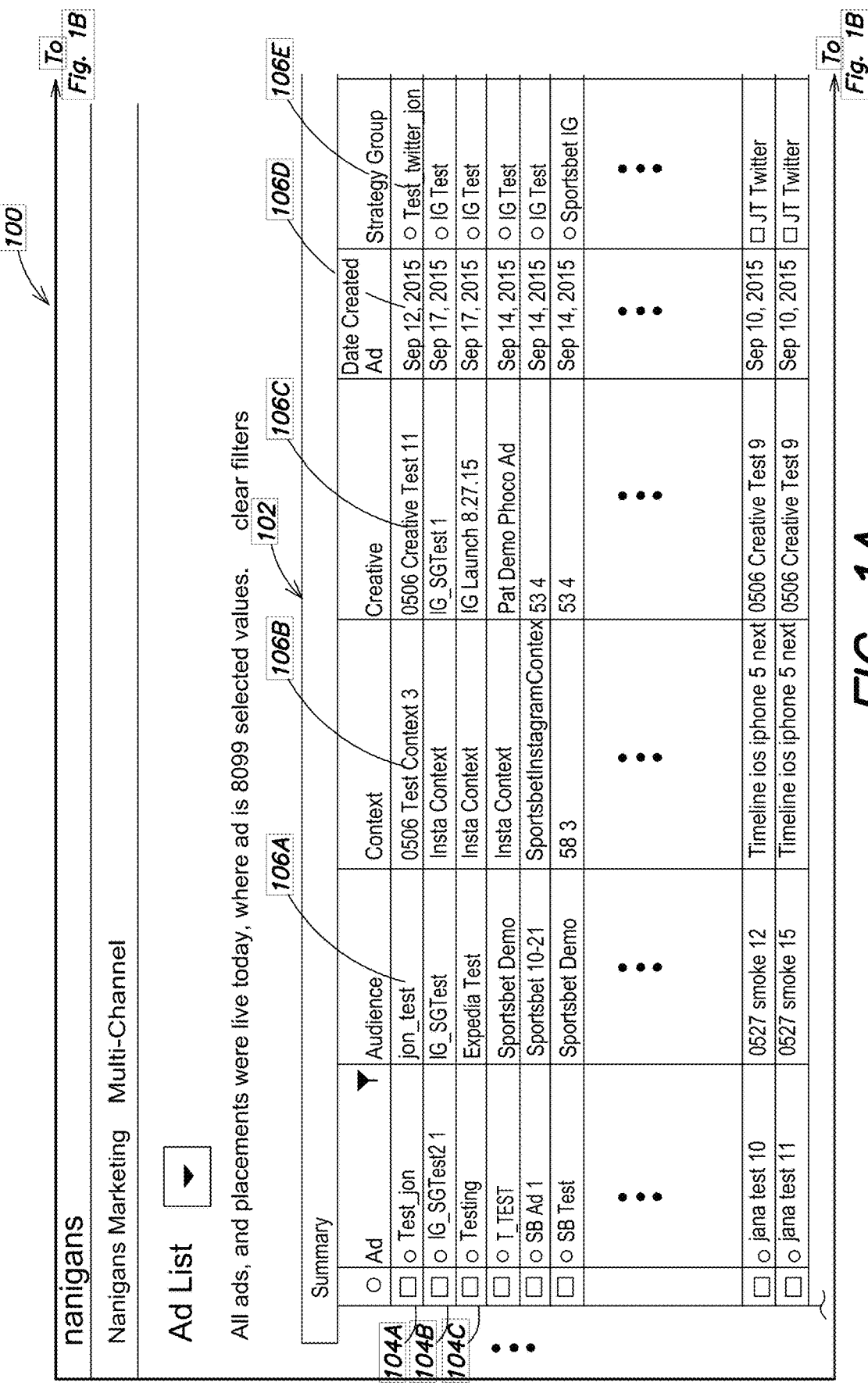
FIGS. 1A-B show a view of an example user interface, according to various aspects and embodiments.

Various aspects and embodiments are directed to a system and or user interface for engaging with high volumes of data, and in particular high volumes of advertising data (also referred to herein as advertising information). In practice, there may be millions or more of advertisements that can be analyzed in real time and used for generating new advertisements. Aspects and embodiments may include a user interface adapted to dynamically generate a navigable visual display of high volumes of data and generate a build panel including one or more selectable build tools corresponding to generation of advertisements. The user interface is specially-adapted to persist display of the high volumes of data while coextensively displaying the build panel such that the data may be managed and/or reviewed simultaneous with definition of parameters of the advertisements to be generated. Accordingly, various aspects and embodiments discussed herein improve the user experience of a conventional advertising management system by increasing organization and access to more relevant detailed metrics and analytics, while also fundamentally improving the functioning of the advertising management system itself (i.e., speed and efficiency).

Further embodiments augment the executional efficiency of the system itself via build panel displays that are introduced into contextually relevant information displays. For example, automated transitions in the user interface reformat and/or resize displayed data to incorporate build panel functions, integrating information access previously maintained separately. These dynamic integrations enable access to constantly updated information, while streamlining build functions for user selection. In another example, the dynamic integration reduces the number of screens and/or system transitions that need to be visualized by the system, and thereby reduces the processing and memory required to perform the same operations with access to the same information over conventional approaches.

In further embodiments, selections made in the user interface main body can be incompatible with selections in the build panel. For example, the build panel enables construction of multiple placements across a variety of delivery channels simultaneously. A selection in the main body of a channel specific placement can yield options incompatible with the variety of delivery channels already selected. In some embodiments, the system is configured to validate any context selections made in the main body of the display. For example, validation can reference criteria for selected placements parameters (e.g., an audience value) and criteria associated with selected delivery channels to ensure compatibility. Where incompatibility is detected the system can be configured to transition automatically to a build tool display containing the incompatible information (if not already there) and highlight the identified issue. In further examples, the system can identify the issue, generate a solution (e.g., finding a similar compatible audience selection for the channel), and allow the user to undo the identified solution in the user interface, if desired.

Example Display System

Figure 1B:
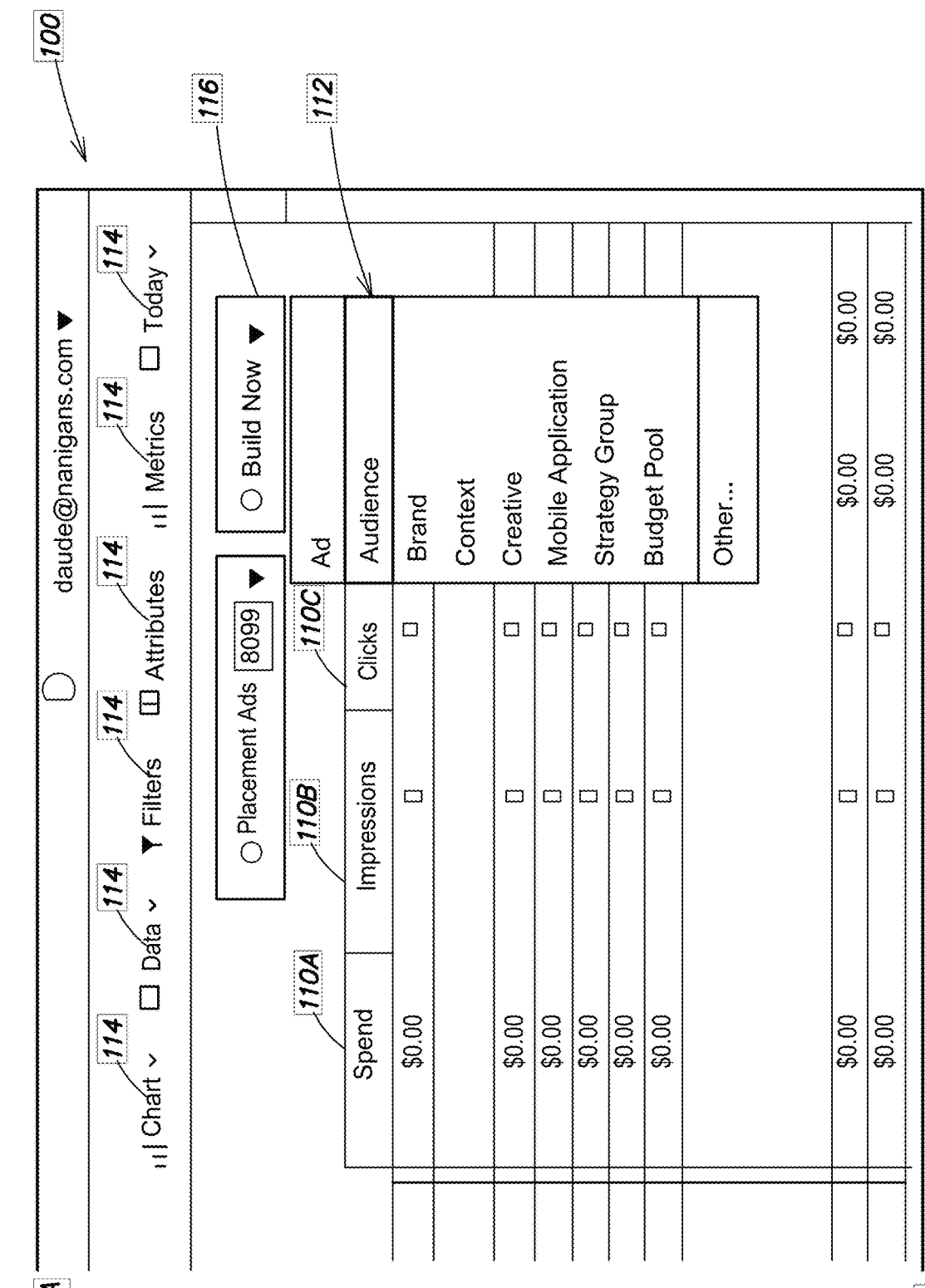

FIG. 1 shows a view of a user interface 100 that may be used to display advertisement data to a user. The user interface 100 is specially configured to minimize the data volume required to convey necessary management information for an advertising network. Some difficulties in managing advertising networks include the high volume of constantly changing data that often needs to be reviewed by a network manager in order to make decisions on how to change, update, terminate, or suspend any number of a high volume of advertising placements.

User interface 100 includes an example of a summary view tailored for understanding and summarizing metrics associated with advertisement data associated within individual advertisements. A main body 102 of the display includes a listing of advertisement data for individual advertisements 104A-C . . . , each advertisement 104A organized by one or more advertisement parameters 106A-E, such as a creative parameter 106C, an audience parameter 106A, and a context parameter 106B. While other advertisement parameters may be used, in one embodiment, the creative parameter corresponds to content of an advertisement (e.g., 104A-C . . . ), the audience parameter corresponds to a targeted audience, and a context parameter corresponds to a method of targeting the audience. Each advertisement parameter includes a segment of the advertisement data which defines the particular advertisement or information on the particular advertisement. In various embodiments, receiving, segmenting, and providing advertisement data as one or more advertisement parameters enables a user to more easily review and comprehend analytics and metrics associated with an advertisement. For instance, the user interface 100 may generate and display in the main body 102 analytics corresponding to the particular audience parameter of an advertisement (e.g., 104A-C . . . ) permitting a user to determine whether that advertisement is performing well for a given audience, or whether the targeted audience needs to be edited.

In one embodiment, and as shown in FIG. 1, the main body 102 includes a listing of advertisement data arranged in rows and columns for each advertisement (e.g., 104A-C). While shown in rows and columns, in various other implementations any other suitable data visualization structure may be used. Each row corresponds to a particular advertisement, or advertisement group, and each column represents an advertisement parameter. In various embodiments, each advertisement (e.g., 104A) may include a selectable group of advertisements which may be expanded in the user interface 100 via selection. Within each grouping, additional levels of advertisements and corresponding data may exist. Groupings of advertisements and demographic hierarchies of advertisement data or metrics are further described in more detail below. Each advertisement (e.g., 104A), or grouping, may be selected and reported on the user interface 100 individually, collectively, and in any combination. In various embodiments, the user interface 100 simplifies access to advertisement data and metrics. For instance, the user interface 100 is responsive to user actions to repositioning display via a separator 108. In response to the translation of the separator 108 (e.g., moving the separator 108 left, right, up, or down), additional advertisement data or metrics 110 can be hidden or displayed. FIG. 1 shows advertisement metrics 110A-C including spend data 110A, impressions 110B, and clicks 110C, among other data obscured by an advertisement generation menu 112. Also shown in the view of FIG. 1, the user interface 100 may include selectable groupings of management functions 114. The groupings can include "Chart," "Data," "Filters," "Attributes," "Metrics," and "Today." The groupings 114 provide quick access to management functions organized by logical groupings. Each logical grouping is designed to facilitate selection of common functions to enable a streamlined selection and further drilling into data metrics and analytics. Translation of the separator 108 can trigger the user interface to automatically resize information displayed in the main body 102 portion of the display to enabled the user interface to continue to visualize the current advertising parameters 106A-E, while introducing additional relevant information by manipulating the separator 108. In some embodiments, detailed information is ordered automatically by the system and responsive to manipulations of the separator 108, the detailed information is introduced into the display based on the system based ordering (e.g., spend 110A, impressions 110B, clicks 110C, etc.). In some alternatives, the system and/or user interface retains information on any modifications to a view that and end user selects. In one example, the modifications to the view (e.g., data ordering, selected data elements, removed data elements, separator position, etc.) can be retained as a temporary view. The temporary view can be preserved across multiple logins, etc. but can also be subject to any latter modifications. In further embodiments, any changes a user wishes to maintain can be saved as user named views and made accessible through the user interface (se for example, FIG. 4 "MyAd Modified" at 410).

Similarly, each advertisement parameter 106 may include groupings of advertisement attributes which can be expanded in the user interface 100 via selection. Within each parameter, multiple attributes may be selected to define that particular parameter. For instance, an audience parameter may include attributes corresponding to an audience location, gender, age, spoken language, TV show, followers, similar followers, interests, keywords, among others. Activation of an advertisement parameter or one or more view tools within a view panel, such as the view panel discussed with reference below to FIG. 16, causes the user interface 100 to transition and rearrange the advertisement data or metrics provided in the main display 102, according to an example arrangement associated with the selected parameter or view tool. In some examples, views may be provided based on user created and saved views, a selection of previously generated and stored views recalled from storage (e.g., library views), and one or more view management tools. Accordingly, the user interface 100 permits the user to view and manage advertisement data in various configurations allowing the user the view and interact with the same information from various different perspectives.

Figure 2:
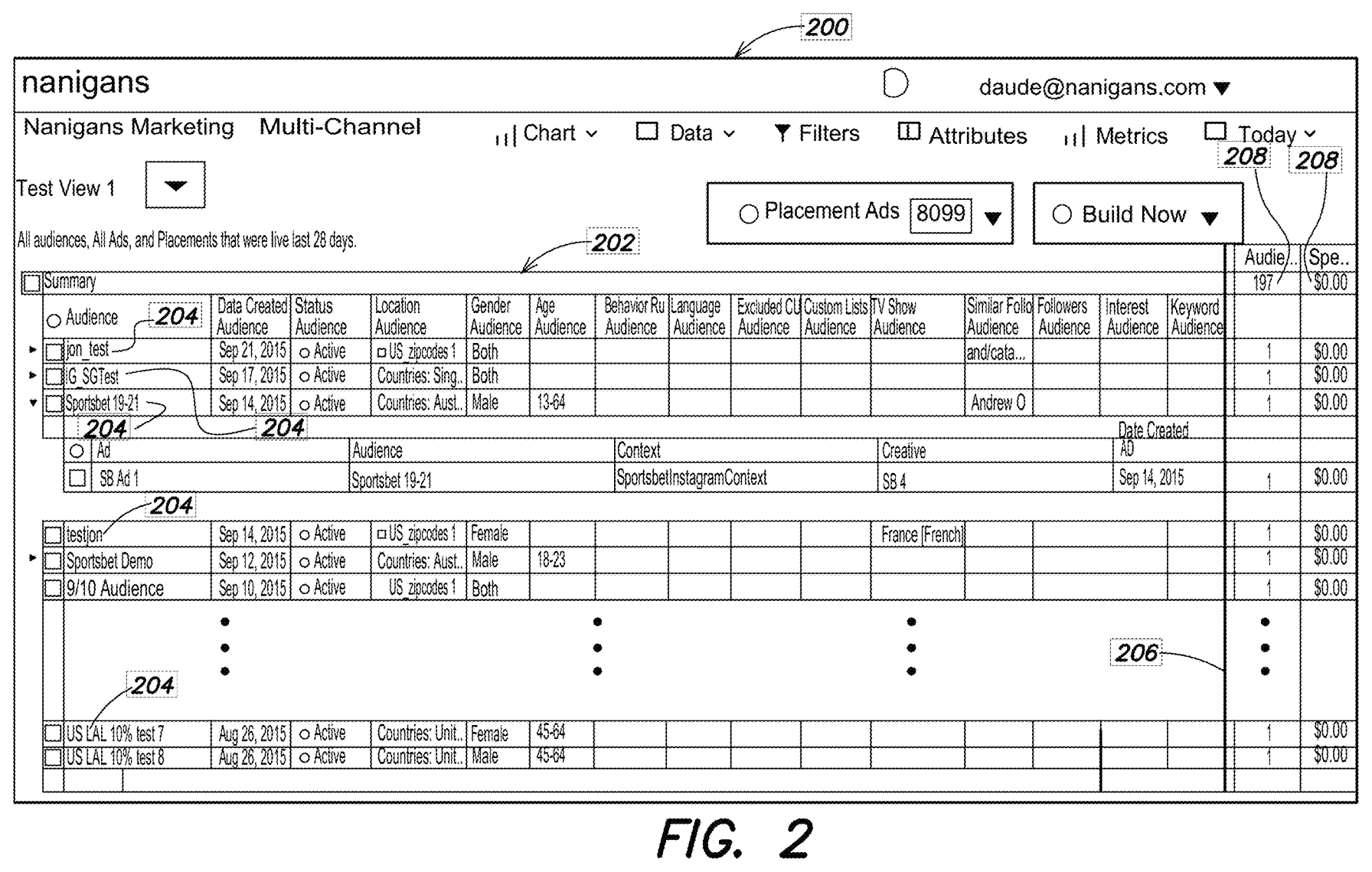

Turning briefly to FIG. 2, FIG. 2 shows a summary view tailored for understanding advertisement parameters corresponding to a plurality of advertisements. Selection of an audience parameter 204 in a main body 202 of the user interface 200 (e.g., audience parameter labeled "Sportsbet 19-21") expands a display of advertisement data corresponding to advertisements defined by the selected audience parameter. While a single advertisement ("SB Ad 1"), and corresponding advertisement data, is shown in FIG. 2 expanded from the "Sportsbet 19-21" audience parameter, in various further embodiments groupings of advertisements may be opened responsive to selection of an audience parameter 204 in the main body 202 of the user interface 200. This is often the case when a given audience is targeted with multiple advertisements.

In various embodiments the user interface 200 further simplifies access to advertisement data and metrics. For instance, the user interface 200 is responsive to user actions of repositioning the display via a separator 206, as described above with reference to the user interface 100 of FIG. 1. In response to the translation of the separator 206 across the user interface, additional attributes, advertising data, or metrics, can be hidden or displayed simultaneously with the advertisement parameters 204. FIG. 2 shows additional attributes 208 as including audience volume and spend data. In particular, advertising data associated with each corresponding row (i.e., each advertisement parameter) may be delivered to the user by the user interface 200. Such an embodiment permits the user to review and manage advertisement parameters 204, while simultaneously reviewing analytics and metrics for those particular advertisement parameters. In some embodiments, revelation and concealment functions in the user interface can be constrained by minimum fixed attributes. In one example, when the minimum fixed attributes are impinged by movement of the separator, resizing of all the minimum fixed attributed can occur. In further examples, as the separator is further translated to reduce the display allocated to the minimum fixed attributes, a minimum threshold for display size can be exceed whereby even ones of the minimum fixed attributes can be concealed. In other examples, the user interface separator will freeze upon reaching the minimum display size for the minimum fixed attributes.

Returning to FIG. 1, in various embodiments the user interface 100 is adapted to automatically generate a build panel responsive to activation of a build indicator 116 included in the visual display. While FIG. 1 shows a "Build Now" indicator arranged in a substantially upper-right side of the user interface 100, any suitable indicator and placement may be used. In various embodiments, selection of the build indicator prompts visualization of the advertisement generation menu 112, which may include a plurality of options each corresponding to a build panel for a particular advertisement parameter. For instance, FIG. 1 shows the generation menu 112 including options for Ad, Audience, Brand, Context, Creative, Mobile Application, Strategy Group, and Budget Pool. In one embodiment, and as shown in FIG. 1, the generation menu 112 may drop down from the build indicator 116. Selection of a particular option within the build generation menu 112 transitions the user interface 100 to a visual display similar to that shown in FIG. 3.

Figure 3B:
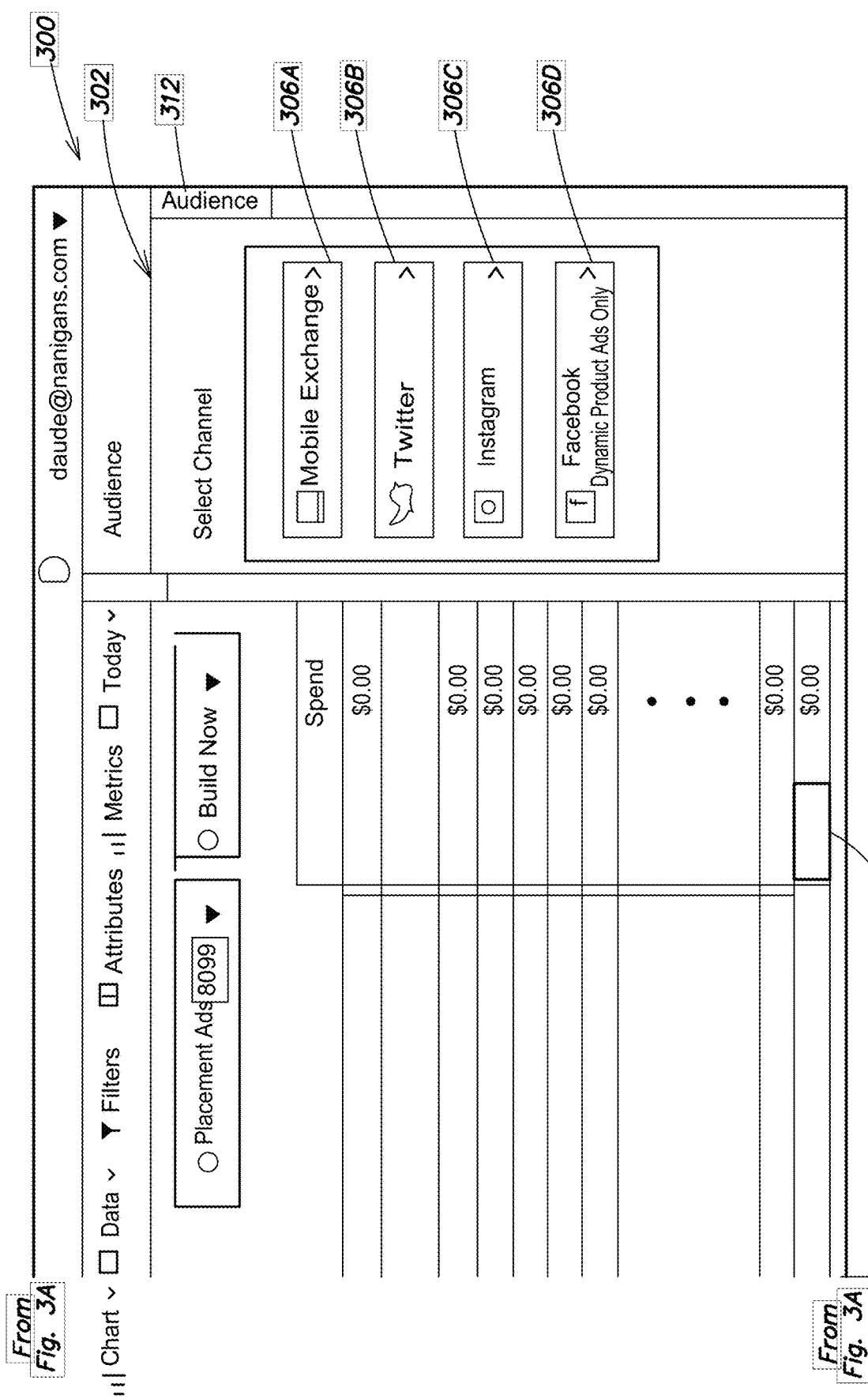

FIG. 3 shows one embodiment of a user interface 300 wherein a build panel 302 is coextensively displayed with a main body 304 of the user interface 300. In various embodiments, selection of the "Build Now" indicator, and in particular, an option within the visualized advertisement generation menu 112 transitions the user interface 100 to a display including a build panel having a plurality of build tools corresponding to the selected option. In further embodiments, the build panel may include a plurality of selectable tabs, in which the visualized tab includes a plurality of build tools corresponding to the option selected.

In various embodiments, the build panel 302 may be positioned along a perimeter of the user interface 300, such that a user may effectively review and/or manage advertisement data or metrics within the main body 304 while generating a new advertisement within the build panel 302. It is appreciated that often users will be interested in advertisements that are performing well, and accordingly, want to define the advertisement parameters of a new advertisement based on the advertisement parameters of those advertisements performing successfully (e.g., high conversion rates, high impressions, high views, etc.). Various aspects and embodiments address this desire by providing a build panel including one or more selectable build tools adapted to define advertisement parameters for a new advertisement including advertisement parameters maintained from an advertisement included in the main display. Such aspects and embodiments are discussed in further detail below with reference to FIGS. 3-18.

In various embodiments, the user interface 300 is adapted to resize and/or reconfigure the main display 304, in addition to advertisement data or metrics within the main display 304, responsive to visualization of the build panel 302. While in some embodiments, the build panel 302 may be delivered "on top of" the main display 304, in various other embodiments, the user interface 300 performs one or more functions to reorganize advertisement data or metrics within the main display 304, such that view of the contents of the main display 304 is not obstructed. For instance, the user interface 300 may be adapted to visually compress in a horizontal direction the dimensions of the main display 304 and the contents therein. For instance, one or more functions may cause the user interface 300 to decrease a dimension of each column within the main display 304 by an incremental amount, where the incremental amounts when totaled substantially equal a horizontal dimension of the build panel 302. In various other embodiments, the user interface 300 may reconfigure the main display 304 to deliver advertisement data or metrics corresponding to data or metrics that would not be overlapped by the build panel 302. For instance, when a user interface of one embodiment transitions from a view similar to that shown in FIG. 1 to a view similar to that shown in FIG. 3, the main display may persist advertisement data metrics positioned at a first horizontal extreme of main display and remove from view data or metrics positioned at a distal horizontal extreme (e.g., data at a left side of the main display remains in view, and data at a right side of the main display is removed from view). In various other embodiments, the user interface 300 may increase or decrease a font or text size of the contents of the main display 304 such that the contents of the main display 304 remain the same, and only the size changes. In other examples, other reorganization functions may be implemented by the user interface 300 to resize or manipulate advertisement data or the main display responsive to generate and visualization of an action panel (e.g., build panel 302).

Similarly, in some embodiments the user interface 300 is adapted to resize and/or reconfigure the main display 304, in addition to advertisement data or metrics within the main display 304, responsive to termination of the build panel 302. Such an event may occur when the user interface 300 generates a new advertisement, and transitions to a summary view, such as that shown in FIG. 1. As described above, various functions may be implemented by the user interface 300 to reorganize or resize the main display 304 or the contents thereof. In at least one embodiment, responsive to termination of the build panel 302 (e.g., selection of an exit indicator, generation of a new advertisement, selection of an escape icon, etc.) the user interface 300 may return the main display 304 to a visualization of advertisement data or metrics that would have been obscured by the build panel 302. In various other embodiments, the user interface 300 is adapted to increase a dimension of each column within the main display 304 by an incremental amount, where the incremental amounts when totaled substantially equal a horizontal dimension of the build panel 302. In other implementations, the user interface 300 may be adapted to increase text or font size, add rows or columns of advertisement data or metrics, or execute any other resizing operations, responsive to termination of the build panel 302.

As discussed above, and in further detail below, in various embodiments the build panel 302 may include a plurality of selectable tabs presented along an edge of the user interface 300, allowing the user to easily navigate among a plurality of active build panels. In such an embodiment, each active build panel may correspond to various additional advertisement parameters of a new advertisement, since advertisements may be constructed from numerous advertisement parameters (e.g., a creative parameter, an audience parameter, and a context parameter), which each may be constructed from further attributes (e.g., image, gender, etc.). Accordingly, in various embodiments, the user interface 300 may be adapted to visualize a second active build panel responsive to termination of a first build panel (e.g., build panel 302).

Figure 4A:
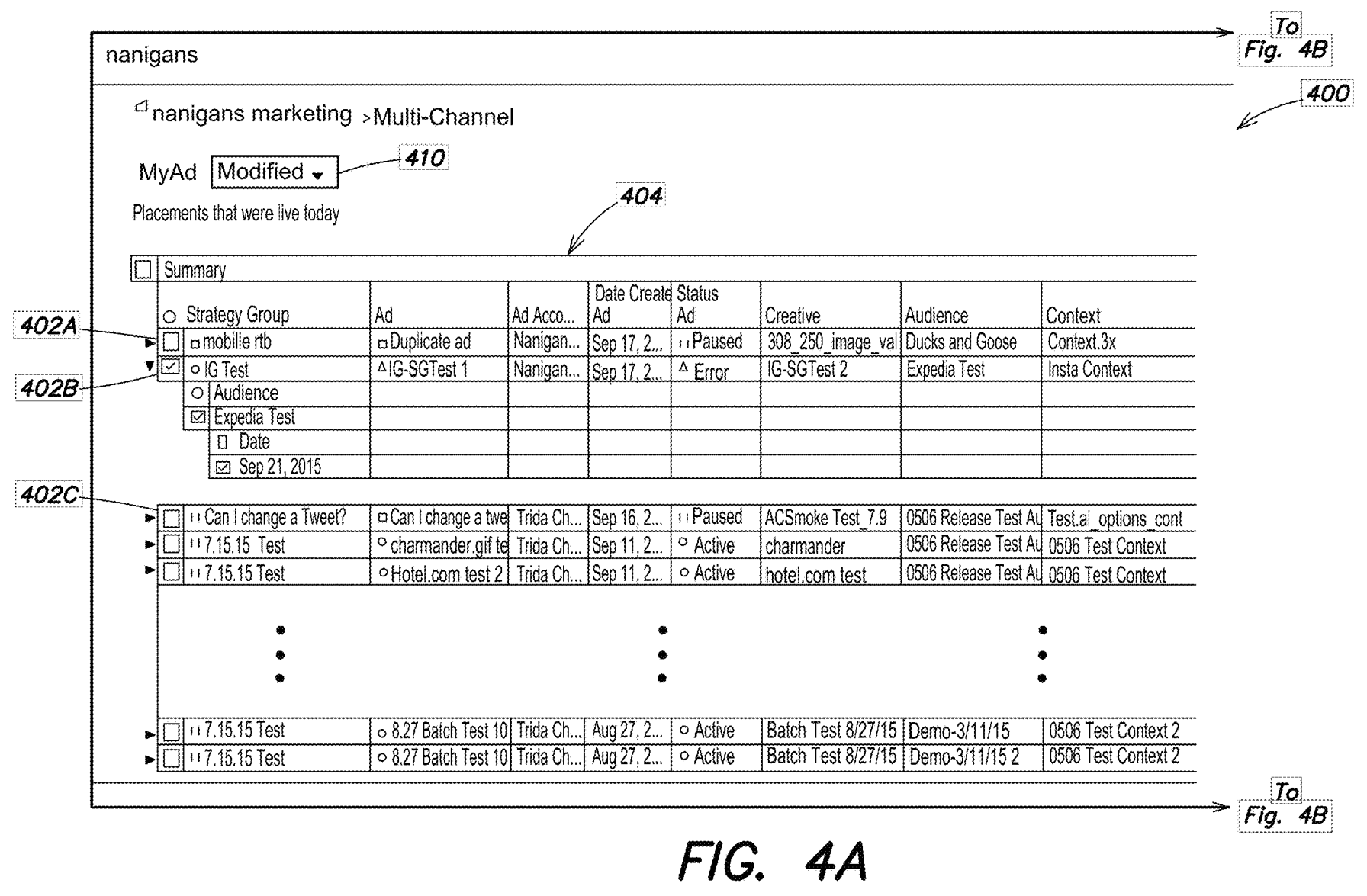
Figure 4B:
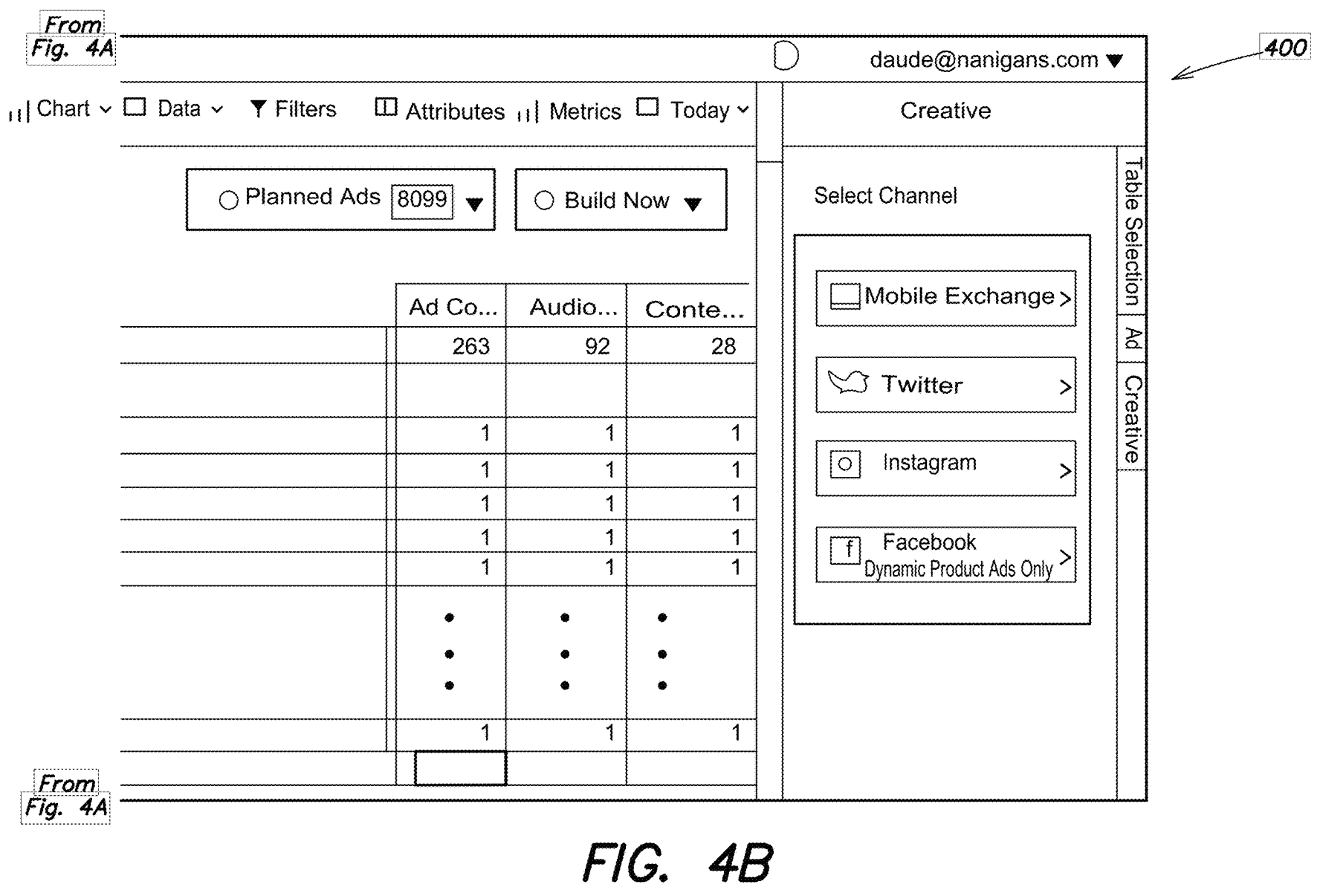

The build panel 302 shown in FIG. 3 provides one or more build tools 306A-D adapted to define advertisement parameters of a new advertisement to be generated. Each build tool 306A-D may include one or more selectable objects or options the selection of which specifies the advertisement parameter, or in further embodiments, an attribute of the particular advertisement parameter. For instance, each build tool 306A-D may include a drop down menu of listed parameters, a text based search, a series of buttons, a series of check boxes, or any other tool that includes advertisements parameter. Similarly, the each build tool 306A-D may include a drop down menu of attributes, a text based search, a series of buttons, a series of check boxes, or any other tool that includes advertisements parameter attributes. As discussed above, each advertisement parameter may include a plurality of attributes each configured to define and specify the particular advertisement parameter. For instance, within the build panel 302 of FIG. 3, the user interface 300 provides build tools 306A-D for designating an advertising platform (e.g., MOBILE EXCHANGE 306A, TWITTER 306B, INSTAGRAM 306C, FACEBOOK 306D), the selection of which specifies the destination channel of the new advertisement. Also shown in FIG. 3, the build panel 302 may also be displayed coextensive with additional advertisement metrics or data, such as advertisement metrics 308 separated from the main display 304 via a moveable separator 310. Accordingly, the user interface 300 permits the user to engage and manage advertisement data, advertisement metrics, and generation of a new advertisement, all within the same user interface. In further embodiments, selection of the build tools 306A-D while an ad placement, ad audience, ad strategy group, etc. is selected the main body of the display (e.g., 304) causes the build tool to capture existing context data for the selection in the main display. Discussed in greater detail below with respect to FIG. 5, selection of the build tool while a selection in the main body of the screen is present imports those data fields and values into the build tool as selectable drop down options where the options are labeled accordingly (e.g., at 510 "select one from table"). Referring to FIG. 4, FIG. 4 shows a further view of a visual display of the user interface. While advertisement data within the main body 404 is shown in FIG. 3 as arranged in a summary view based on the particular advertisement (e.g., an arrangement based on an advertisement identifier such as a name), in various embodiments, advertisement data may be arranged by one or more strategy groups 402A-C (e.g., advertisement groupings). For instance, the main body 404 of the user interface 400 shown in the view of FIG. 4 shows organization of advertisements in strategy groups 402 that include "mobile rtb" 402A and "IG Test" 402B. As further shown, each group 402 may be expanded in the user interface 400 via selection. Within each group (e.g., 402B), additional levels of advertisement data can exist. For example, advertisement data may be grouped under advertisement parameters such as audience, and further grouped under a date at which the advertisement was generated. In various embodiments, the user interface 400 delivers expanded levels to each strategy group (e.g., 402B) (as shown in FIG. 4) responsive to selection of a particular group. The view of FIG. 4 demonstrates the transition to an expanded group of the "IG Test" strategy grouping.

Figure 5B:
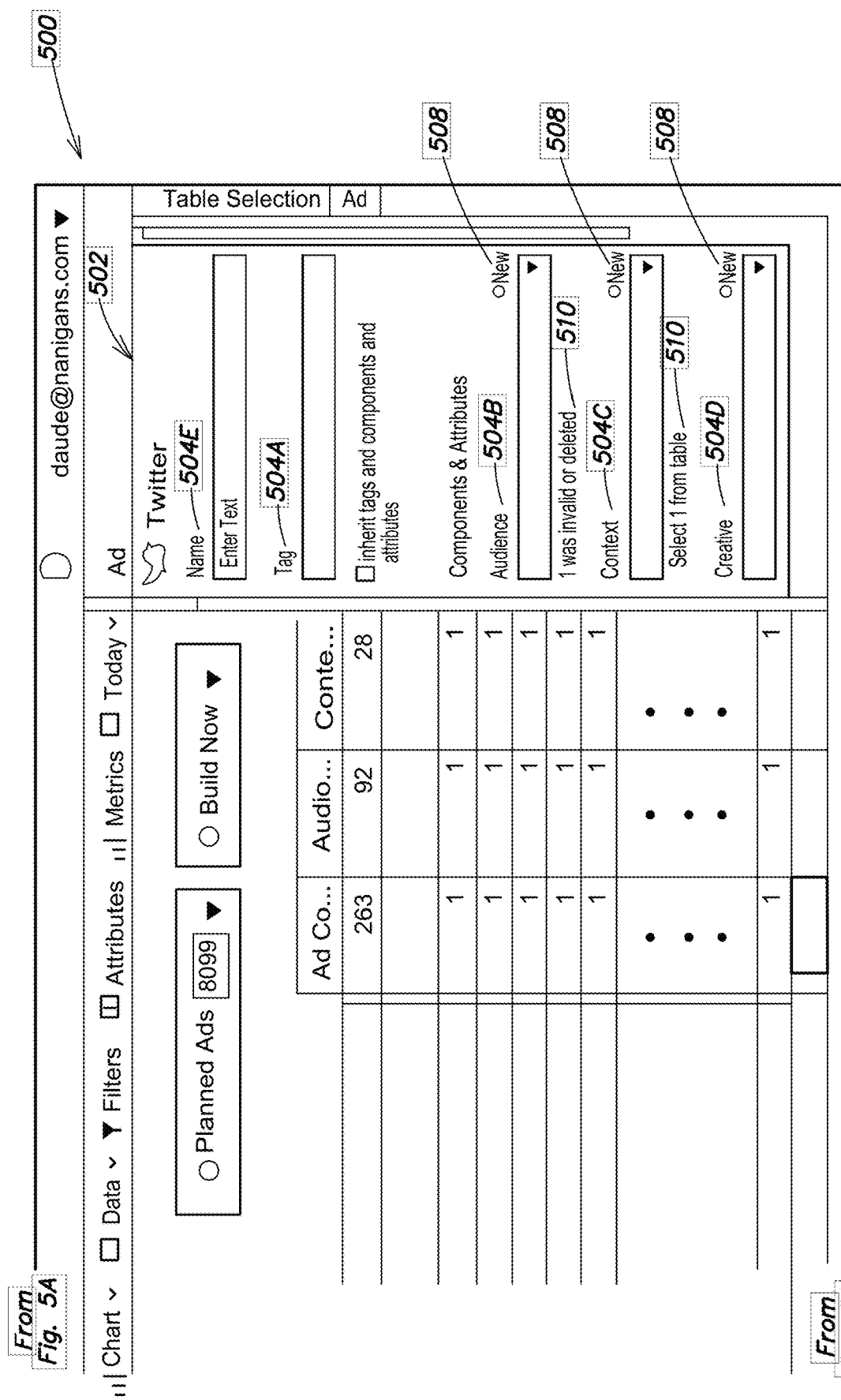

Turning to FIG. 5, FIG. 5 shows a further example of a build panel generated by a user interface of an embodiment. In various embodiments, the user interface 300 of FIGS. 3 and 4 transitions to a display similar to FIG. 5 responsive to selection of one of the build tools 306. As shown in FIG. 5, the build panel 502 is displayed at the right side of the screen and includes various build tools 504A-E adapted to define advertisement parameters of a new advertisement. Build panel 502 includes a name tool 504E, a tag tool 504A, an audience parameter tool 504B, a context parameter tool 504C, and a creative parameter tool 504D. While the name and tag tools are shown as text boxes, and the audience parameter, context parameter, and creative parameter tool are shown as drop down menus, various build tools may be provided, as discussed above. In various embodiments, to facilitate operation of the build tools 504 the user interface 500 may include descriptive dialogue bubbles, which can be displayed, for example, based on the user hovering a display pointer over the build tool. While the build panel 502 of FIG. 5 indicates that the TWITTER channel has already be selected, in various embodiments, any other channel may be selected, as previously discussed with reference to FIGS. 3 and 4.

In various embodiments, each build tool 504, such as the audience parameter tool, context parameter tool, and creative parameter tool, may be adapted to define the respective advertisement parameter responsive to selection of a new advertisement parameter, or selection of an advertisement parameter from a pre-existing advertisement, such as an advertisement listed in a main display 506 of the user interface 500. For instance, the user interface 500 may provide within the build panel 502 a "new" option 508 in addition to the drop down menu, or other input mechanism, of a build tool 504. Activation of the new option 508 transitions the user interface 500 to a display of a more detailed menu permitting the user to specify the attributes of the advertisement parameter corresponding to the selected build tool. In various embodiments, activation of an advertisement parameter within the drop down menu of a build tool 504 imports from the main display 506 the advertisement parameters or attributes corresponding to the advertisement parameter or attributes of an advertisement (or group) identified within the main display 506. For instance, the user interface 500 permits the user to identify advertisement parameters in the main display 506, populates a drop down menu of a build tool 504 with those identified advertisement parameters, and permits the user to define the new advertisement based on a selection of those attributes in the drop down menu. For instance, FIG. 6 shows the "Expedia test" audience parameter from the main display 506 selected within the audience parameter build tool of the build panel 502.

In various embodiments, each build tool 504A-D (e.g., audience parameter build tool, context parameter build tool, and creative parameter build tool) may include a drop down menu (e.g., expansion box) including a listing of audience parameters or attributes. In contrast to defining a new advertisement parameter, each drop down menu provides a listing of pre-determined advertisement parameters corresponding to the particular build tool. For instance, the list of advertisement parameters may include the advertisement parameters of the advertisements listed in the main display 506.

Figure 6A:
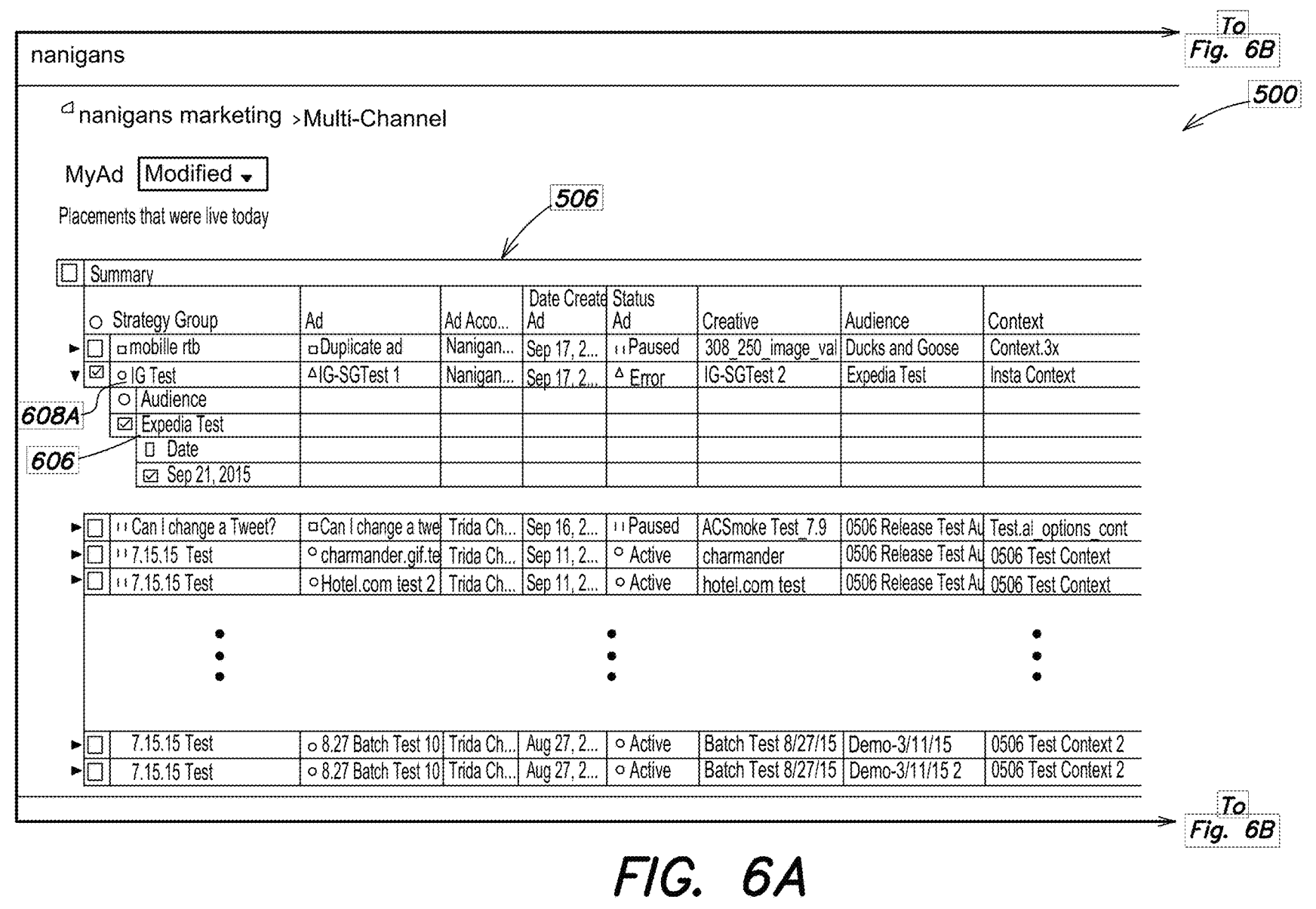
Figure 6B:
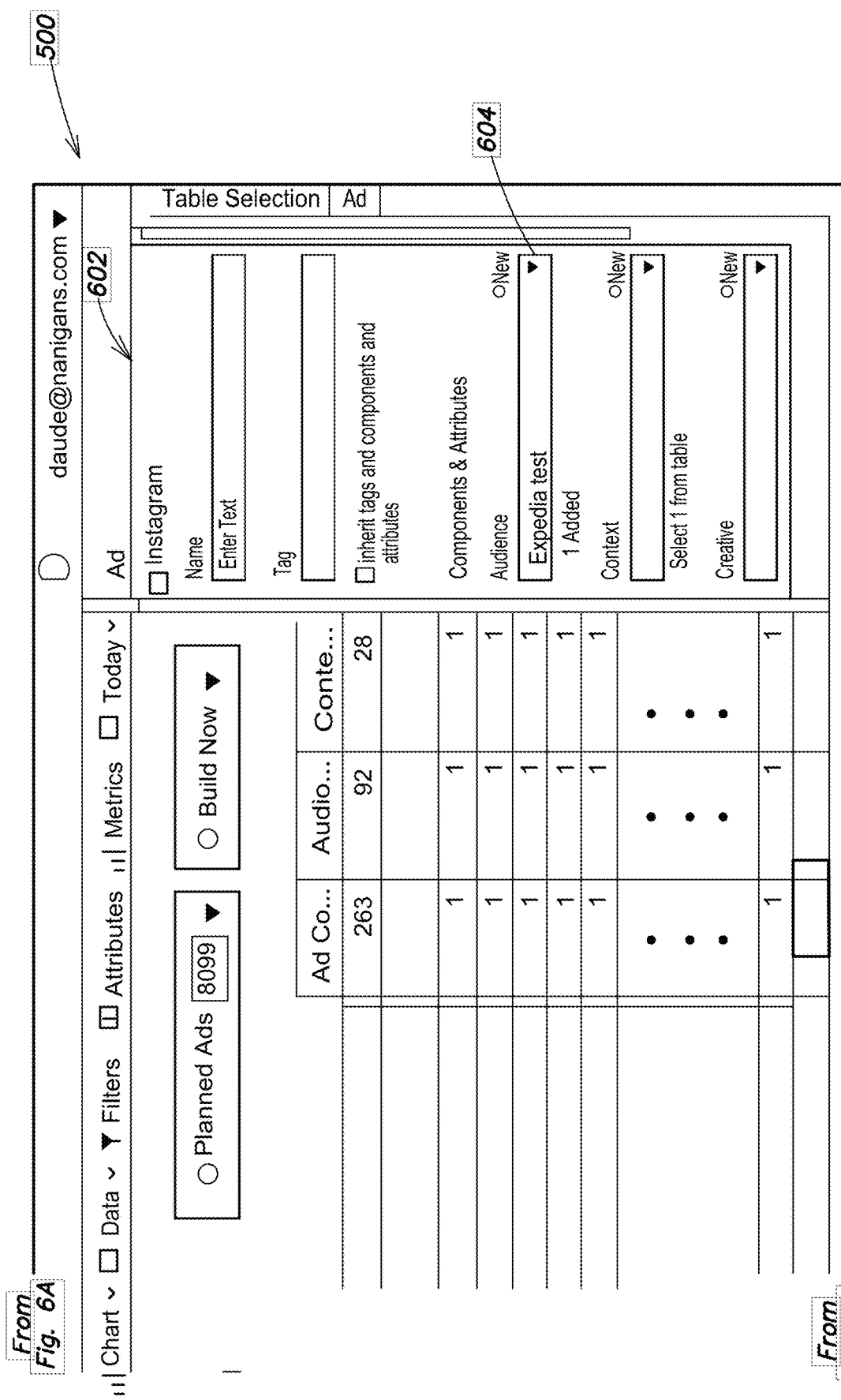

FIG. 6 shows one example of an audience parameter defined for a new advertisement based on a selection of an audience parameter from the "IG Test" strategy group within the main display 506. In one example, selection of the "Expedia test" audience parameter within the build tool is configured to captures the data from the selected advertisement and provides that data to facilitate definition of a new advertisement in the build panel 602. The user interface is configured to capture data from ads selected in the main body and populate that information into the plurality of channels in the build panel (e.g., 306A, 306B, 306C, 306D). In some examples, information selected in the main body 506 is channel specific, and the system translates the channel specific information to channel agnostic object for use in the build panel. In other examples, channel specific data objects for data selected in the main body can be created and made available through the build panel. Shown at 602, are parameters for completing an new advertisement specific to the INSTAGRAM channel. For example, selection in the main body 506 triggers the user interface to automatically make the audience parameters of the selected advertisement or multiple advertisement available in the new advertisement build panel. For example, data based on the attributes of the advertisement parameter of the "IG Test" 608A strategy group (i.e., "Expedia test" parameter at 606 is available for selection at 604). In one example, the body selected parameter is includes as a default operation of the user interface As discussed above, the attributes may include location, gender, age, language, etc. Accordingly, various embodiments of the user interface 500, and in particular the build panel 502 generated by the user interface 500, provide efficient and intuitive organizations of data and metrics that enable a user to easily and expediently generate a new advertisement based on advertisement parameters previously defined for other advertisements.

Figure 7B:
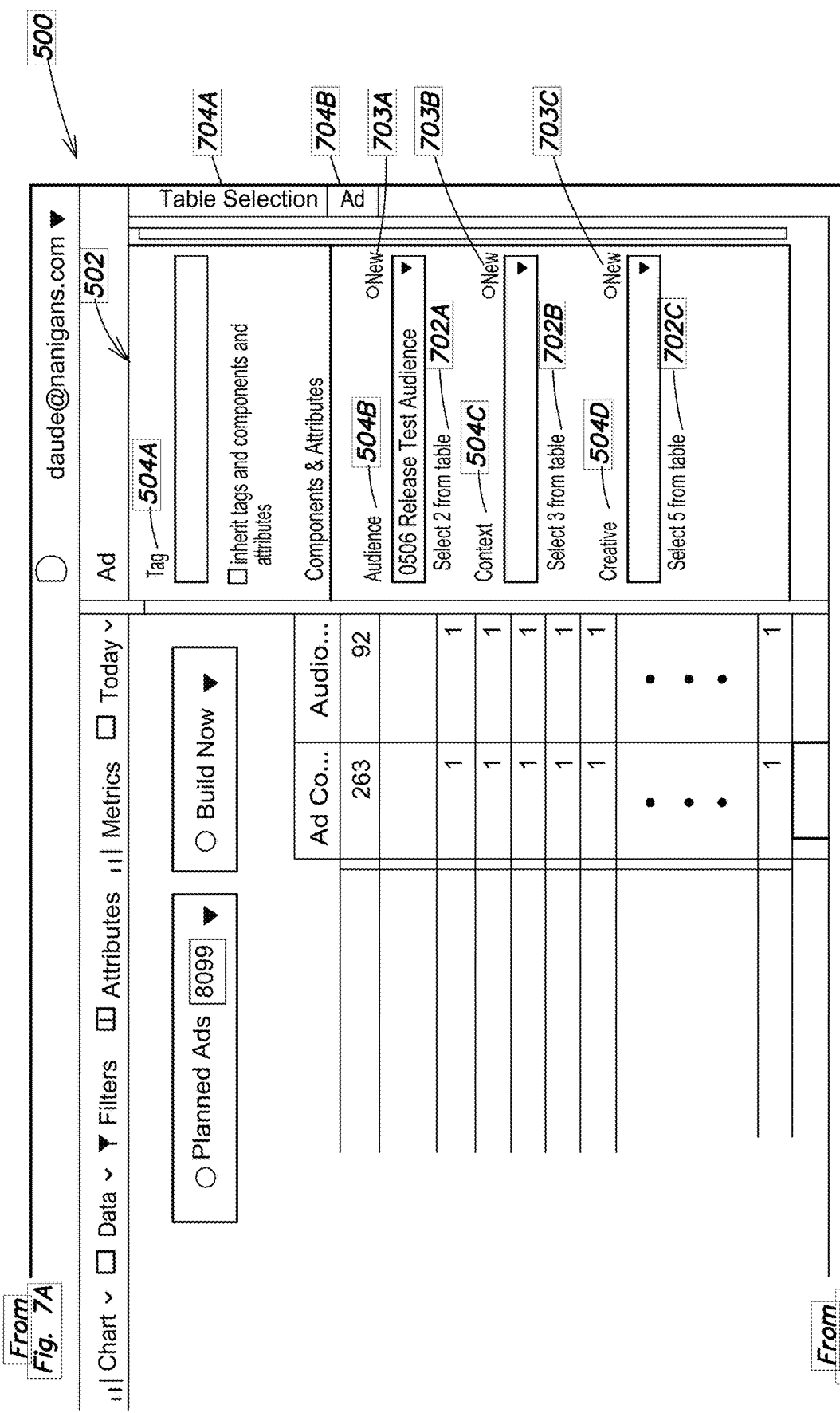

In further embodiments, each build tool may enable a user to define more than one advertisement parameter at a time, or identify those advertisement parameters that will appear in the drop down menu of the build tool 504A-D. Such an embodiment is shown in the view of the user 500 interface in FIG. 7. In various embodiments, the audience parameter build tool may list a plurality of audience parameters within the build tool associated with identification of one or more advertisements or parameters within the main display 506. In such an embodiment, the user interface 500 is configured to dynamically reconfigure the listing within each particular build tool 504A-D according to the identified advertisements, or parameters, within the main display 506. For instance, the build panel 502 of FIG. 7 shows two identifications for the audience parameter build tool, three identifications for the context parameter build tool, and five identifications for the creative parameter build tool. Such options correspond to the selected "Can I change a Tweet?" 710, "7.15.15 Test" 712, "7.15.15 Test" 714, "Gic SG" 718 and "7.15.15 Test" 716 strategy groupings selected within the main display 506. Accordingly, the build panel 502 may further include proximate each build tool 504A-D respective indicators 702A-C displaying the volume of advertisements or parameters identified within the main display 506. In some embodiments, the user interface is configured to accept multiple selections in the main display 506, which results in updating of the build tools indicators at 702A-C responsive to each selection and/or deselection made in the main body 506. The user interface 500 of various embodiments is adapted to sequentially increment the indicated volume responsive to selection of additional advertisements or parameters from the main display 506. Accordingly, various embodiments limit the advertisement parameters selectable within a build tool to those advertisements most relevant to a user. According to some embodiments, the build tools options at 504B-D are dynamically updated, for example, to enable drop down selection of any matching data field and/or date value being selected in main display 506. Such interfaces reduce the number of screens that the system has to render and reduces the number of user interface transitions required to access and display the same information as separate build and/or selection tools. Additionally, the user interface is configured to accept additional specifications in the build tool of new audiences 703A, contexts 703B, and creatives 703C without transitioning out of the build panel display shown in FIG. 7.

In various embodiments, the build tools 504A-D are adapted to define more than one advertisement parameter or attribute. For example, the build tools 504A-D may permit a user to select two audience parameters, three context parameters, and five creative parameters. Such a situation would result in the generation of multiple new advertisements, the multiple advertisements covering each permutation of the combination of selected advertisement parameters. Accordingly, various aspects and embodiments further provide an efficient interface for generating multiple advertisements simultaneously.

In various embodiments, the build panel 504A-D includes a plurality of selectable tabs 704A-B, each tab corresponding to a particular advertisement parameter and including a plurality of build tools (e.g., build tools 504A-D) adapted to define that parameter. According to some embodiments, the selectable tabs (e.g., 704A-B) are displayed along a vertical edge of the build panel bar in the user interface. In some examples, this configuration minimizes the display footprint of the selectable tabs while preserving the user's ability to navigate within any of the parameters of the build panel. In further embodiments, the user is able to navigate within any parameter of the build panel without leaving the context shown in the main body and without leaving the build panel itself. In further examples, each navigation to a build panel parameter can trigger capture of any context information that has not already been captures. For example, context information associated with any selections in the main display 506 is captured an made available, for example, as a drop down selection in the build panel responsive to navigation into the build panel parameter.

Figure 8B:
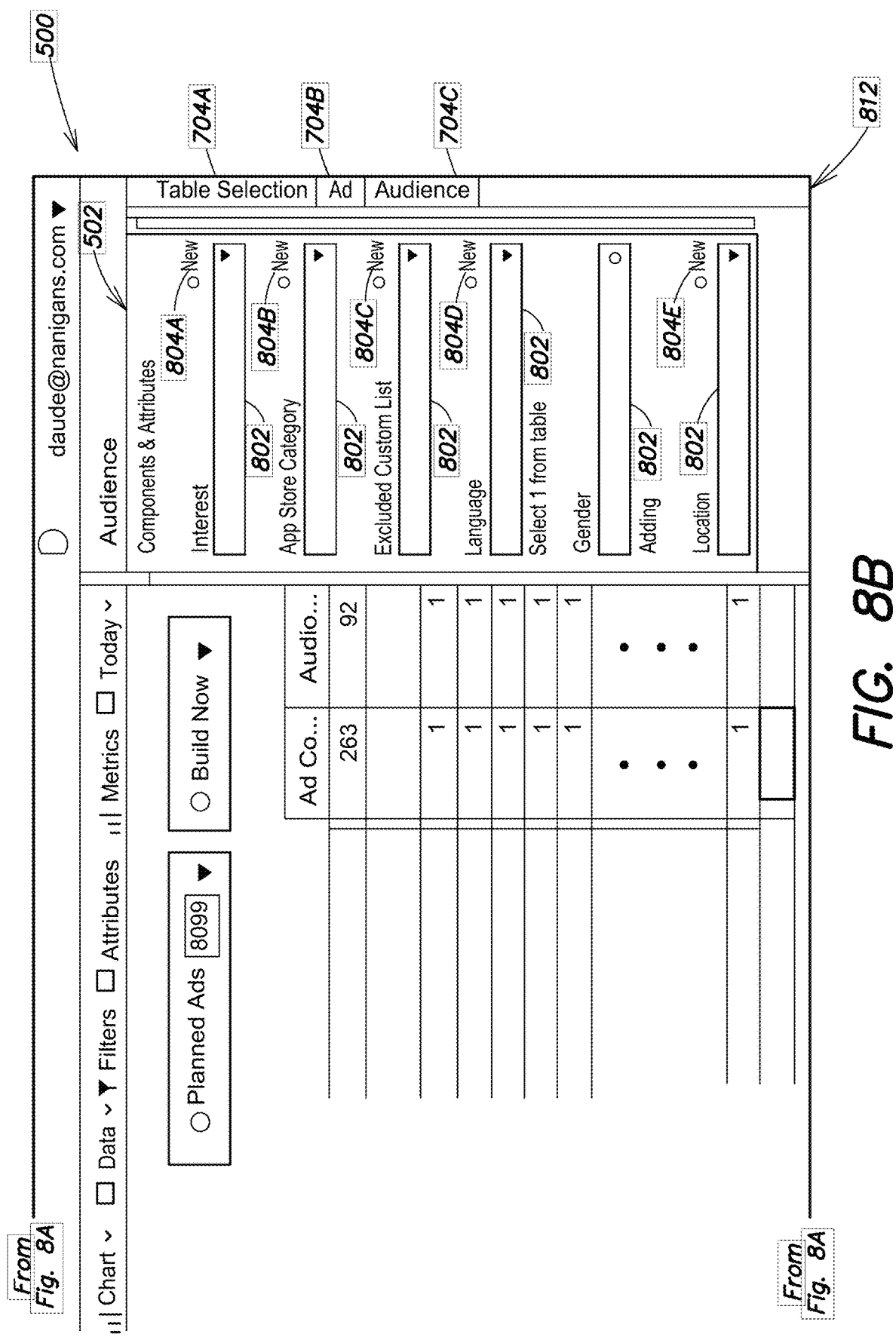
Figure 14B:
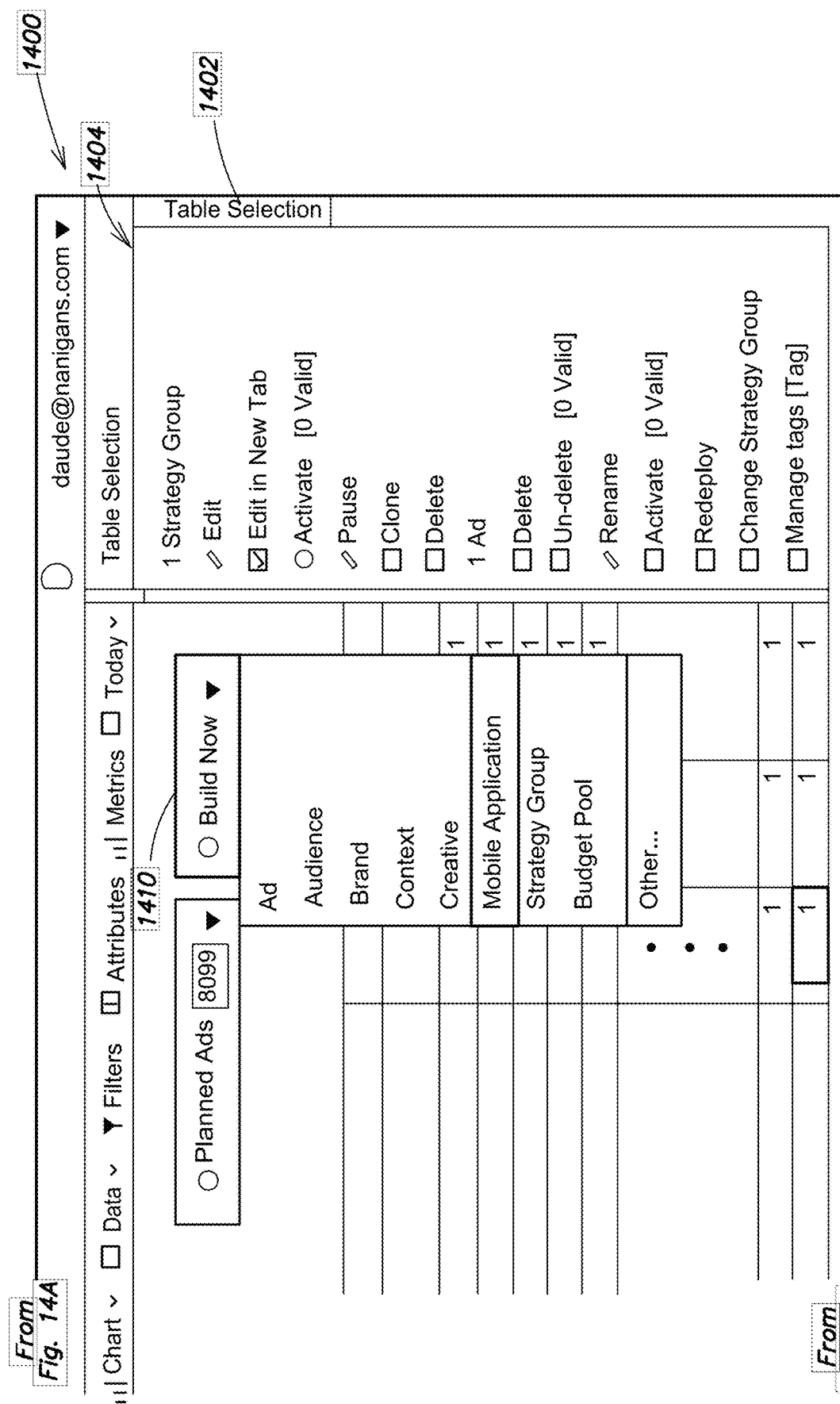

Referring to FIG. 8, the plurality of selectable tabs 704A-C may be arranged in a vertical orientation along a perimeter of the build panel 502; however, other suitable positioning and arrangements may be used. For instance, the plurality of tabs 704A-C may also be positioned along a top perimeter, a bottom parameter, or a left parameter of the build panel 502. According to various embodiments, the navigations tabs are configured to be display progressively, for example, as an end user makes table selection and progresses to a next build panel function a table selection tab 704 is displayed to enable navigation back to table selection functions. FIG. 14 illustrates and example table selection tab 1402 and associated data selections made available by the user interface in the build panel 1404. As discussed above, selection in the main body 1408 captures data associated with those selections and visualizes those selection in the build panel 1404. Build panel navigation can also be executed via display 1410 and selection in the drop down display triggers display of a selected tab (e.g., ad, audience, context, creative, or data selection/management made available in the table selection tab). In FIG. 3, an example audience tab 312 is shown. Similarly, 704C is introduced into the vertical navigation bar 812 as those functions are accessed in the build panel.

In some embodiments, the dynamic vertical navigation bar 812 is specially configured to minimize a display area occupied by the navigation bar 812. In various embodiments, displayable screen space is a scarce commodity, and minimizing the associated screen area for a display while making the associated functions available and useable improves the efficiency of the underlying computer system. For example, preserving context of the main display provides greater data availability and enables selection of the same, while navigating the adjacent build panel that dynamically populates displayed data fields based on the contextual selections in the main body 506. As discussed above, the user interface can automatically translate data selected in the main body 506 to channel agnostic data object that can be used in the build panel. In some examples, specific data may not have a translated data object, but the user interface can identify similar implementations for a given channel or data fields and automatically suggest the similar implementation or similar data field (e.g., by identifying similar named data fields across channels having similar data attributes (e.g., searching for similar field names, field attributes, etc.)).

Responsive to selection of a tab 704A-C, the user interface 500 is adapted to transition a display of the build panel 502 to an arrangement of build tools corresponding to the advertisement parameters or functions associated with the tab selected. For example, the view of FIG. 8 shows the audience parameter tab selected, and the user interface 500 displaying a plurality of audience parameter build tools 802 corresponding to attributes for interest, category, excluded custom list, language, gender, and location. As discussed above, within each audience parameter build tool 802 the user interface 500 permits the user to select one or more attribute to define a the audience parameter. For instance, the user interface 500 may provide within the build panel 502 a build tool consisting of a drop down menu of listed attributes, or a "new" option (e.g., 804A-E). Activation of the new option (e.g., 804A-E) transitions the user interface 500 to display a more detailed menu permitting the user to specify the attributes of the advertisement parameter corresponding to the selected build tool, or the particular details of a selected attribute. Engagement with the drop down of the build tool of one embodiment menu imports from the main display 506 the advertisement parameters or attributes corresponding to the advertisement attributes of an advertisement (or group) identified within the main display 506.

Figure 9A:

As discussed herein, in various embodiments, each build tool of a build panel of various embodiments, such as the audience parameter tool, context parameter tool, and creative parameter tool, may be adapted to define a respective advertisement parameter responsive to selection of a new advertisement parameter. For instance, activation of a new option (e.g. 804A-E) transitions the user interface 500 of FIG. 8 to display a more detailed menu permitting the user to specify the attributes of an advertisement parameter corresponding to the selected build tool. FIG. 9A shows a view of the user interface 500 in which an advertisement parameter attribute window 902 is provided. For example, responsive to selection of 804C the user interface transitions to an overlay display 902. As shown, the user interface 500 may generate and deliver the window 902 superimposed over the main display 506 and build panel 502. In various embodiments, the advertisement parameter attribute window 902 is within focus, and the main display 506 and build panel 502 are out-of-focus (i.e., blurred, greyed-out, or slightly darkened compared to the advertisement parameter attribute window). As shown in the view of FIG. 9A, the advertisement parameter attribute window 902 (e.g., "New Excluded Custom List") provides a more detailed listing of build tools adapted to define attributes of a given advertisement parameter or the details of a particular attribute.

For purposes of explanation, the window 902 shown in the view of FIG. 9 includes a window for an excluded custom list attribute within the audience parameter of a new advertisement. In various embodiments, the excluded custom list is a negative attribute in the sense that it defines the audience parameter by what audience characteristics should be avoided. For example, the build tools within the window 902 permit the user to select an audience for which the new advertisement should not be delivered. A Name build tool 904 defines an alphanumeric identifier for the excluded custom list attribute, a tag build tool 906 specifies a tag for the attribute, and a select values build tool 908 specifies one or more values for the attribute. In various embodiments, each of these build tools may further include a new option. Accordingly, the user interface 500 enables the user to drill down to greater levels of specificity when defining a particular advertisement parameter or attribute.

In various embodiments, the user interface 500 is configured to dynamically generate a compatibility analysis of the new advertisement with one or more destination channels based on the specified advertisement parameters and attributes. It is appreciated that various destination channels may have limiting restrictions and capabilities. Accordingly, while the user is interacting with the one or more build tools of the window 902, the user interface 500 may be dynamically generating and displaying one or more indicators 910A-D providing the compatibility of the new advertisement with a particular destination platform. For instance, the view of FIG. 9A shows the new advertisement having compatibility with the destination channels of MOBILE EXCHANGE 910A, TWITTER 910B, INSTAGRAM 910C, and FACEBOOK 910D. In further embodiments, the user interface can analyze in real time (e.g., as an ad is being created, data entered field by field) compatibility with advertising channels. In some examples, the user interface can advise the user immediately upon data entry and/or changes that causes a failed compatibility check. In further examples, the user interface can highlight a failed compatibility check for a channel and highlight the data field, entry, and/or change that caused the failed compatibility check. In one example, the excluded custom list is validated against compatibility rules as the user interface accepts specification of the data attributes of the excluded custom list. Visual indicators associated with 910A-D can change and/or be highlighted in conjunction and/or responsive to evaluation of compatibility, In further embodiments, the visual highlighting for a change in compatibility at 910A-D can also be accompanied by visual highlighting of the data element(s) that caused the compatibility change (e.g., shown in same color, highlight, etc.).

In various embodiments, a user interface component, or a component of a system including the user interface 500 (e.g., a translation component), dynamically executes one or more translation rules based on the particular selected parameters and attributes. Translation rules may include build associations between a first provider format for advertising data and a destination formation for advertising data. In some examples, the translation component includes information on data structures used by a first provider and mappings to data structures used on the destination system. Accordingly, the translation component enables detection of compatibility of a specified attribute or parameter with a given destination channel. In particular, the translation component may include channel-specific modules which define channel restrictions and capabilities. Restrictions may reflect the structure of a particular channel, and may be dynamically created or queried from a destination channel via one or more APIs. Each channel-specific module communicates the particular capabilities via a cross-channel generics API within the system of one embodiment, which provides a common structured interface for such functionality. System structure, translation rules, and channel restrictions are further described below with reference to FIG. 19.

Figure 9B:
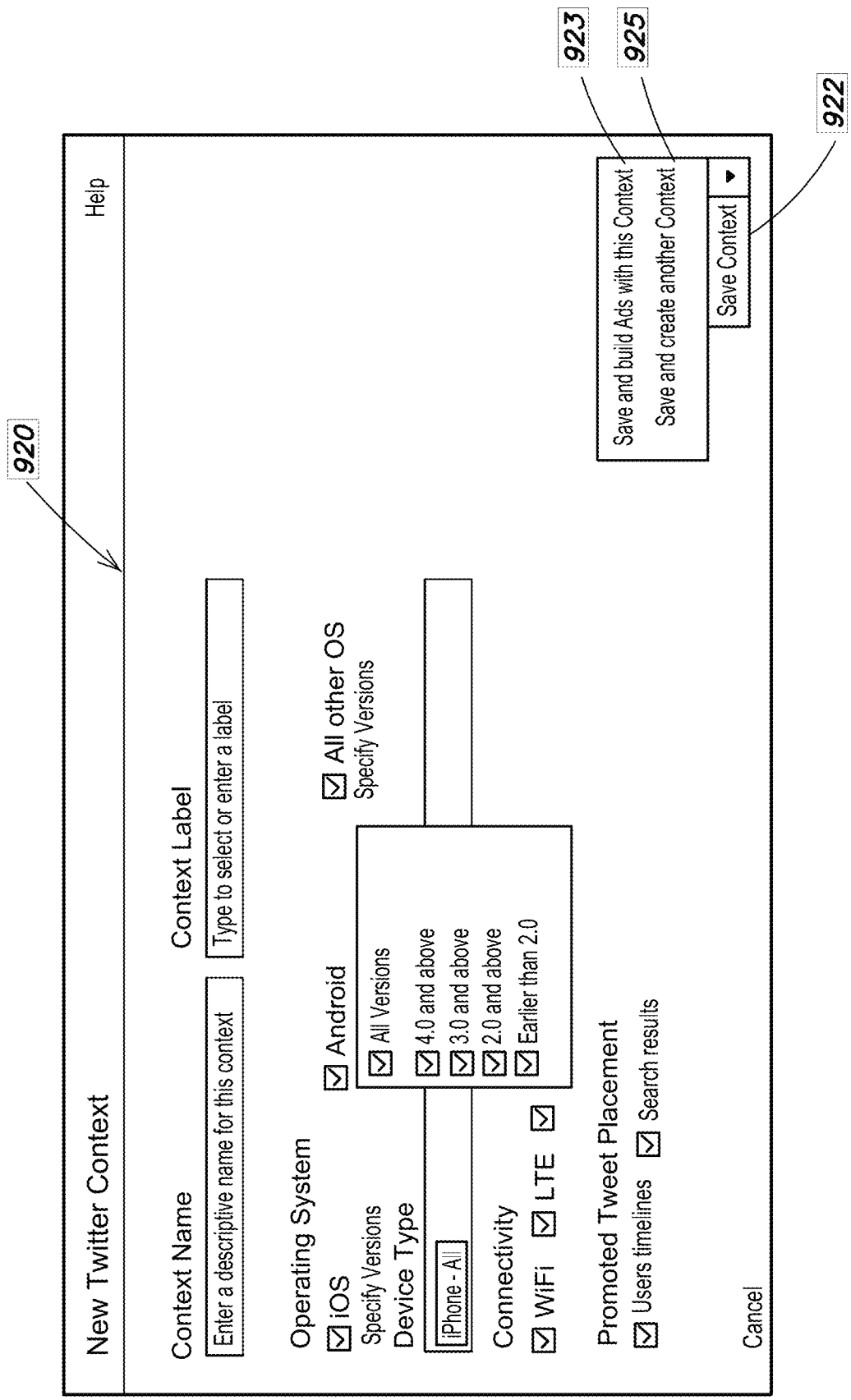
Figure 9D:

FIGS. 9B-9D show various embodiments of an advertisement parameter attribute window for various other advertisement parameters and attributes. In particular, the view of the window 920 shown in FIG. 9B corresponds to a context parameter, the view of the window 930 shown in FIG. 9C corresponds to an audience parameter, and the view of the window 940 shown in FIG. 9D corresponds to a creative parameter. As discussed above, in various embodiments the user interface 500 transitions to the view of the windows shown in FIGS. 9B-9D from the view shown in at least FIG. 6 responsive to selection of a new option related to a particular advertisement parameter.

Referring to FIG. 9B, the window 920 generated by the user interface 500 includes build tools corresponding to attributes of a context parameter to be generated. In various embodiments this includes at least a build tool for generating an alphanumeric identifier (i.e., name), a context label, an operating system, a device type, a connectivity, and a promoted tweet placement. Responsive to selection of a save indicator 922 within the window 920, the user interface 500 is configured transition back to the view demonstrated in FIG. 6, for example, and populate at least one of the build tool 504A-D drop down menus with the build parameter specified in the window. In some embodiments, the user interface is configured to save the new context and build new advertisements using the new context responsive to selection (e.g., at 923). In other examples, the new context defined can be saved, and additional contexts can be created responsive to selection in the user interface (e.g., at 925).

Turning now to FIG. 9C, FIG. 9C shows one example of a view of an advertisement parameter attribute window 930 that corresponds with an audience parameter (e.g., "New Twitter Audience" 931A). In various embodiments, the window 930 includes build tools for generating attributes including an audience name 931B, an audience label 931C, a primary targeting method 931D, keyword groups (931E— specify broad match keywords and/or exact match keywords), keyword options 931F, gender 931G, country 931H, age ranges 931I, language 931J, and custom list exclusions 931K (e.g., custom list exclusions described above with reference to FIG. 9A). In some examples, primary targeting methods can include: followers, interests, keywords, tailored audiences, TV targeting, and/or events. As described above, responsive to selection of a save indicator 932 within the window, the user interface 500 is configured transition back to the view demonstrated in FIG. 6, for example, and populate at least one of the build tool drop down menus with the build parameter specified in the window 930. FIG. 9C can also display an estimated audience reach at 933. In one example, the system is configured to calculated an estimated audience dynamically, as parameters are specified in the user interface. In some embodiments, any specification of attributes before reaching FIG. 9C can be used to calculated the estimate audience reach. In others, the estimate is based on selection made within the display shown in FIG. 9C.

Referring to FIG. 9D, FIG. 9D shows a view of an advertisement parameter attribute window 940 corresponding to a creative parameter. In various embodiments, the window 940 includes build tools for generating attributes including Twitter Account, Application ID, Application Deeplink, Tweet Copy including text to be used in the main body of the advertisement, one or more images, and a creative label. In various embodiments, the window 940 additionally includes a preview 942 of the advertisement based on the attributes selected in the build tools of the window 942. Selection of a build creatives indicator 944 within the window 940 causes the user interface 500 to transition back to the view demonstrated in FIG. 6, for example.

Figure 10B:
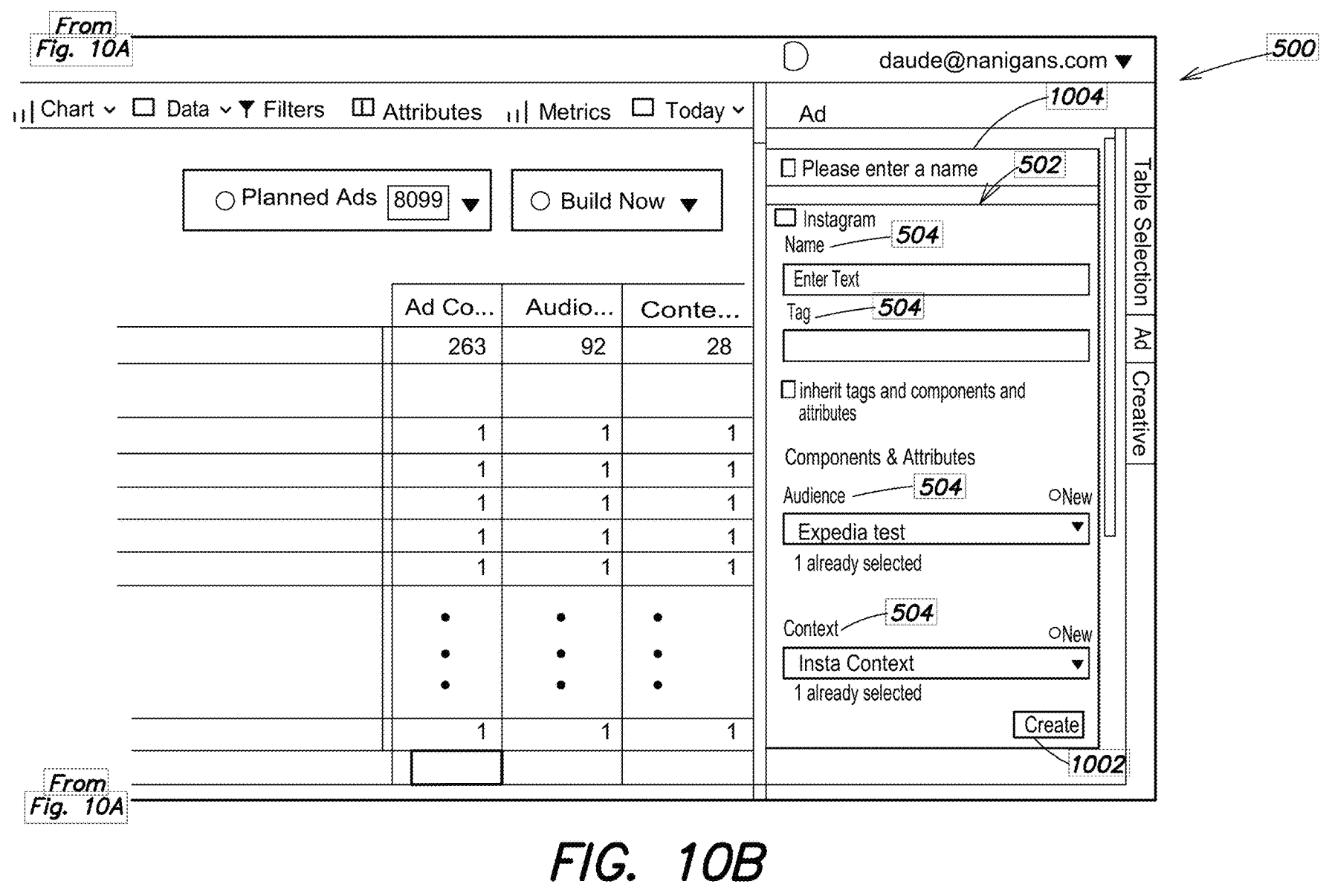

Referring now to FIG. 10, responsive to selection of various advertisement parameters via one or more build tools 504 within a co-displayed build panel 502, the user interface 500 may display a create indicator 1002 permitting the user to generate the new advertisement or multiple permutations of advertisements. Selection, for example by a user, of the create indicator 1002 causes the user interface 500 to prompt a processor in communication with the user interface 500 to generate the advertisement or permutations of advertisements and deliver the advertising to the selected destination channel(s) (e.g., TWITITER, FACEBOOK, INSTAGRAM, etc.). The user interface 500 may be adapted to dynamically re-display the main group 506 to include the new advertisements and related advertisement data.

As discussed above, the new advertisements may be grouped or displayed according to one or more demographic hierarchies. However, occasionally insufficient attributes will have been selected to properly define an advertisement parameter. Additionally, one or more advertisement parameters may have not been defined within the build panel 502. Generating an advertisement, or group of advertisements, based on such parameters (or the absence thereof) would lead to undesirable results such as incorrect advertisements, incorrect destination channel, misleading advertisements, or other advertisements that were not intended by the user.

Accordingly, in various embodiments the user interface 500 is adapted to validate the selected advertisement parameters prior to generating the new advertisement or advertisement groups based on one or more executed validation rules. Validation rules may consist of pre-defined tests configured to verify the proper parameters have been defined to generate an advertisement. In various other embodiments, validation rules consist of pre-defined tests configured to detect duplicate advertisements.

In various embodiments, the validation rules are configured to validate the definitions defined by each build tool within the build panel. Responsive to executing the validation rules, one or more failures may result, and responsively, the user interface may generate an error message 1004 detailing such failure. In such an instance, the user interface 500 may be adapted to generate and display the error message 1004 in the build panel 502. In various other embodiments, execution of the validation rules may cause the user interface 500 to transition to a validation report delivered in one or more ad build validation windows.

Figure 11:
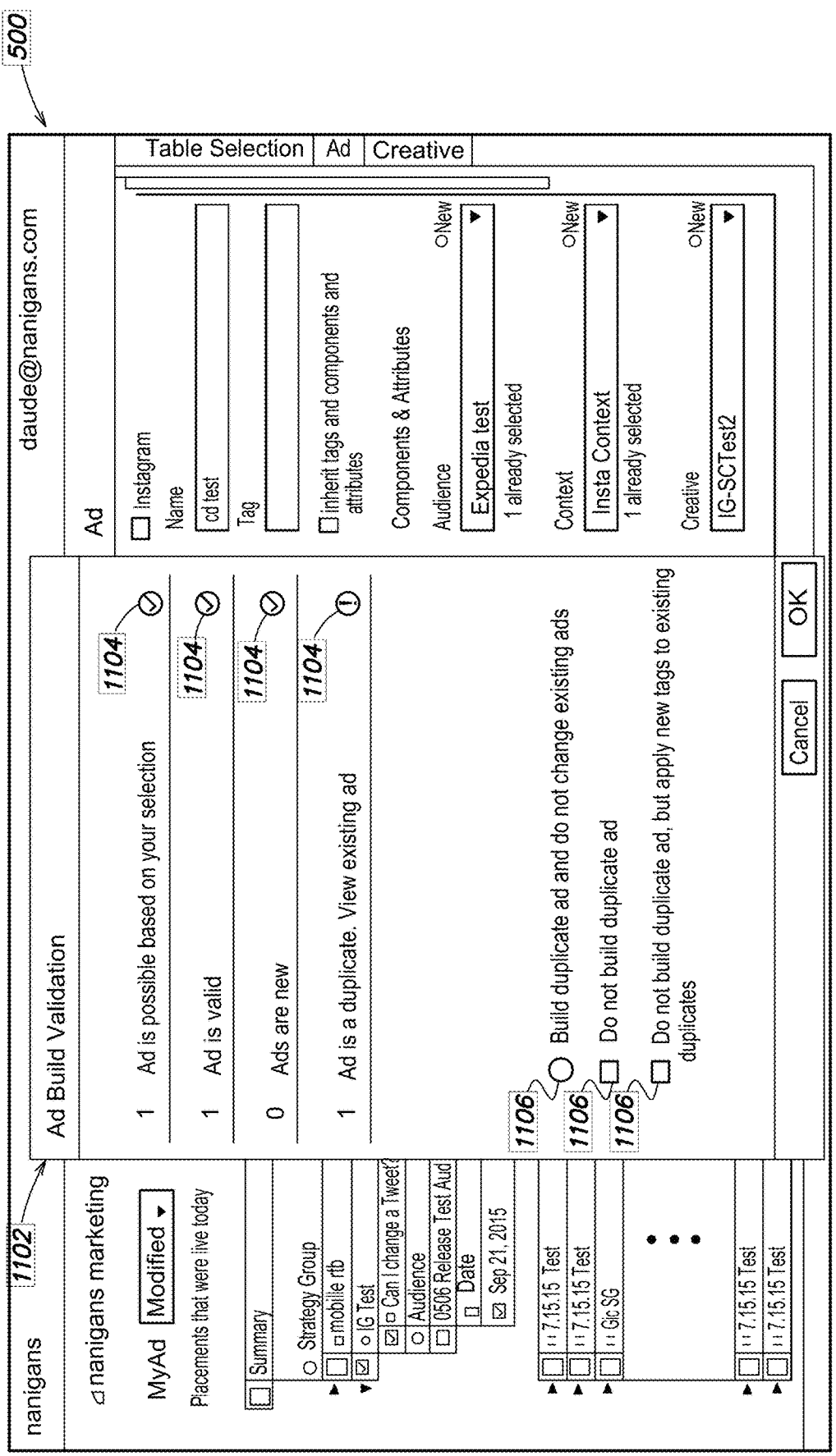
FIG. 11 shows a view of an example user interface, according to various aspects and embodiments.

In one particular implementation, the user interface 500 is adapted to dynamically generate a validation report window and display the validation window superimposed over the main display area and the build panel, as shown in the view of FIG. 11. The validation report 1102 may include a pass/fail indicator 1104 for each validation rule executed. For instance, the validation report shown in FIG. 11 includes pass indicators 1104 for an "ad is possible based on your selections" rule, an "ad is valid" rule, and an "ads are new" rule. However, the validation report 1102 shows a fail indicator for an "ad is a duplicate" rule. The user interface 500 may dynamically expand a portion of the validation report 1102 corresponding to a particular validation rule in response to user selection of that section. For example, the view of FIG. 11 shows the user interface 500 having expanded the "ad is a duplicate" portion of the validation report 1102. In various embodiments, the expansion may further provide additional details regarding the results of the executed validation rule, such as an explanation or series of diagnostics as to why the specified new advertisement parameters failed a particular validation rule.

As shown, and in various embodiments, an advertisement may fail an "ad is a duplicate" validation rule, where one or more processors in communication with the user interface 500 are configured to dynamically compare the advertisement parameters specified in the build panel 502 with the advertisement parameters of pre-existing advertisements. A direct match between advertisement parameters of a pre-existing ad and the specified new advertisement may result in the type of error shown. The validation report 1102 may provide one or more links, the activation of which causes the user interface 500 to transition to a visual display of the advertisement parameters, advertisement data, and/or advertisement metrics of the pre-existing duplicate advertisement. In further embodiments, selection of one or more buttons 1106 within the validation report 1102 causes the user interface 500 to proceed with generation of the new advertisement, cease generation of the new advertisement, or cease duplication of the advertisement, but persist tags specified for the new advertisement for the existing duplicate advertisements.

Figure 12B:
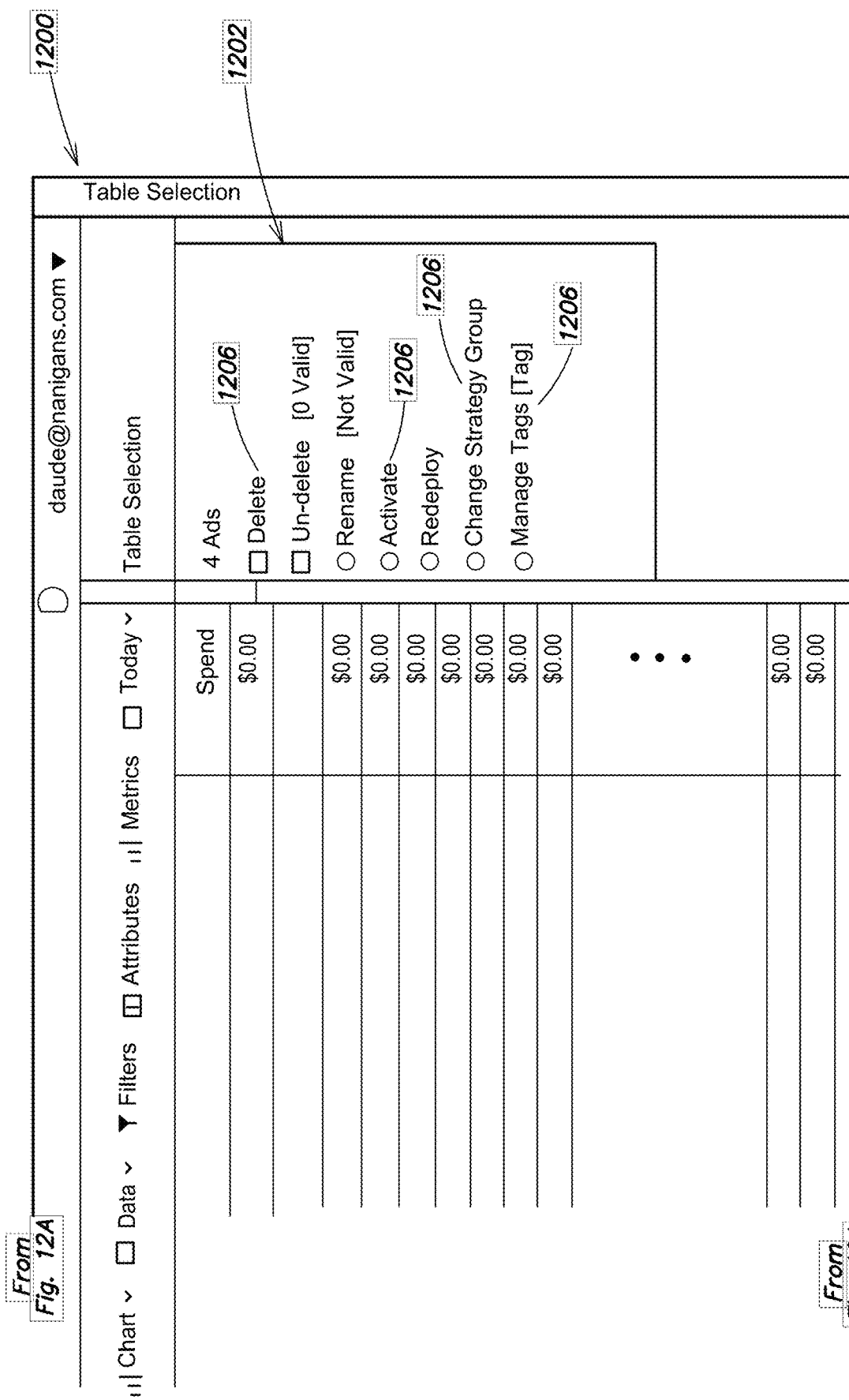

Turning now to FIG. 12, in various embodiments a user interface 1200 may be adapted to generate an editing panel 1202, for instance, responsive to user selection of editing indicator in the visual display. FIG. 12 shows one view of an example where the editing panel 1202 is coextensively displayed with a main body 1204 of the user interface 1200.

In particular, the editing panel 1202 may be positioned along a perimeter of the user interface 1200, as discussed above with reference to the build panel 302 of at least FIG. 3. In particular, the edit panel 1202 may be positioned along a perimeter of the user interface 1200, such that a user may effectively review and/or manage advertisement data or metrics within the main body 1204 while editing a particular advertisement within the edit panel 1202. It is appreciated that often users will be interested in advertisements that are performing well, and accordingly, want to edit the advertisement parameters of a pre-existing advertisement based on the advertisement parameters of those advertisements performing successfully (e.g., high conversion rates, high impressions, high views, etc.). Various aspects and embodiments address this desire by providing an editing panel 1202 including or more selectable editing tools 1206 adapted to edit advertisement parameters for a pre-existing advertisement including advertisement parameters maintained from an advertisement included in the main display.

In the editing panel 1202, selection of each edit tool 1206 triggers the respective action for the specific editing tool. For instance, editing tools 1206 may correspond to activation, deletion, redeployment, changing a strategy group, or managing tags. Any editing tool 1206 selected within the editing panel 1202 can be executed on a particular advertisement within the main display 1204. For example, any editing tool 1206 shown in the editing panel 1202 can be executed on a user selected advertisement within the main display 1204. In various embodiments, editing tools 1206 may be executed on a group of selected advertisements as shown in the view of FIG. 12, or a strategy group of advertisements, as shown in FIGS. 13 and 14.

In various embodiments, the user interface 1200 is adapted to automatically generate a build panel responsive to activation of a build indicator included in the editing panel. For instance, selection of the "clone" editing tool 1302 within the editing panel 1304 of FIG. 13 causes the user interface 1300 to generate and display a build panel, such as the build panel 502 discussed above with reference to FIG. 5. In various embodiments, responsive to selection of the "clone" editing tool 1302, the user interface 1300 imports into each build tool of the generated build panel advertisement parameters from an identified advertisement, or advertisement group, within a main display 1306 of the user interface 1300. Accordingly, various embodiments permit a user to duplicate one or more advertisements that are performing well.

Figure 15A:
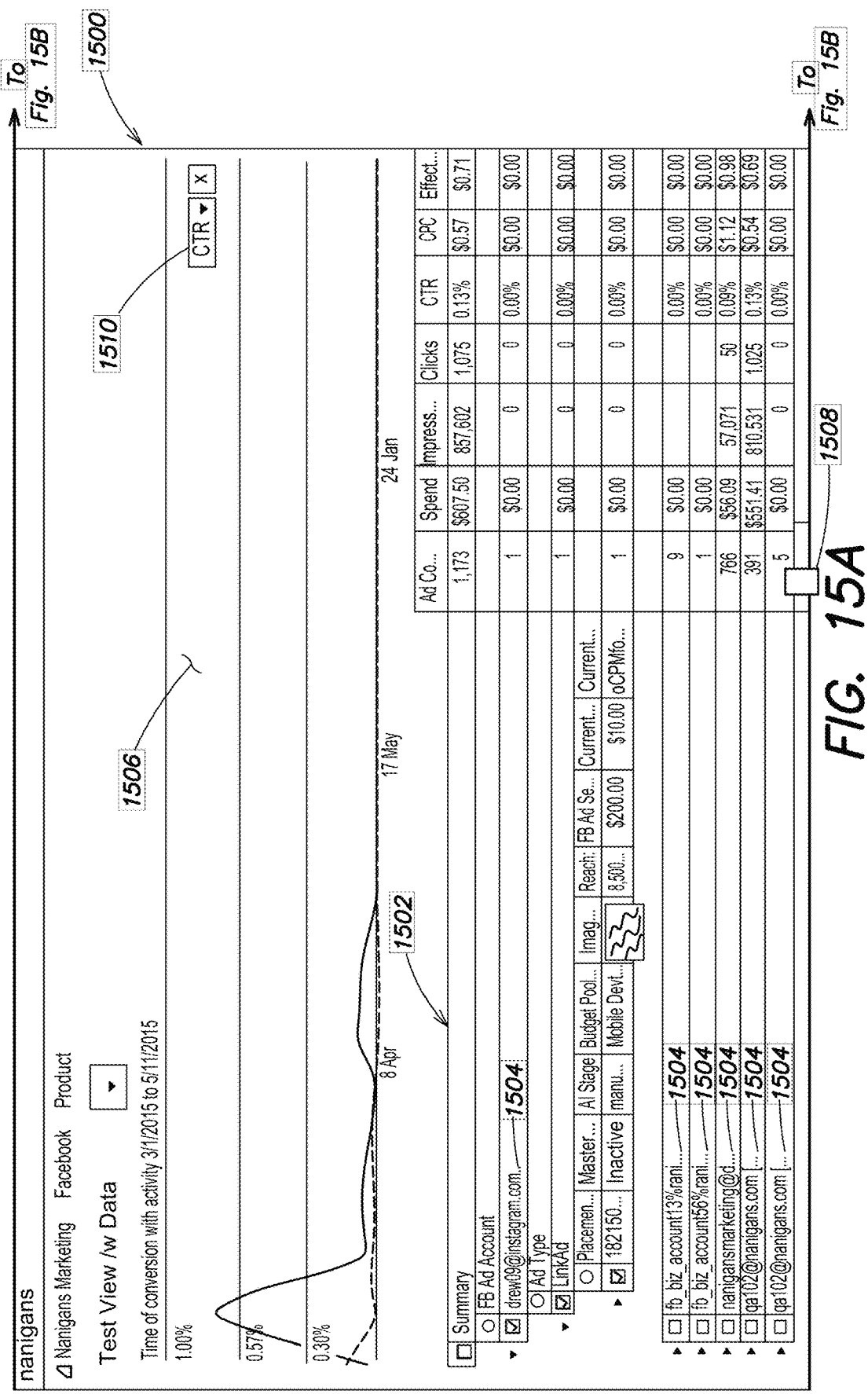

FIG. 15 shows a higher level summary view of summary groups 1504 listed within a main display 1502 of a user interface 1500 of one embodiment. As previously discussed, responsive to selection of a particular summary group 1504 the user interface 1500 may be adapted to expand the selected summary group 1500 to provide a listing of advertisements within the particular grouping. FIG. 15 shows such an expansion. In various embodiments a graphical illustration 1506 of metrics associated with a selected strategy group(s) may be delivered to a user within the user interface 1500 coextensive with the advertisement data. For instance, the view of FIG. 15 shows a graphical representation of fees associated with advertisements over a given time period. Various metrics may be shown in the graphical illustration 1506 responsive to selection of one or more metrics within the main display 1502 or a display of additional information or metrics separated by a navigable separator 1508. For instance, metrics provided in the user interface 1500 of FIG. 15 may include ad count, spend, impressions, clicks, CTR, and CPC among others. A drop down menu 1510 within the visual illustration causes the user interface 1500 to transition the graphical illustration 1506 to a depiction of the selected metric.

Figure 16A:
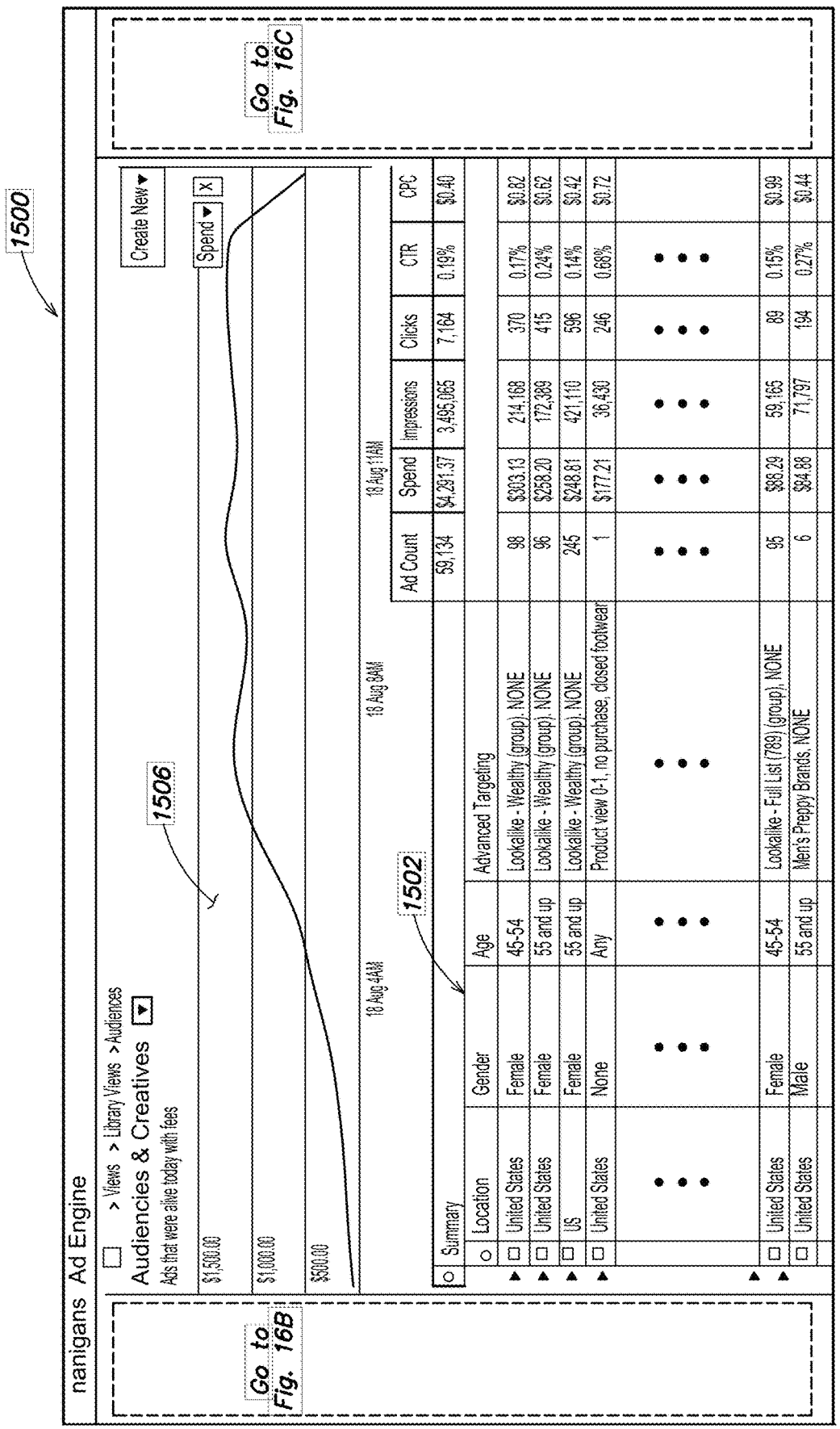
Figure 17A:
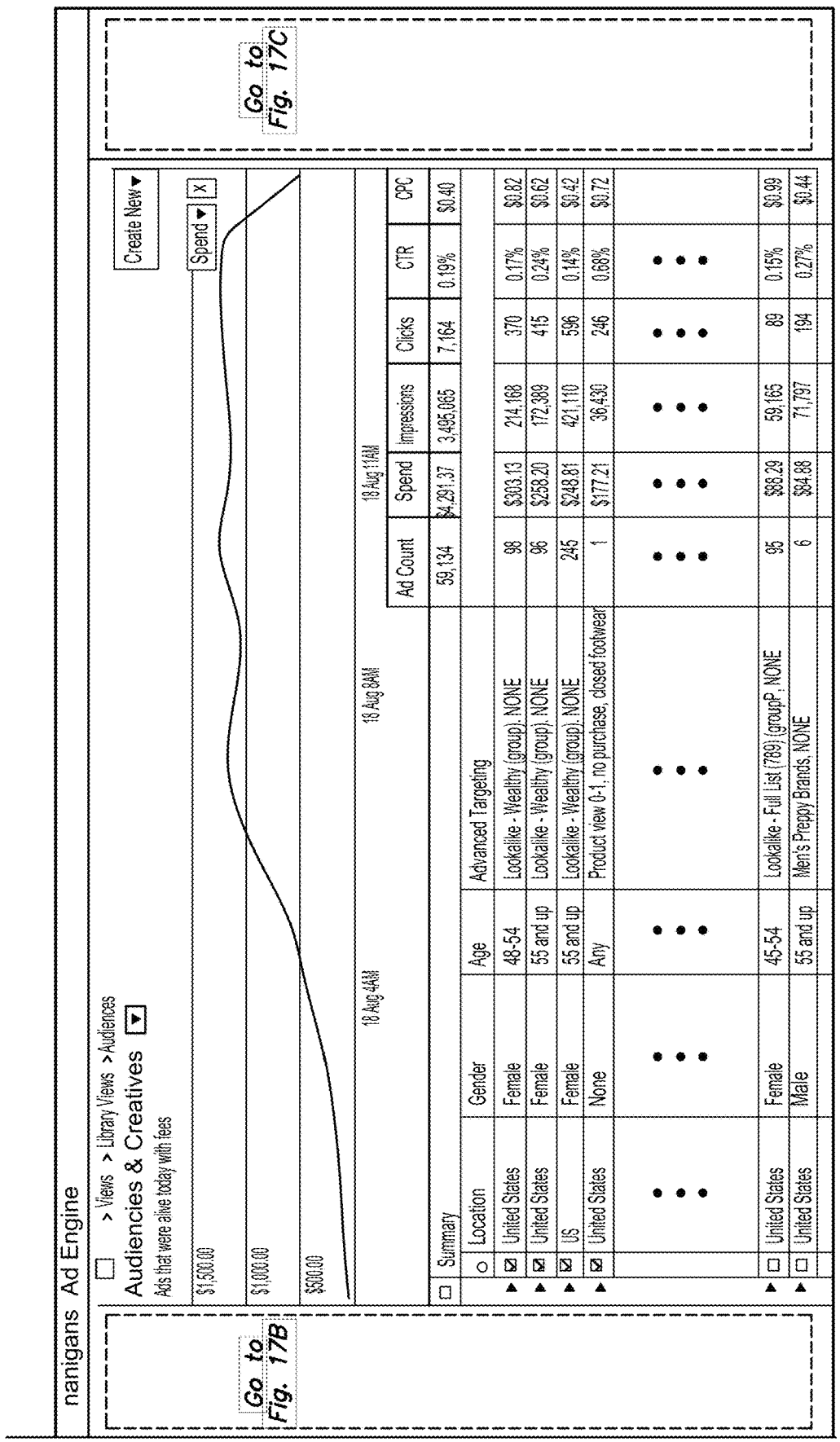
FIGS. 17A-C show a view of an example user interface, according to various aspects and embodiments.
Figure 17C:
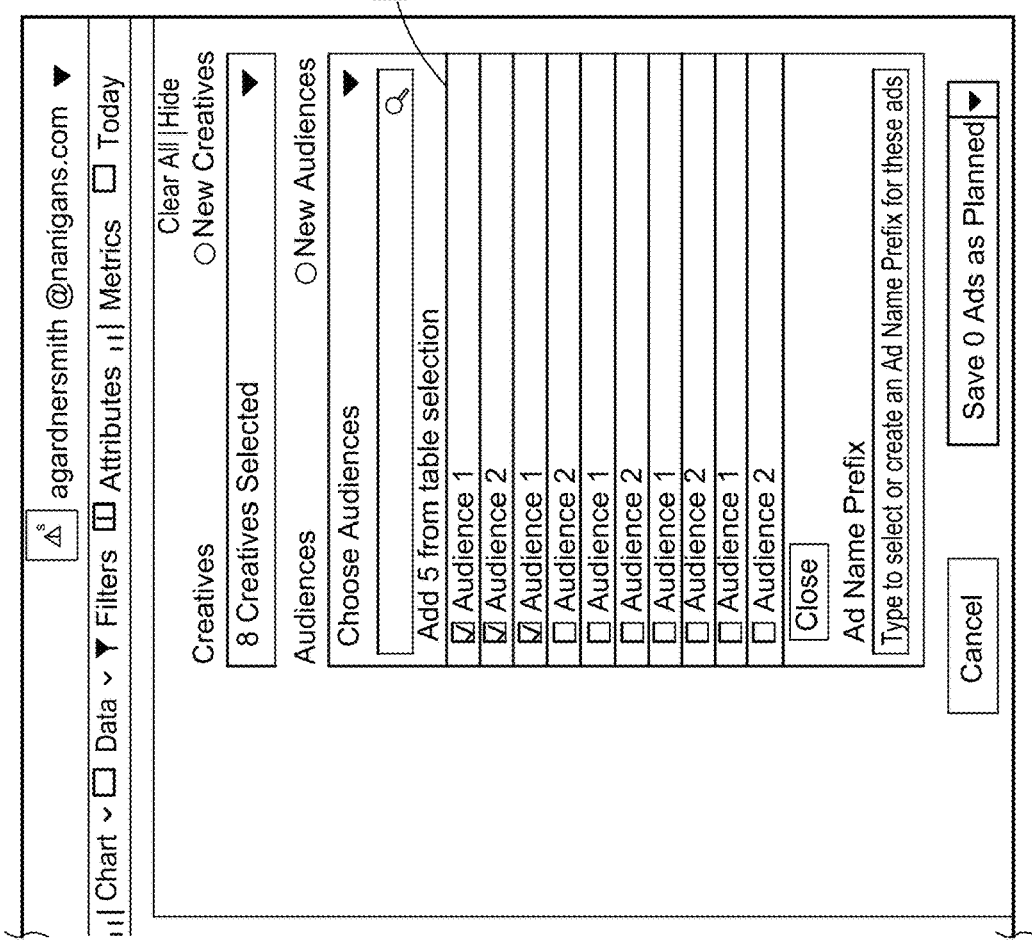
Figure 17B:
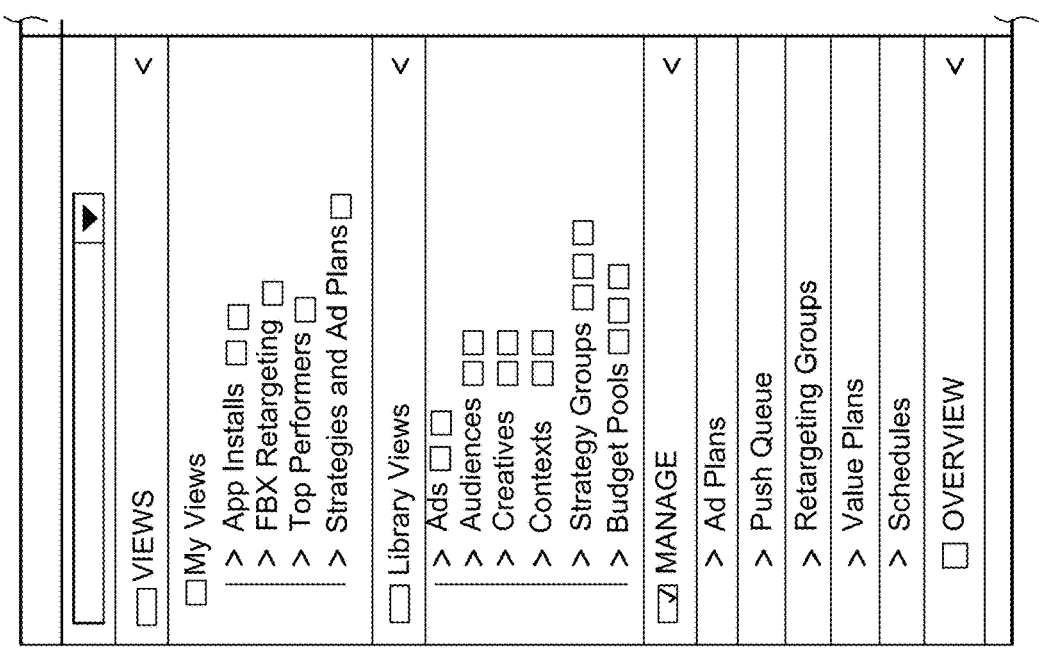

FIG. 16 shows a further view of the user interface 1500 described with reference to FIG. 15. In various embodiments, the user interface 1500 is adapted to generate and deliver one or more action panels coextensive with the advertisement data or metrics, such as the advertisement data within the main display 1502. In particular, the view of FIG. 15 shows a build panel 1604 positioned along a right perimeter of the visual display and a view panel 1606 positioned along a left side of the visual display. The build panel 1604 may include the build panel 502 described above with reference to FIG. 5. As shown, the build panel 1604 includes one or more build tools 1608 for defining the advertisement parameters of a new advertisement, or various permutations of a new advertisement. The build panel 1604 of FIG. 16 shows multiple advertisement parameters defined for each of a creative parameter, an audience parameter, a context parameter, along with a destination, a strategy group, an ad label, and an ad name prefix. In particular, eight creative parameters have been selected, three audiences have been selected, and two contexts have been selected. Such a designation of advertisement parameters would result in generation of twenty-four permutations of advertisements. In various embodiments, selection of a build tool 1608 corresponding to an advertisement parameter causes the user interface 1500 to transition to an expanded drop down menu of selections for the particular advertisement parameter. Such a view is shown in FIG. 17. In particular, FIG. 17 shows a drop down menu 1702 of advertisement parameters corresponding to an audience parameter of a new advertisement to be generated. Options within the list of audience parameters in the drop down menu 1702 may correspond to one or more advertisements within the main display, as discussed above.

Returning to FIG. 16, coextensive with the build panel 1604, the user interface 1500 is adapted to generate and provide the view panel 1606. In various embodiments, the view panel 1606 includes an arrangement of view tools 1610 the selection of which cause the user interface 1500 to transition and rearrange the advertisement data or metrics provided in the main display 1502, an additional display, or the graphical illustration 1506. Views may be provided based on user created and saved views, a selection of previously generated and stored views recalled from a storage medium (e.g., library views), and one or more view management tools. Within the My Views view tool, advertisement data and metrics may be re-arranged according to App installs, FBX Retargeting, Top Performers, and Strategies & Ad Plans. Within the Library Views tool, advertisement data and metrics may be re-arranged according to Ads, Audiences, Creatives, Contexts, Strategy Groups, Budget Pools, or any other advertisement parameter. Management tools, as shown in the view panel, may include Ad plans, Push Queue, Retargeting Groups, Value Plans, and Schedules.

Example Build System and Methods

Figure 18:
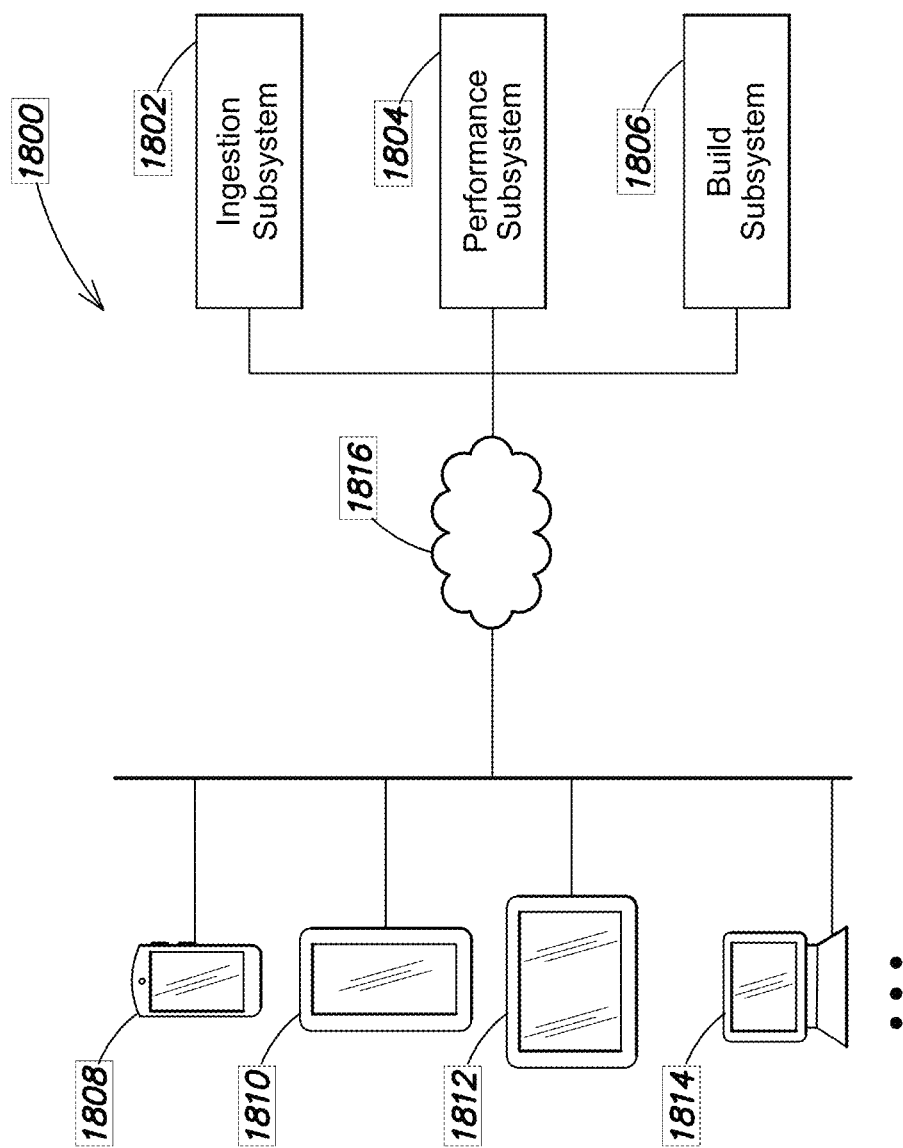
FIG. 18 is a block diagram showing a system suitable for incorporating various aspects and embodiments.

FIG. 18 is a block diagram of an integrated system 1800 including an ingestion subsystem 1802 coupled to a performance subsystem 1804, which may include a performance summary subsystem and a performance analytic subsystem, and a build subsystem 1806. Any number of users can access the integrated system 1800 using any number of computing devices (e.g., 1808-1812—mobile devices, laptops, desktops, tablets, smart phones, etc.). The users can connect to the integrated system 1800 over the network 1816, which can include any of the following elements or any combination of the following elements: local area networks, wide area networks, private networks, virtual networks, and which can include or comprise the Internet. According to various embodiments, the ingestion system 1800 or subsystem 1804 can be configured to execute a variety of functions to capture existing advertisement information, and the build system 1806 can be configured to execute a variety of functions to define a new advertisement. Various embodiments of the integrated system 1800 are described below with reference to the system structure of FIG. 19.

Figure 19:
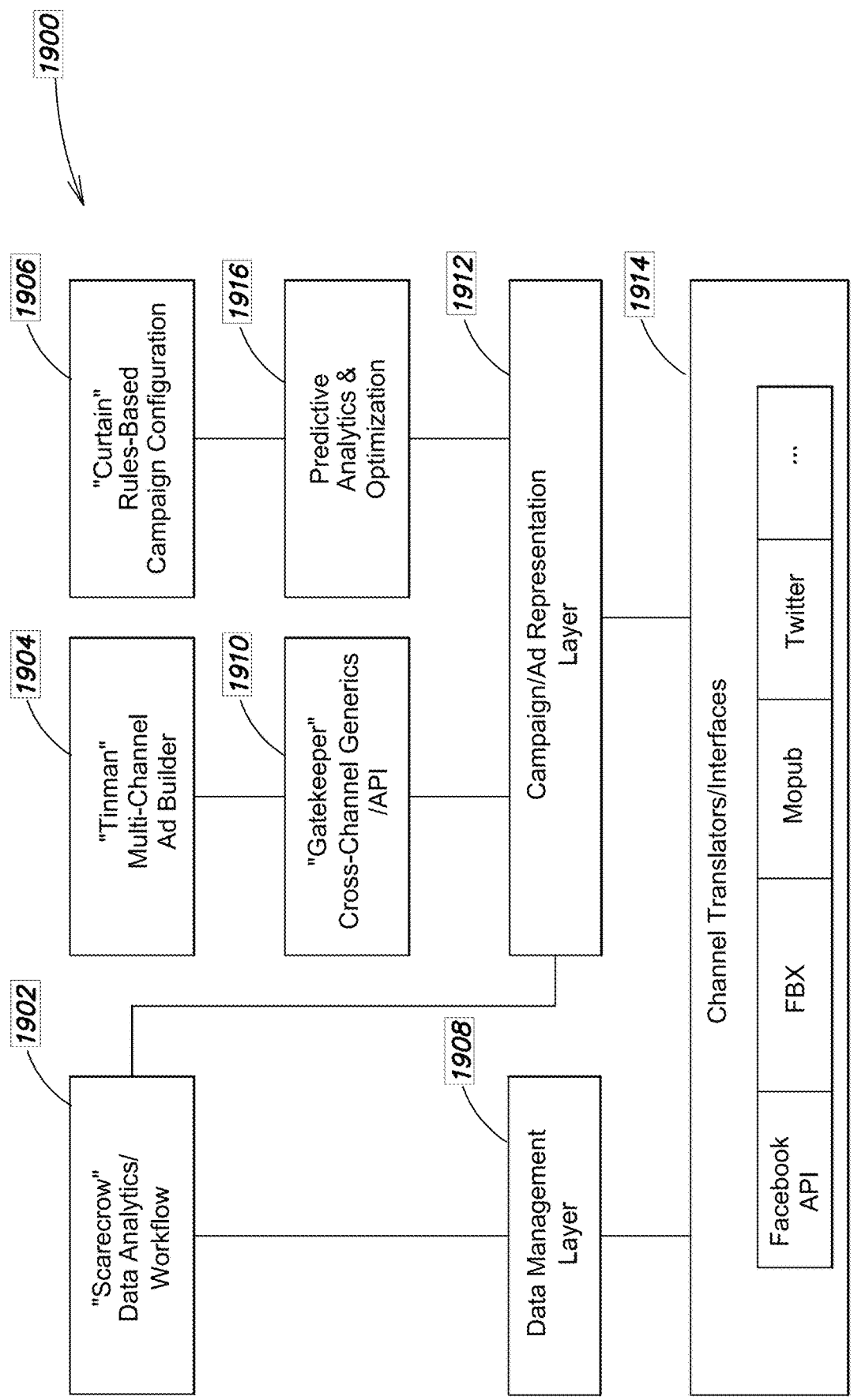
FIG. 19 is a block diagram showing a system for integrating high volume data analytics and generating channel-independent advertisements, according to various aspects and embodiments.

FIG. 19 shows an example of a system for generating and displaying a graphical user interface for high volume data, and in particular, for generating a channel independent advertisement while simultaneously delivering advertisement data and analytics. In various embodiments, the system 1900 includes at least one processor adapted to execute a series of system layers, the layers including at least a data analytics layer 1902 an advertisement build layer 1904, and a campaign configuration layer 1906. Various further embodiments may include a data management layer 1908, a cross-channel generics layer 1910, an advertisement representation layer 1912, a channel translation layer 1914, and a predictive, analytics, and optimization layer 1916. Individual layers may be interconnected and/or in parallel as described below.

In various embodiments, the system 1900 receives advertising data including advertising metrics from any number of advertising platforms or publishers of advertisements (i.e., channels). In one embodiment, the system 1900 is configured to automatically capture and aggregate advertisement data and metrics from the known FACEBOOK platform. In other embodiments the system 1900 is configured to automatically capture advertisement data from other systems (e.g., GOOGLE, YAHOO, etc.). The received data is processed and stored according to, for example, advertising type, advertising grouping, advertising targets, by one or more system components and, for example, at the data management layer. Various embodiments may include an ingestion subsystem, such as the ingestion subsystem 1802 described above in FIG. 18. Various further embodiments of an ingestion system may include the ingestion system described in application Ser. No. 62/208,241 titled "SYSTEMS FOR HIGH VOLUME DATA ANALYTICS AND DATA INGESTION," filed Aug. 21, 2015, which is herein incorporated by reference in its entirety.

The received data is processed through the channel translation layer 1914 to translate the data to a destination format language. In various embodiments, the translation layer 1914 includes a translation component configured to build associations between a first provider format for advertising data and a destination formation for advertising data. In some examples, the translation component includes information on data structures used by a first provider (e.g., FACEBOOK) and mappings to data structures used on the destination system. The translation component can then capture and fill destination formatted data structures containing all of the previous advertising information. In further embodiments, the translation component enables the destination system to use the historical advertising information as if it were originally created on the destination system. In particular, the channel translation layer 1914 may include channel-specific modules which define channel restrictions and capabilities. Restrictions may reflect the structure of a particular channel, and may be dynamically created or queried from a destination channel via one or more APIs. Each channel-specific module communicates the particular capabilities via a cross-channel generics API (e.g., cross-channel generics layer 1910) within the system of one embodiment, which provides a common structured interface for such functionality.

At the data management layer 1908, the received data and metrics are stored according to, for example, advertising type, advertising groupings, advertising targets. In one example, an analytic and grouping component of the performance subsystem 1804 of FIG. 18 captures information on the advertising type, advertising groupings, advertising targets from a database engine to determine the appropriate associations. The database engine stores the associated data and any summarizations or calculations on those values in a database. At the data analytics layer 1902 a user interface component is configured to provide a visual representation of pivot tables executed against the database. Each view of the database can be likened to a new pivot table, where each view performs specific selections on the database data and presents metrics on the current selections.

According to one embodiment, the system 1900 presents a plurality of user interface layers that are presented to users of the system. The user interface layers are configured to organize and display advertisement data and metrics in a variety of summary views, a variety of detailed views, and organize and display any management functions and/or views, and one or more action panels such as a build panel, a view panel, or an editing panel. Various panels may be organized and displayed coextensively with each other and/or the display of the summary views, detailed views, and management functions or views, such that a user may individually interact with each panel. Such side by side views not only optimize inefficiencies in previous known unified user interface views, such improvements improve the underlying advertising management systems by increasing the speed at which data is available and the organization of information.

Further, because the volumes of data may be so large, an infrastructure may be provided that is capable of handling billions of events and aggregating the information into displays that are capable of being acted upon in real time by users (e.g., ad managers). As discussed above, information may be aggregated and for use in pivot tables that can be presented to users within a user interface, for instance by a performance subsystem, such as the performance subsystem 1804 of FIG. 18. Such pivot tables may access a tree-like data structure having multi-layer aggregation that permits parameter, attribute, and metric filtering at any layer. To this end, a custom procedural query engine may be provided that is capable of generating this tree-like structure. The infrastructure itself may be underpinned by a dynamically balanced fault tolerant server structure. For example, a load balancer may be provided that distributes load to one or more nodes which performs various functions (such as tree generation/management and SQL operations on a MySQL database).

In some embodiments, additional system components, user interface elements, and user interface displays can be also be provided to facilitate interaction with and to expedite display of any data associated with system managed media objects.

Figure 23:
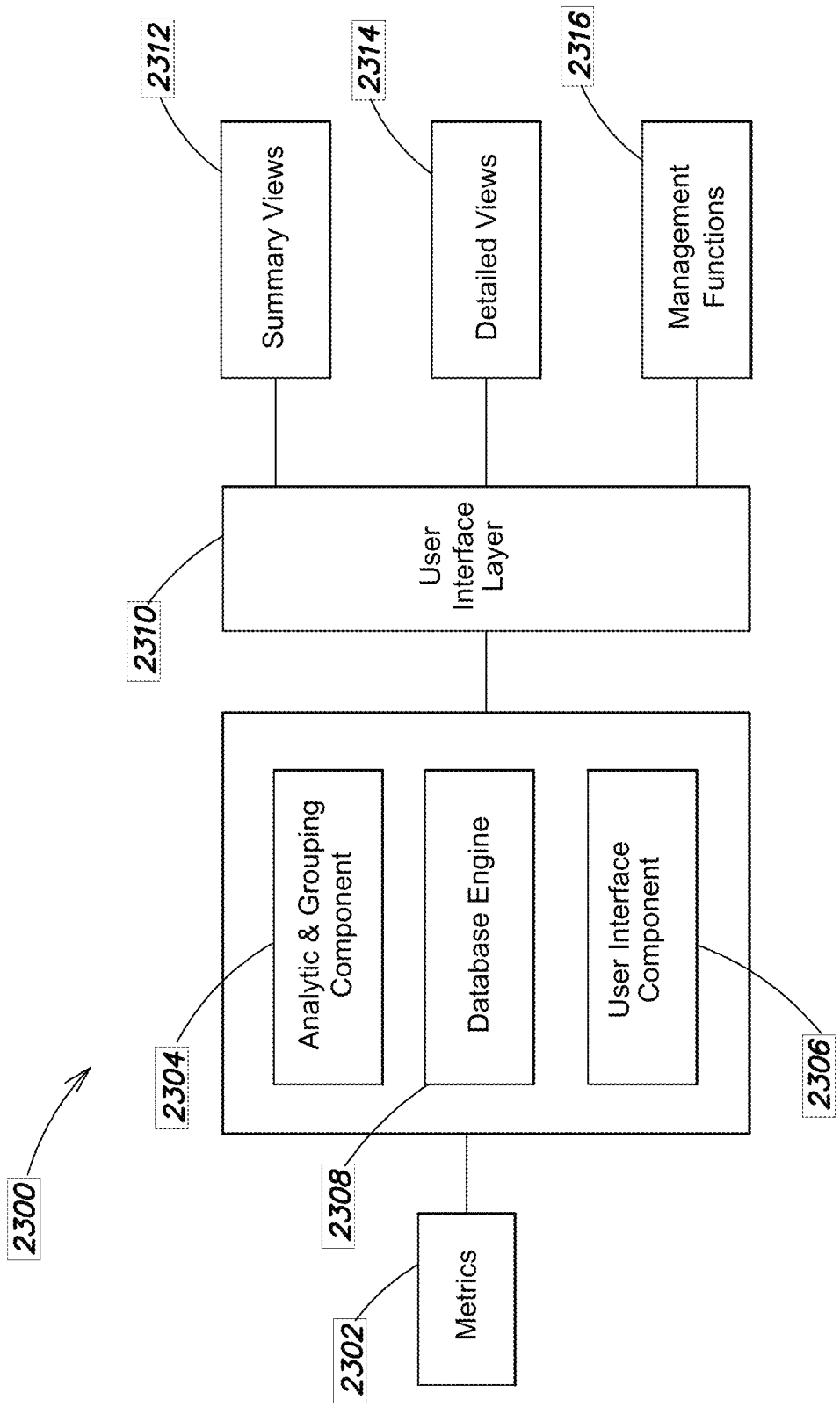
FIG. 23 is block diagram of an example system, according to one embodiment.

FIG. 23 shows an example of a system for generating and displaying a graphical user interface for high volume data analytics. The system receives advertising metrics 2302 from any number of advertising platforms or publishers of advertisements. A data analytic and grouping component 2304 is configured to process the received metrics and store the data according to, for example, advertising type, advertising groupings, advertising targets. In one example, the analytic and grouping component captures information on the advertising type, advertising groupings, advertising targets from a database engine 2308 determines the appropriate associations and the database engine stores the associated data and any summarizations or calculations on those values in a database. In one embodiment, the user interface component 2306 is configured to provide a visual representation of pivot tables executed against the database. Each view of the database can be likened to a new pivot table, where each view performs specific selections on the database data and presents analytic on the current selections.

According to one embodiment, the system presents a unified UI layer 2310 that is presented to users of the system. The UI layer 2310 is configured to organize and display the variety of summary views 2312 (e.g., views 2500, 2700, 3500 of FIGS. 25, 27, and 35 respectively); the variety of detailed views 2314 (e.g., FIGS. 43-52); and any management functions 2316 and/or views.

Figure 24A:
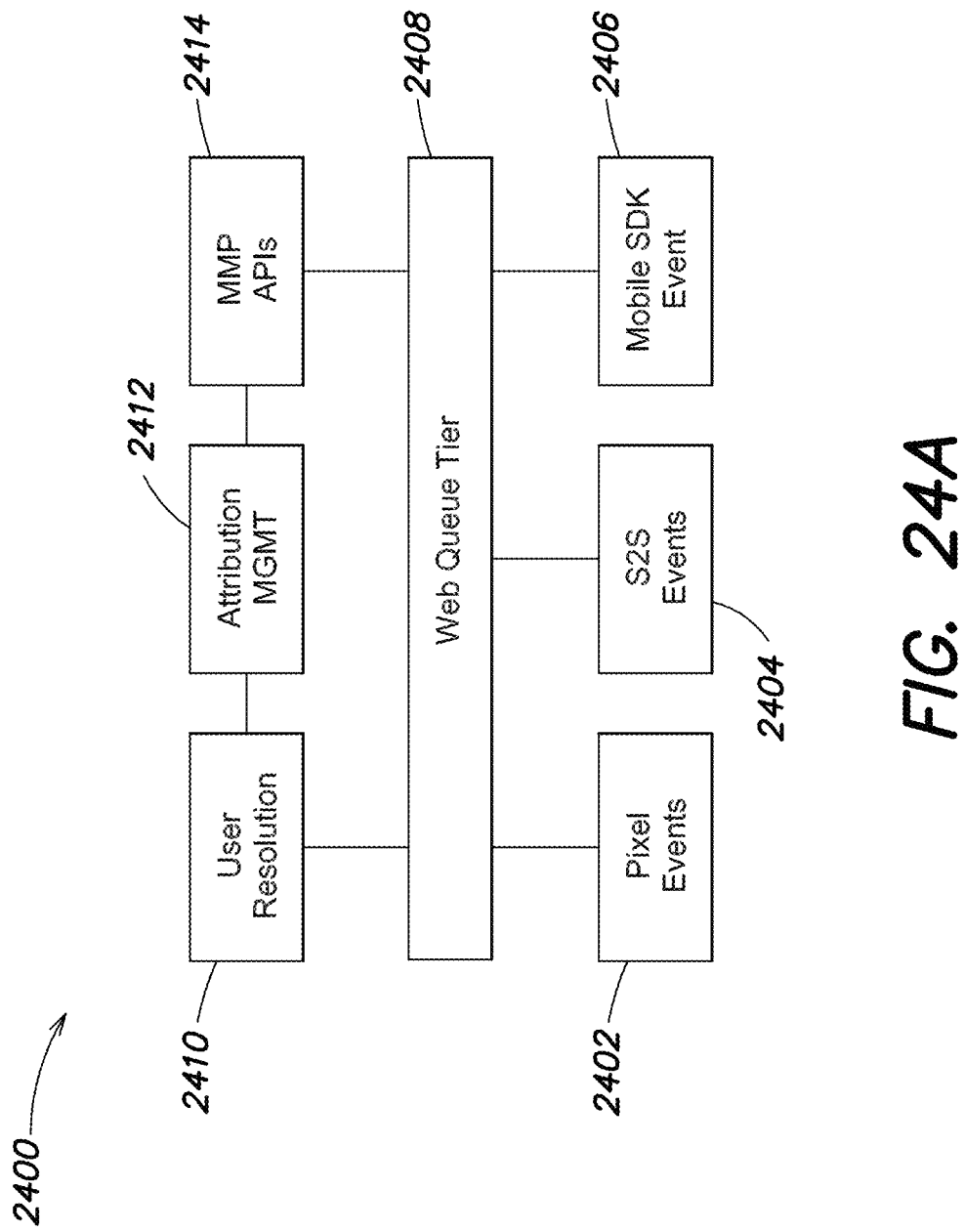
FIGS. 24A-C are block diagrams of example systems, according to one embodiment.

Further, various aspects of the invention may be practiced with one or more advertising automation systems shown by way of example in FIG. 24A. In particular, automation systems 2400 can be configured for processing high volumes of advertising-related events in a distributed advertising network. Such events may be originated by one or more sources and may be of various types (e.g., pixel events 2402, S2S events 2404, mobile events 2406, etc.) that are received and handled by a web queue tier 2408. The system may also include various components, such as a component that performs user resolution functions (determining users across multiple platforms e.g., 2410), a component that determines attributions 2412 (e.g., by observing impression/click histories and tracking conversions/actions), among other functions. The system may have other components, such as components that perform CRM functions, receive product/inventory information, real time structured data (e.g., RTB data (e.g., bids, wins, clicks)), and receives offline conversion events or other information that may be used to analyze performance of particular ads. For instance, there may be components that perform offline analysis of performance data to determine higher level functions, such as optimized bidding and budgeting of ads. In some embodiments, multimedia partners (MMP) and respective application programming interfaces (e.g., MMP APIs 2414) can be integrated into the system to facilitate attribution management, data capture, events information, etc.

According to one embodiment, FIG. 24A illustrates an embodiment of a data measurement and attribution layer integrated into the system. The bottom blocks (e.g., 2402, 2404, 2406) illustrate examples of the sources of user interaction data. For example, javascript pixels are used to communicate website interaction events for individual users to the system. In another example, a mobile software development kit ("SDK") is similarly used to communicate mobile app interactions. In another example, there is also an interface to capture server to server based events, where a server belonging to an advertiser or content provider entity can directly provide respective data to the system.

As illustrated, each of the example sources communicate with a set of servers, for example in the second layer of the figure (e.g., the "web queue tier" at 2408). The web queue tier 2408 includes globally distributed web servers which provide load distribution, queuing, and cookie management, so that the end user's browser or mobile app is not slowed down waiting for the completion of the attribution process (e.g., data tracking and identification of associated users and/or actions).

In one example the web queue tier is a set of servers implementing user resolution and attribution operations. User Resolution at 2410 includes a plurality of servers configured to utilize tokens collected by the data sources to synthesize an internal identifier which is unique to each user. According to one embodiment, the synthesizing of the internal identifier does not connect to identifiable information about that user, but rather provides a way to connect events over time to determine which interaction events should be aggregated together for performance reporting. In Attribution Management 2412, a group of servers are configured to evaluate each tracked interaction in light of a respective user's history in order to determine which advertisements or content, if any, should receive credit for causing the interaction. According to one embodiment, the system currently implements a "last touch" attribution model, but others are possible (e.g., first touch attribution model, weighted attribution models, hybrid attribution models, among other options). For mobile app interactions, various embodiment of the system are configured to automatically query other servers via mobile measurement partnership ("MMP") APIs 2414 to determine the best attribution. Based on the data returned form MMP APIs, the system identifies a best attribution and stores the attribution information.

According to some embodiments, the UI layer 2310 is configured to generate and present tailored views to end user, where the views include navigable visualizations of advertising data.

For example, according to one embodiment, the UI layer can generated a user interface that is a data-centric pivot table that allows dynamic navigation into more specific information, such as ad placement information. For instance, a user may be presented an interface that allows a user to navigate through performance analysis data (e.g., ad placement performance information) to locate specific ads and their performance within a hierarchical view. The specific ad information that is displayed may include performance information specific to the filters used to navigate to the specific ad. Such an interface is beneficial, as it permits an advertising manager to quickly locate relevant ad placement details through a data-driven interface. In one embodiment, the interface may include the ability to present an inline summary of the ad placement within a tabular view of the performance data. Summary information associated with the displayed ads may be changed depending on the filters or other user selections within the interface. Such capabilities may permit a user (an advertising manager or other user type that manages ad placements) to quickly locate relevant ads within the user interface that relate to the displayed placement performance data.

Figure 24B:
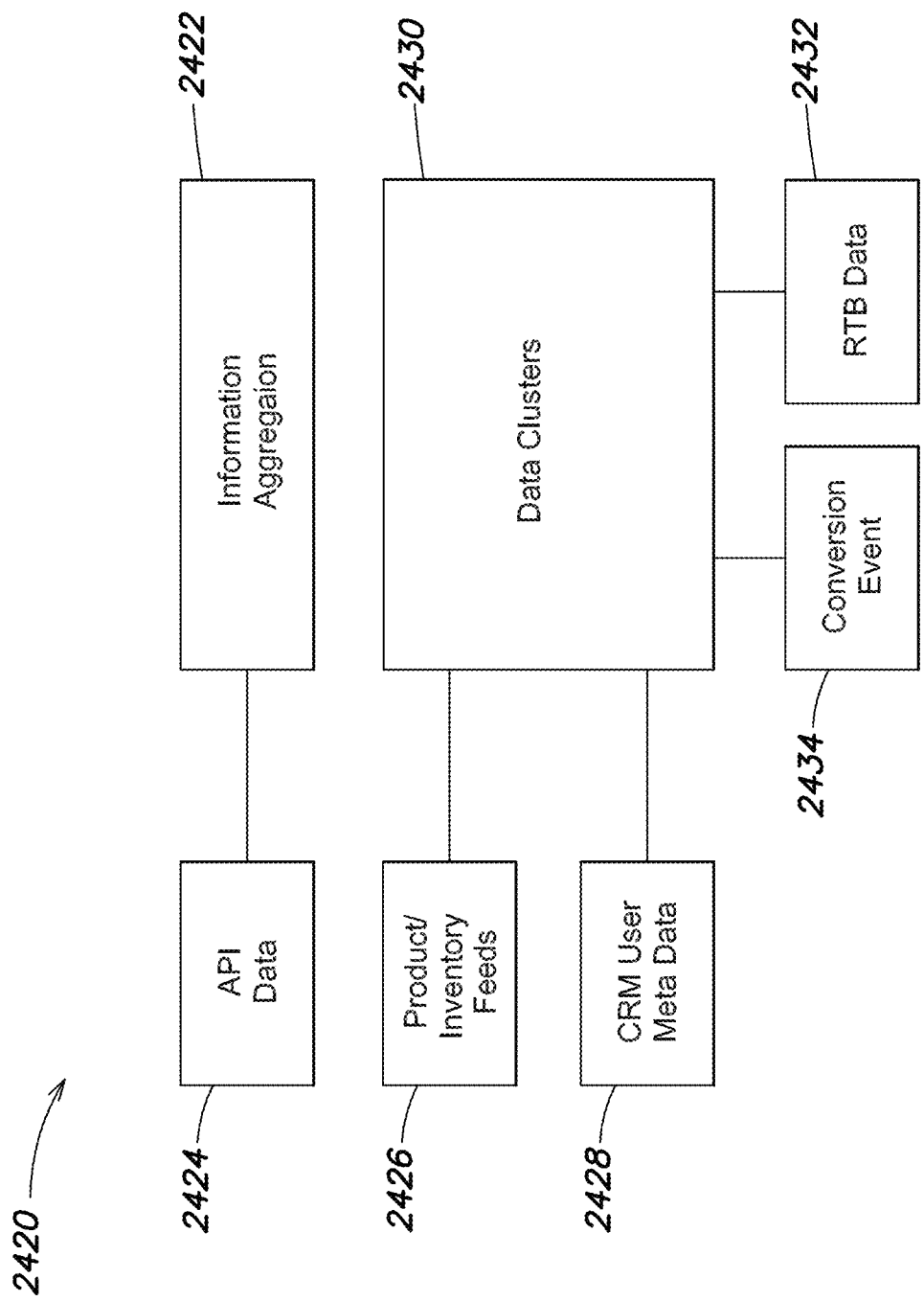

FIG. 24B illustrates data management systems and functions executed by the system. According to one embodiment, the system 2400 is configured to receive, analyze and return processed analytics to online advertisers, by aggregating respective data from the measurement and attribution layer (e.g., illustrated in FIG. 24A). In one embodiment, the system implements a set specialize servers (e.g., 2422) configured to provide information about interactions aggregated by advertisement, attribution time, and interaction time—these aggregations can be referred to as of time cohort rollups which can include aggregation of related information or information that can be grouped based on similarity.

In further embodiments, the system can be configured to combine this information with data drawn from advertising publisher APIs (e.g., 2424) and RTB data streams (e.g., 2432), as well as various advertiser data sources (e.g., conveying conversion events at 2434), such as customer relation management ("CRM") systems (e.g., 2428) and product and inventory feeds (e.g., 2426). FIG. 2B illustrates these data sources connecting to a set of data clusters (e.g., 2430). In one embodiment, the data clusters 2430 include storage systems that provide a variety of mechanisms of access to the integrated data with different performance characteristics suitable for different applications using the data. In one example, a MySql cluster can be configured to support functions and displays of the high volume analytics systems. In another example, the other systems (e.g., Hadoop, Aerospike, etc.) support real-time bidding and performance modeling and optimization.

Various embodiments of the system enable one or more of or any combination of: processing and rendering of analytics on 600 million conversion events each day; globally (DNS) balanced web tier, manage cookies; handle redirects and containers; accept and queue events; user resolution; horizontally scalable processing; multiple tokens and/or levels of authority for accessing and/or visualizing data; device bridging by first party ID; MMP API integrations; bridge click-to-install gap; attribution management—for example, based on user impression/click/event history; in another example attribute is defined by last click but other models possible. Further embodiments enable one or more of or any combination of: processing 600 million conversions/day; 100 thousand RTB events/second; 400 million user records; 100 million feed elements; 10 million MMP API data rows/day; mixed granularity (e.g., by event, user, product, ad time); storing real-time structured data, for user management, attribution, RTB match; execute map/reduce and/or ETL frameworks; which can be used for modeling and exploration; and can include low latency rollups (e.g., information aggregations) which provide merged cohort data with time information, which the system can use for reporting and/or API decisions.

Yet other embodiments are configured to execute one or more or any combination of the following: unique interface paradigm which provides visualization of live performance context data while executing management functions, editing existing placements, etc.; context-specific actions and visualizations for live campaigns and directly integrate live analytics views; fast, configurable analytics interface responsive to user input; API triggering responsive to user interface input; multi-layer, multi-dimensional aggregation of performance/placement data; comprehensive ad attributes and metrics; powerful sorting and filtering in responsive user interface; variable time frames and granularity associated with data aggregates accessible and tunable in the user interface; graphic and tabular views; near real-time reporting (e.g., with hour granularity, minute granularity, etc.); and tailored performance even for large campaigns and wide time windows. Still other embodiments enable one or more of or any combination of: a custom procedural query engine; queries against generic object hierarchy; building result trees with multi-layer aggregation and, for example, loading of tree segments to optimize fast visualization; attribute and metric filtering at any tree layer, persistent result set management; smart object/data and result set caches to optimize visualizations; pre-loading of frequently used data; object definition and data access plug-ins; client-side data browser and object manager; interfaces to server API for analytics access; smart client-server scrolling (e.g., incremental loading of data); dynamic attribute and metric panels; context/selection-specific action menus and panels; load and pivot ad-level lifetime campaign data visualized in under one second; remains responsive for time-based analysis over GBs of data; and a dynamically load balanced, fault tolerant cluster.

Figure 24C:
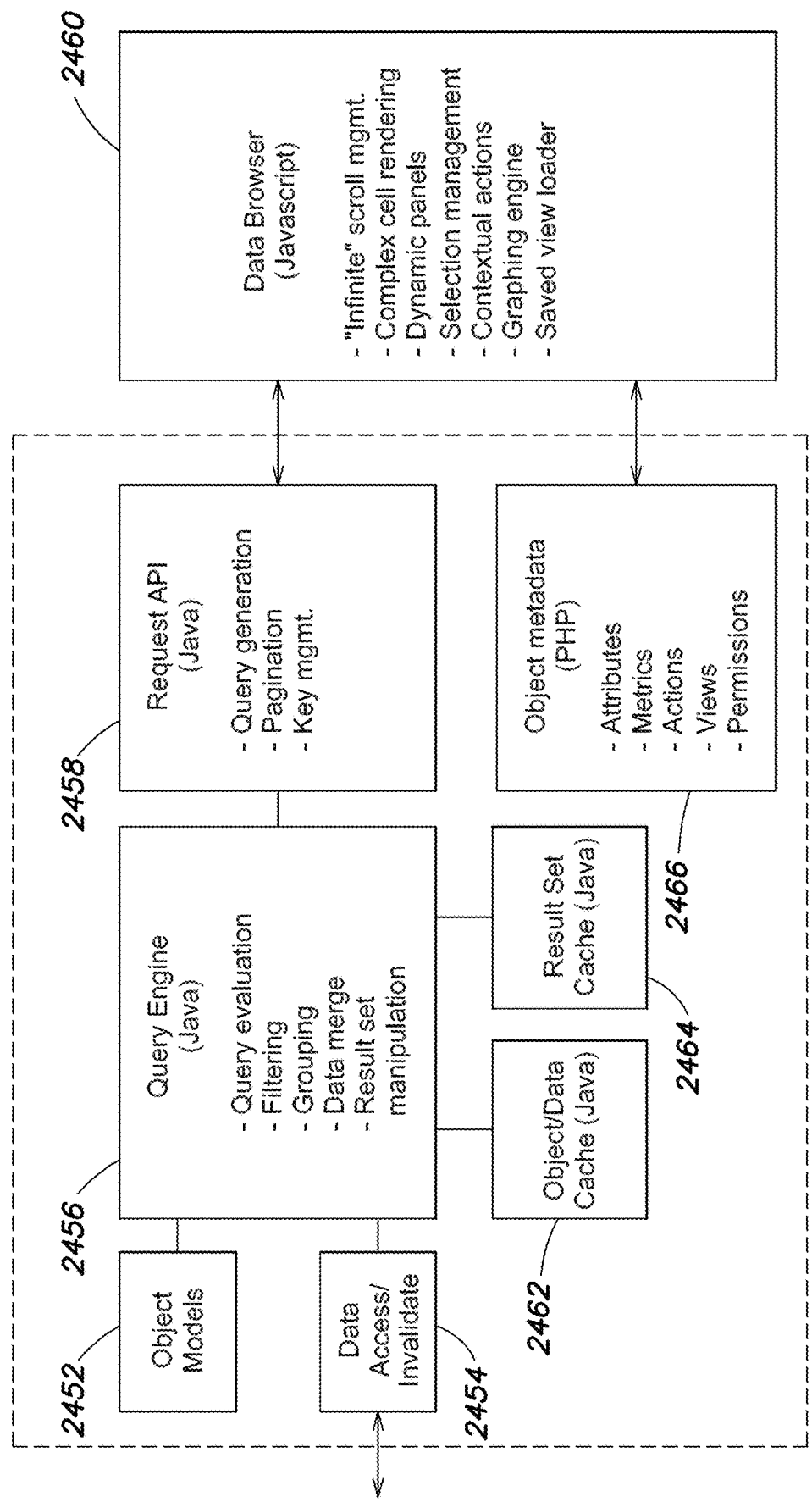

FIG. 24C is an example block diagram showing data analytic components and workflow executions. FIG. 24C shows the same components of the system that enable various features of the system and/or user interface displays. For example, models definitions (e.g., 2452) describing the organization of placement metadata (e.g., 2466 detailing, for example, how to find the creative elements of an ad from an ad id in a data row) and code to fetch data from the system, as well as provide signals for cache invalidation (e.g., 2454) when key data changes. In one example, data is loaded and cached for display in the user interface. The data is cached to facilitate access, while cached, monitoring processes review cached data for changes (e.g., real time data feeds can constantly update data). By invalidating a cached entry or data object the system forces loading of the most up to date information in the user interface, and for example, when the user is accessing administrative functions/UIs, and/or where the real time data in not part of the active display.

In one embodiment, the query engine implements in-memory queries against aggregate advertising data (e.g., loaded from FIG. 24B) stored in an object/data cache (e.g., at 2462). The engine can be specialized for flexible dimensional aggregation, such that the underlying (ad, attribution_time, event_time, etc.) data can readily be analyzed based on ad properties and time window aggregates. As the query engine answers queries, it stores results in a result set cache (e.g., 264) so that the results for a specific UI session do not change unexpectedly as data is updated.

The analytics user interfaces cane be implemented through a javascript client side app (e.g., 2460) with a corresponding server-side API (e.g., 2458) that interfaces with the query engine (e.g., 2456). The javascript app issues data requests to the API (e.g., 2458) as users configure aggregation, filtering, and date range settings, and then manages data fetched via the API from the matching result sets to provide high performance on the client while operating within reasonable client memory limits.

According to one aspect, the user interface is specially configured to manage, aggregate, and dynamically select data for visualization responsive to constantly updating data feeds (e.g., live placement data associated with an advertising network). The dynamic nature of the received data that allows a user to selectively control their view of the changing data, for example by creating and saving user interface views. In one implementation, a database management component is configured to receive the dynamic data feeds, translate the dynamic data feeds into standardized formats, and group the dynamic data into selectable and displayable elements.

According to another aspect of the present invention, a visualization interface may be provided that includes a web-enabled pivot table used to analyze and present ad performance data. According to one embodiment, advertisers may use such a pivot table to view, sort through, and visualize multiple dimensions of advertising or groups of advertising data. Such tables, according to various embodiments, are configured with the attributes and metrics that are specifically tailored to user's needs by adding predefined audiences, creative elements, data-related attributes or placement details, followed by the metrics that determine campaign success. Once the selections within the interface have been made, the user may be permitted to simply drag and drop displayed elements to re-order metrics and/or to create a customized campaign dashboard. Such interfaces may be modified to include a summary view associated with a specific ad within the table based on specific user selections within the pivot table. This permits, for example, a user to selectively create a dashboard using certain metrics while at the same time seeing the specific ad placements and their associated summaries according to the configured dashboard. For instance, if an advertiser wants to see which creative was performing the best, the user is permitted to sort by key metrics (e.g., ROI, LTV, CTR, CPC, etc.) and locate specific summary view information relating to those placements.

Figure 25A:
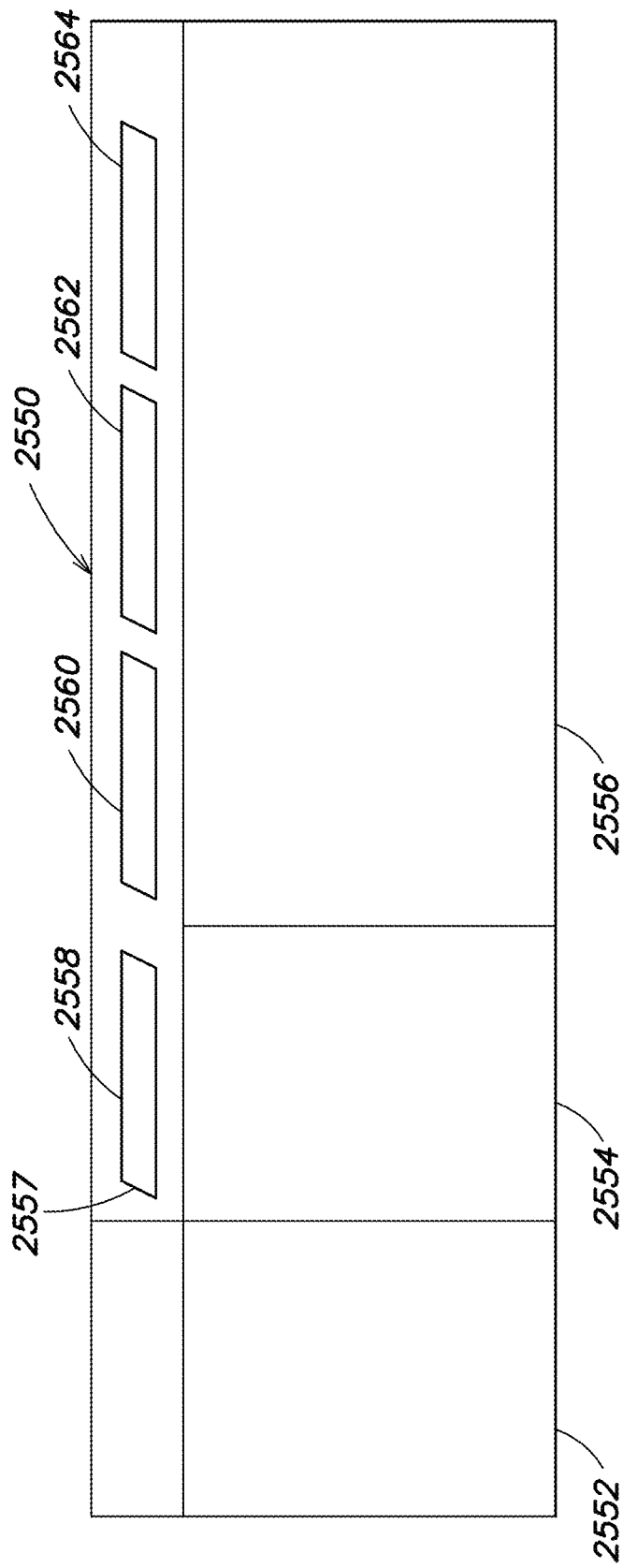

An example interface template for a inline summary view is shown in FIG. 25A. FIG. 25A illustrates an example format and organization for an inline user interface display that can be triggered to display in a pivot table visualization or in conjunction with a tabular visualization, for example, of performance data. In one example, the inline display can be rendered by the user interface as an embedded row spanning the length of any available columns in a current visualization (discussed in greater detail below).

In one example, the inline user interface display can include an ad preview portion for the inline display 2552. Proximately displayed at 2554 is a hierarchy display for accessing information on the ad placement being previewed, where the advertisement information is stored according to hierarchical layers. The hierarchy display 2554 can be configured to enable navigation between visualizations on the inline display showing respective layers and associated detail. In one example, responsive to selection in the hierarchy at 2554 an inline detail portion of the display 2556 provides additional information on the ad placement relevant to the selection made in 2554. In another example, the default display shown in 2556 is shown based on the first level of the hierarchy selected in 2554.

The display template can also include further selection menus to facilitate navigation within, for example, the inline display. In one embodiment, display section 2554 includes vertically arranged display of hierarchy objects, and each hierarchy object is associated with a display in section 2556. In another embodiment, a horizontally displayed inline menu section 2557 can enable further navigation through placement information (e.g., via hierarchy object selection at 2558), definitional selections associated with a given placement (e.g., via selection at 2560), targeting information (e.g., via selection at 2562), and may optionally include additional information menus (e.g., at 2564) to access information not categorized in the preceding options. Further examples of the user interfaces are shown and described in FIGS. 25B-49, which can be arranged based on the master template 2550.

Figure 25B:
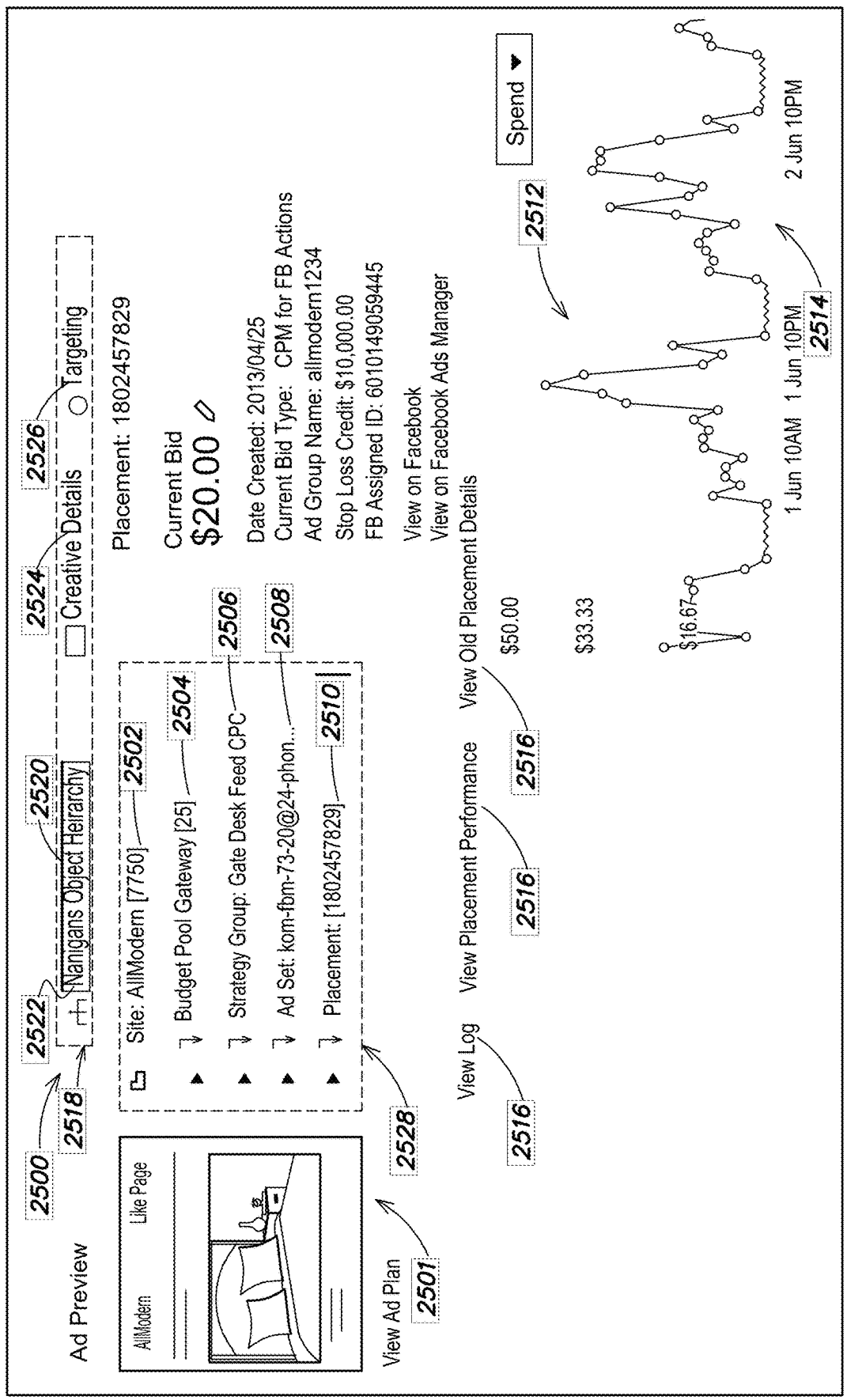

Shown in FIG. 25B, is an embodiment of a user interface 2500 that may be used to display ad information to a user. The user interface 2500 is specially configured according to minimizing the data volume required to convey necessary management information for an advertising network. Some difficulties in managing advertising networks include the high volume of constantly changing data that often needs to be reviewed by a network manager in order to make decisions on how to change, update, terminate, or suspend any number of a high volume of advertising placements. In various embodiments, maintaining contextual information associated with a placement shown in user interface 2500 enables visualization of data faster. As data is updated in real time, the contextual display likewise render the data faster that implementations that use separate windows or display for managing additional views. In further embodiments, inline displays paired with additional contextual information on the same placements reduces the need to render as many visualizations, and further eliminates the need to return to prior screens to capture the details information that is maintained through navigation in the inline display.

Summary view 2500 includes an example of a view tailored for understanding and summarizing metrics associated with individual advertisements. 101 In one embodiment, view 400 is configured to be introduced into a data-centric pivot table that allows dynamic navigation into more specific information. In one example, view 400 is generates a row in the data-centric pivot table and sized to span the width of available columns in the data-centric pivot table. At 2501, a preview of a specific ad is shown to provide a visual indicator and/or reference for a specific advertisement. A second portion of the display 2500 includes a plurality of drawers (e.g., 2502-110). According to one embodiment, each of the plurality of drawers is a navigable data and visual structure, that is executable via selection in the user interface.

The plurality of drawers are arranged in the visual display 2500 based on a hierarchy of groupings. In the example, the hierarchy includes a site grouping—value "AllModern"; Budget Pool grouping with value—"Gateway"; strategy group grouping with value "Gate Desk Feed CPC" (Cost Per Click); ad set grouping with an unique identifier for the ad set; and placement grouping with an unique identifier for the placement. Each drawer having more than one member in its associated grouping is configured to display membership information, for example, the number of members of the grouping. In one embodiment, the summary view 2500 includes a longitudinal menu 2518 for selecting a display format of the summary 2500. In one example, the display format includes a first default view showing an object hierarchy. The currently selected display format can be highlighted in the longitudinal menu 2518, for example, at 2520. Object 2522 is also configured to transition the user interface to summary 2500 via selection on 2522.

In further embodiments, each drawer includes an active state and a passive state. In a passive state grouping information, specific value, and membership number information can be displayed. Once selected, for example, by hovering with a user interface pointer or clicking with a user interface pointer—each drawer triggers display of an associated visualization, for example, the active state of the placement drawer triggers a display at 2512.

In some embodiments, the drawer is associated with a plurality of information view. Each view operates as a dynamic selection of data from the database that presents summary and/or aggregate information or in some alternative views and management information that can be used to add, modify, delete, and/or update advertising placements. At 2512 is shown some additional detailed information relating to the placement being visualized. In some examples, an initial view can include placement number, current bid, date created, a current bid type, ad group name, stop loss credit (for reactivating ads that would otherwise fail stop loss criteria), and an associated Facebook or other advertising source identifier. In some embodiments, selections made within summary view 2500 are reflected in real time on the data-centric pivot table, that summary view 2500 is integrated into. According to one aspect, the immediate connection between changes made in the summary view and the data-centric pivot table ensure accuracy in entered information (e.g., facilitates user understanding of context for each selection) and reduce errors in data entry as users reviews and/or manipulates thousands of advertisements.

Figure 26:
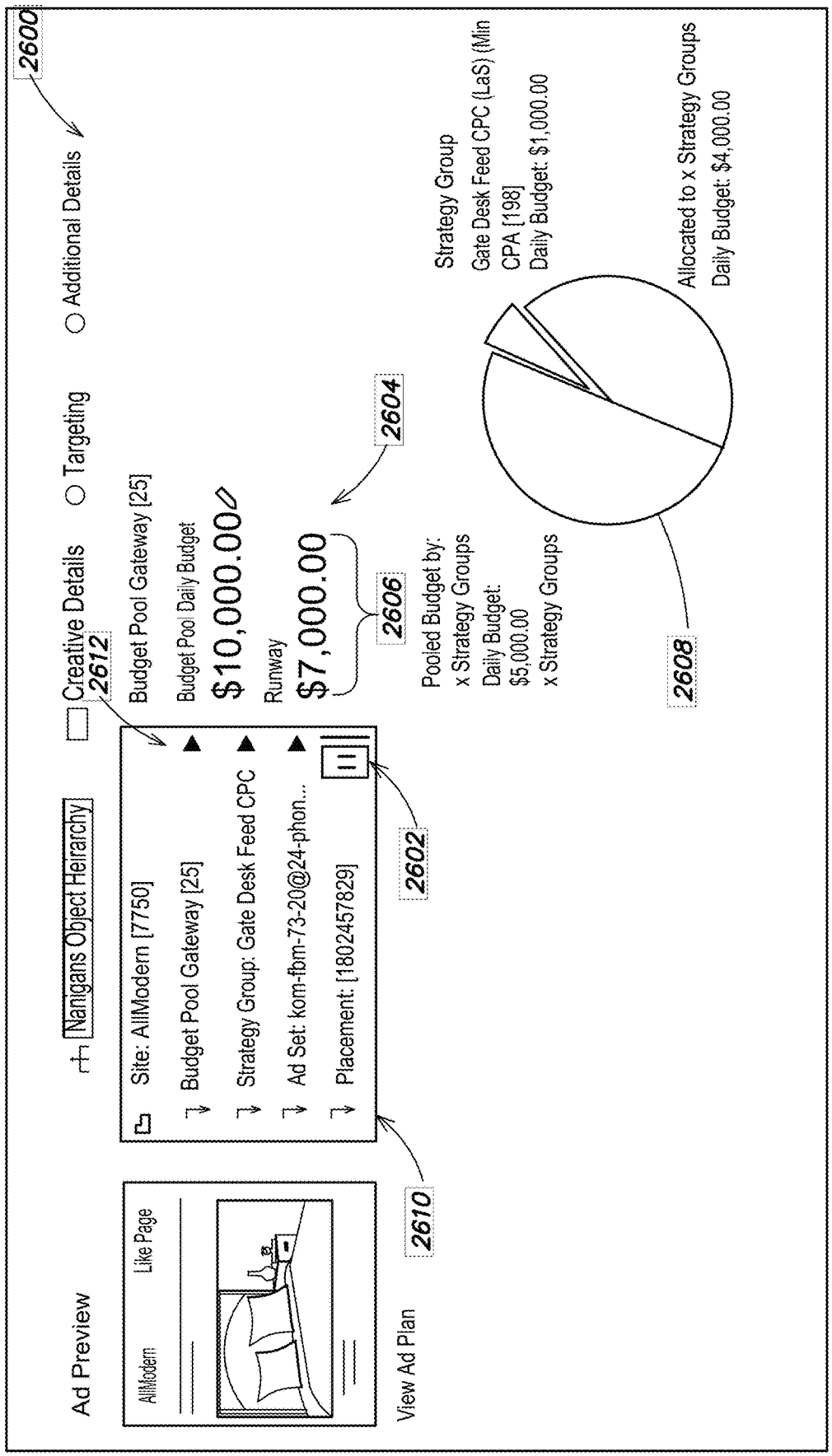

The views associated with a respective drawer in the active state can also include a graphical representation of the principal information for that view. In the initial view 2512, the principle information being conveyed to the user is bid amount for the advertising placement. At 2514, the initial view displays recent bids, bid time, and bid amount in a graphical form, so that the user is immediately provided a reference and recent historical window to understand how the current bid amount relates to the placement. Each active drawer view (e.g., initial view 2512) can include links to underlying information being displayed/summarized in the view (e.g., at 2516 a user can navigate to the underlying information being conveyed by the view). According to some embodiments, each active drawer can be associated with a plurality of views and can include additional summarizations of additional views. FIG. 26 includes a second view associated with the budget pool drawer 2504. According to one embodiment, the layout of the views associated with each respective drawer is specially configured to appear consistent between drawers, share a basic organization, and convey summary information in a comparable format. The consistent views as a user navigates through a multitude of advertisements and associated data ensure better understanding across larger amounts of data and directly results in reduced errors in management functions and data modification and/or entry in the user interface. In some embodiments, selection of the object hierarchy at 2522, triggers the display of a second vertical menu 2528 (e.g., comprising a plurality of drawers). According to some embodiments, the first longitudinal menu provides access to additional views (e.g., an object hierarchy view (e.g., FIG. 25A), and a creative details view (e.g., FIG. 27), a targeting view (e.g., FIG. 35). Each additional view can be associated with vertically displayed menus, that enable further refinements of each view, as discussed in greater detail below.

Figure 25C:
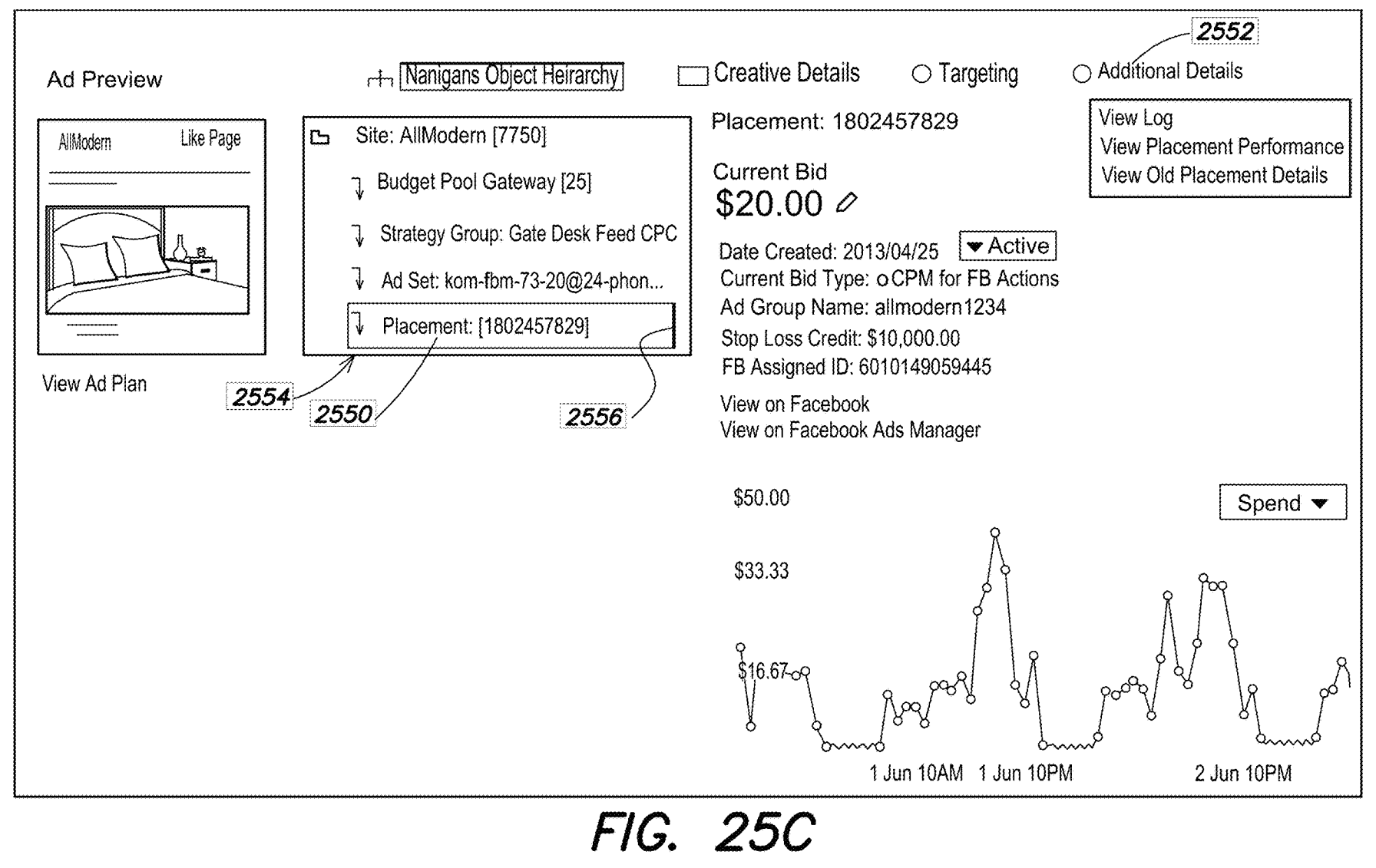

According to one embodiment, FIG. 25C shows an example transition to detailed information on a specific placement via selection of "Placement" 2550 in the user interface. To facilitate navigation, selection in the user interface vertical menu 2554 is highlighted at 2556 with a visual indicator that tracks the current view based on selection on a hierarchy level (e.g. in menu 2554). Optional menu options can be visualized, responsive to user selections in the user interface. In one example, "Additional Details" at 2552 is visualized responsive to a transition into the "placement" hierarchy via selection at 2550. The additional detail option at 2552 enables access to additional information (e.g., view log, placement performance, and/or old placement details.

Various embodiments describe the summary views implemented as inline displays. According to some embodiments, the same functions can be implemented as overlay displays. According to one example, the overlay displays are positioned in the user interface to enable visualization of contextual information associated with a placement being reviewed in the overlay display.

Shown at 2604 is a view for conveying budgeting information across the gateway grouping. Included with the summary data 2606 is a graphical representation of the total budgetary information with reference to the portion of the total budgetary information made up by the strategy group at 2608. Responsive to accessing detailed information and/or selecting "Placement" in the vertical menu 2610, the system is configured to display action control s at 2612. The action controls are configured to start and stop advertisement bidding and/or execution in real time. For example, selection of 2602 triggers the action control to transition between active and paused states depending on a beginning state of the action control. In the illustrated example, 2602 is in a paused state, thus, selection at 2602 triggers a transition to an active state. In response to the transition to an active stated the system is configured to communication with a hosting system for the respective placement and activate any bidding instructions for executing the respective advertisement. In one example, the placement can be hosted on the known FACEBOOK platform, and the transition to active state is configured to cause the system to communicate with the FACEBOOK platform via an API executed on the system, that triggers bidding as defined on the system (e.g., in the placement details) and monitors spend and tracks performance of the placement. Transitions to a paused state perform similar operations in reverse (e.g., triggering an API to communicate with a hosting platform to suspend bidding activity). As any changes are made in the summary view, so to does the data-centric pivot table update any corresponding record in real time.

According another aspect, the high data volume analytic user interface is further configured to manage creation and/or modification of advertising placements or ads. The user interface includes selections for navigating to "creative details" associated with an advertisement. Similar to the view 2500, view 2700 includes a preview of an advertisement 2702, and a set of user interface drawers 2704-2718. Each drawer is selectable in the user interface and configured to present an associated view or associated information in an adjacent portion of the user interface (e.g., at 2720). The highlighted portions of the user interface examples shown in FIGS. 27-34 identify the selected drawer via the highlighting and show the associated view with each drawer.

Figure 27:
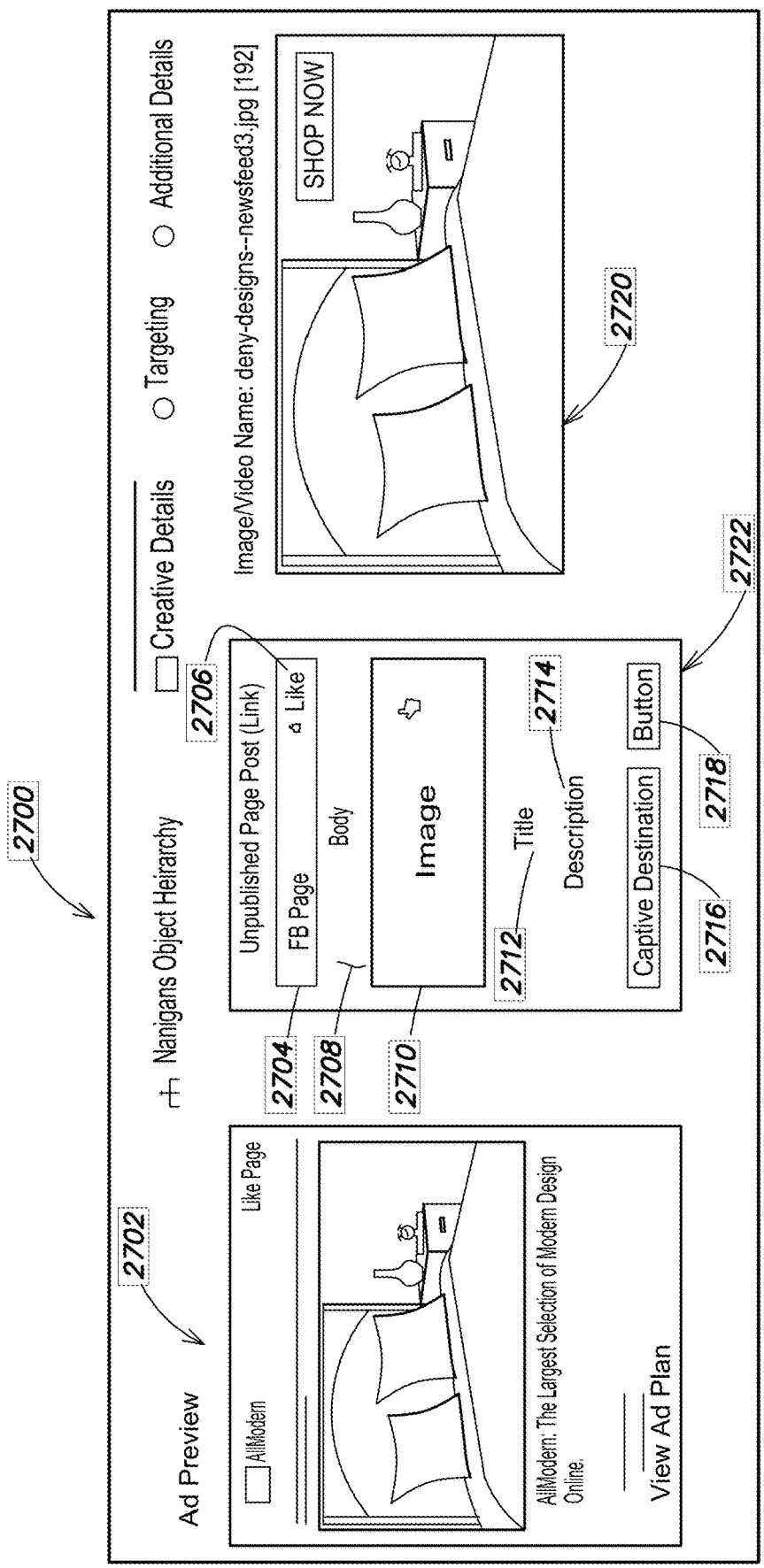
Figure 28:
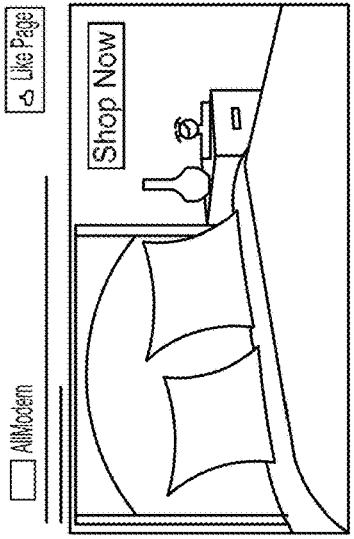
Figure 29:
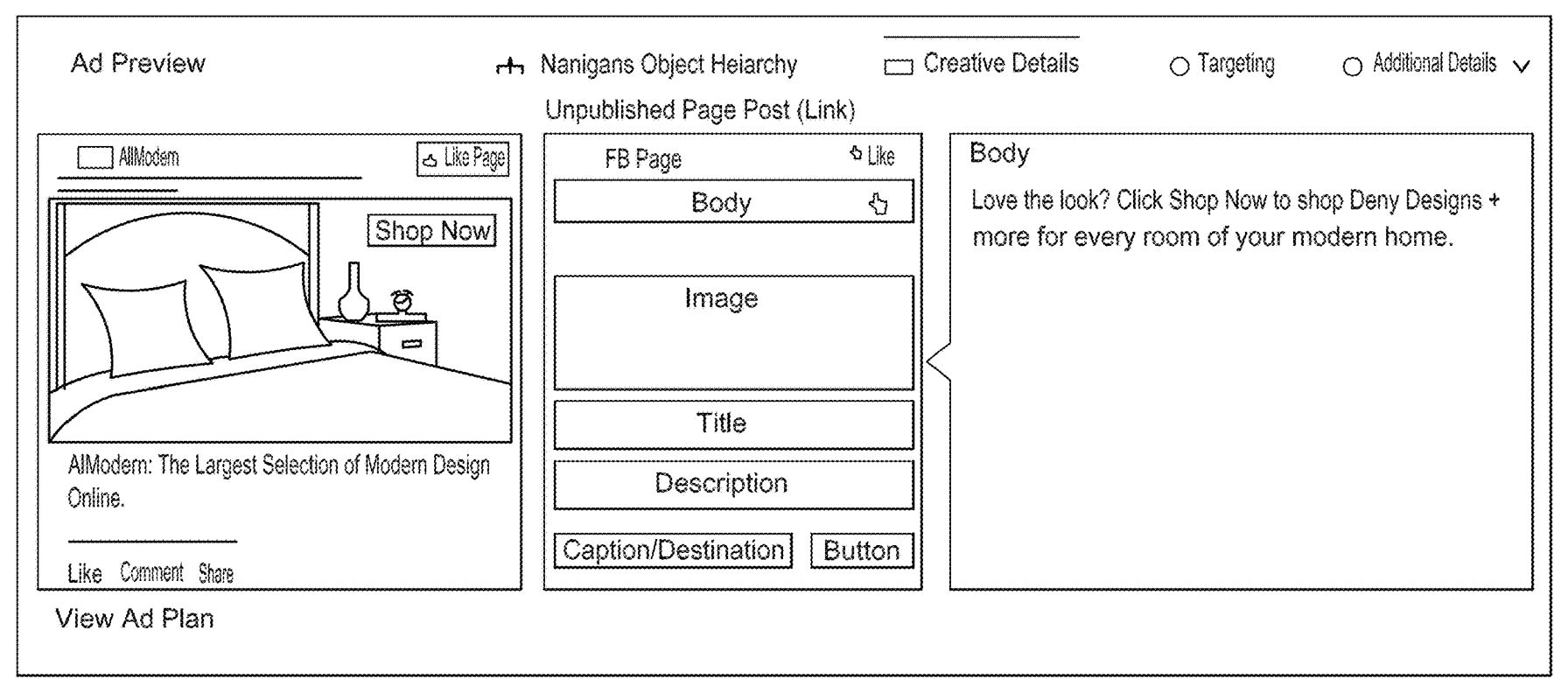
Figure 30:
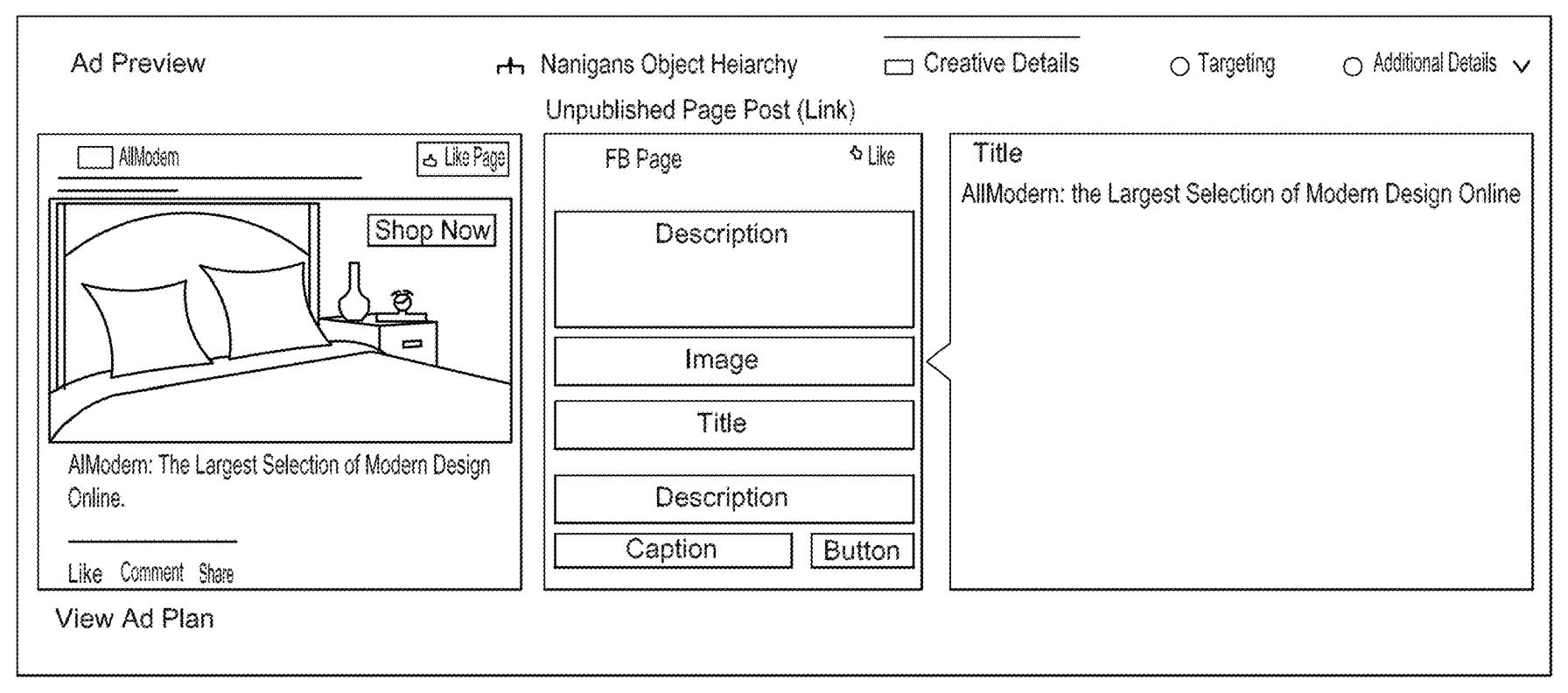
Figure 31:
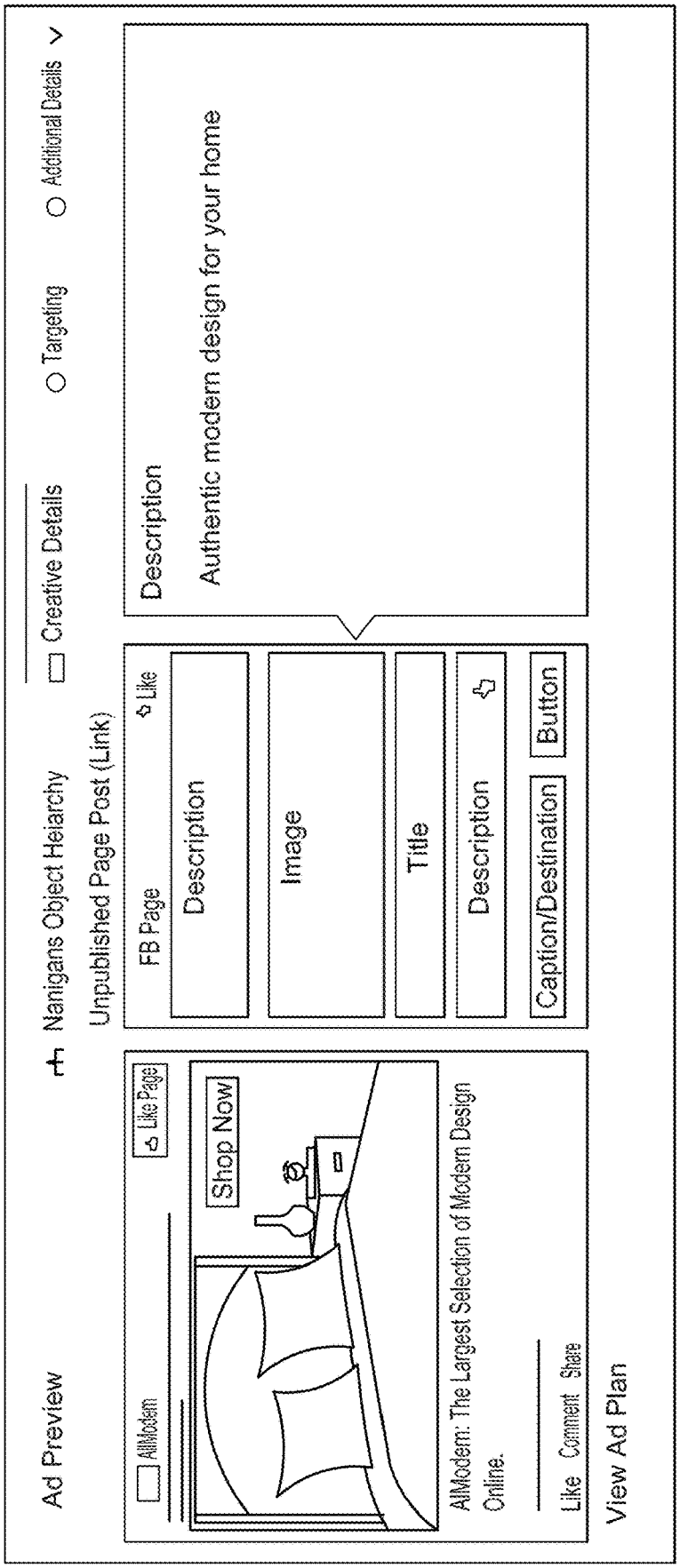
Figure 32:
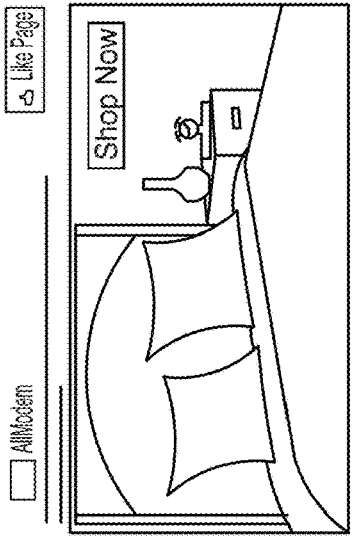
Figure 33:
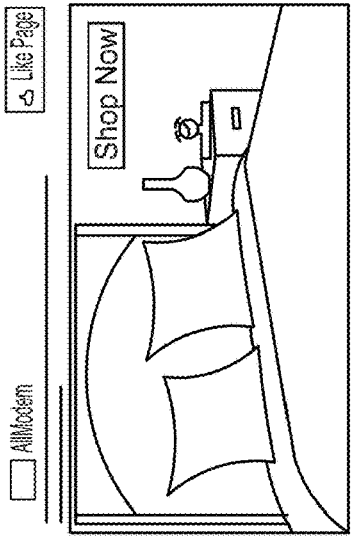
Figure 34:
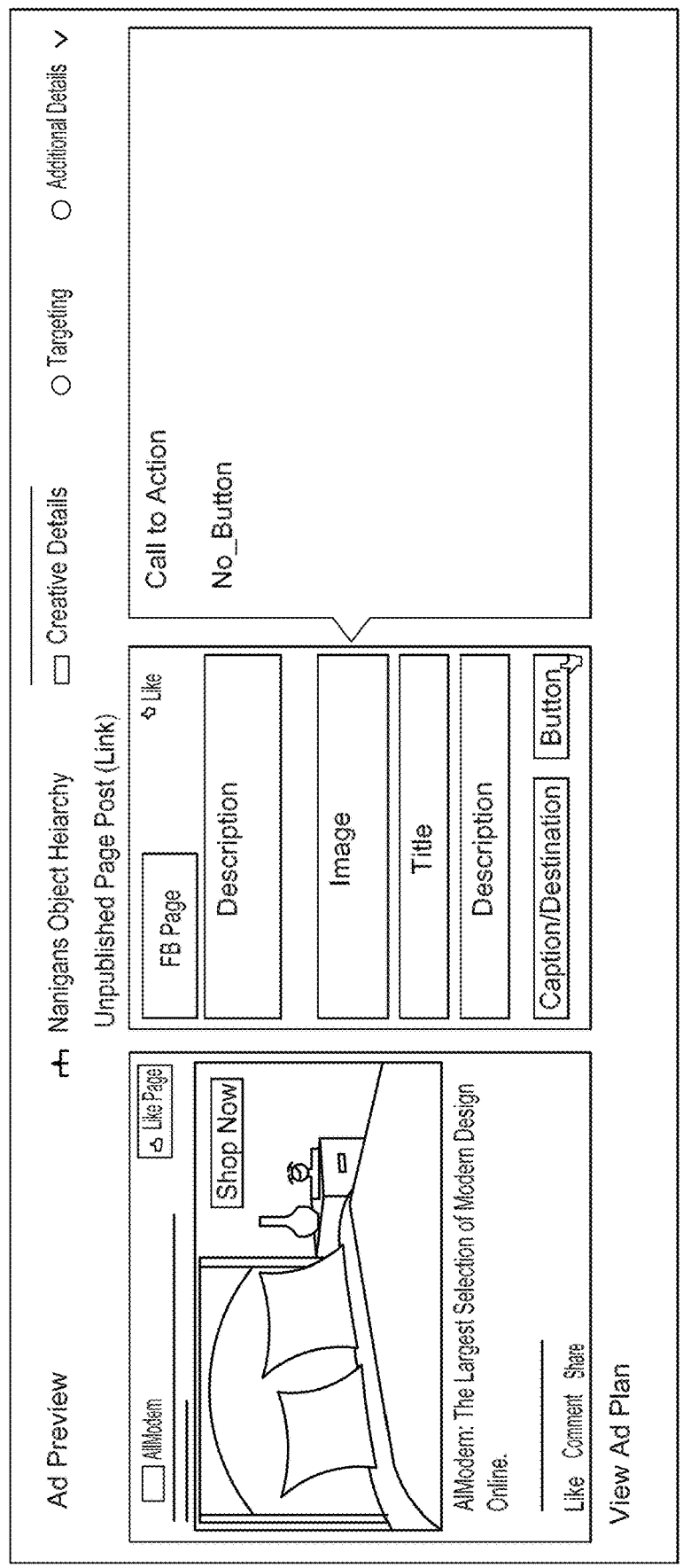

As shown in FIG. 27, a creative details view can include a vertically oriented menu at 2722, reflecting each selectable portion (e.g., 2704-2718) of an advertisement or placement that can be modified. In some examples, creative details view 2700 can enable creation of a new placement or modification of an existing one. For example, as shown in FIGS. 28-36 selection within vertically oriented menu 2722 enables an end user to navigate through portions of an existing (or new) placements, edit any defined portions (or create new portions), and responsive to leaving the creative details views, the system is configured to capture any changes, any new data, new information, and trigger a respective API that, for example, instantiates a new placement on a third party system (e.g., FACEBOOK) according to the user definitions, or in another example, updates an existing placement via execution of a respective API.

According to one embodiment, similar to changes made in view 2500, changes in view 2700 are reflected in the data-centric pivot table in real time. Additionally, as new data is captured by the system (e.g., via one or more APIs connected to respective hosting systems) entries in the data-centric pivot table update and provide real time contextual information, while a user is navigating summary views and/or summary information shown inline. In further embodiments, the system can delay updating of information to avoid confusion. For example, the system can operate on cached data and/or cached date results, and new data received by the system will not be updated until a cache invalidation event occurs. Cache invalidation can be executed based on detecting a period of time has elapsed, or identifying a threshold number of changes have occurred, among other options.

Figure 35:
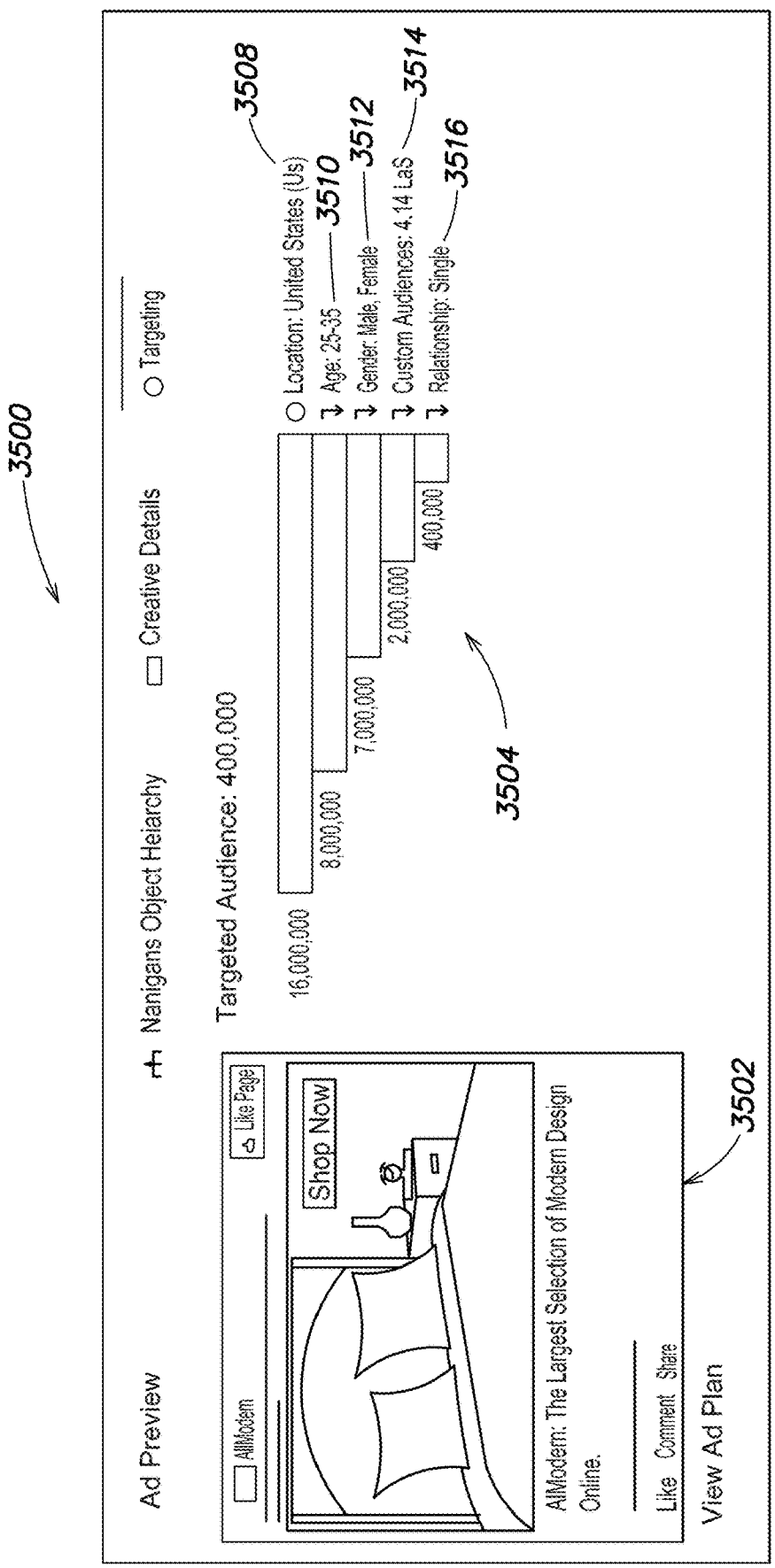

FIGS. 35-42 provide additional examples of user interface views. In particular, FIGS. 35-42 provide example interfaces for summarizing targeting information associated with a particular advertisement, advertisement group, etc. In the example of FIG. 35, user interface 3500 provides a preview view of the advertisement being analyzed (e.g., similar to views 2700 and 2500). Interface 3500 also provides summary information associated with consumer target of the selected advertisement at 3504. The system and/or user interface arranges target audiences into hierarchical groupings and presents the membership numbers accordingly (e.g., location with value US; age with value 25-35; gender with value male, female; custom audiences with value 4.14 LaS (e.g., a customized grouping of users that may be created, for example, responsive to a listing of attributes to an advertising server (e.g., providing a listing of email addresses and receiving Facebook user names within a defined group)); and relationship with a value of "single"— 3508-3516).

Figure 36:
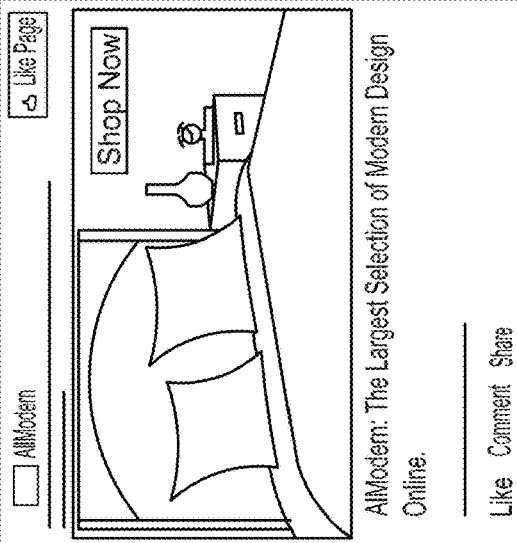
Figure 38:
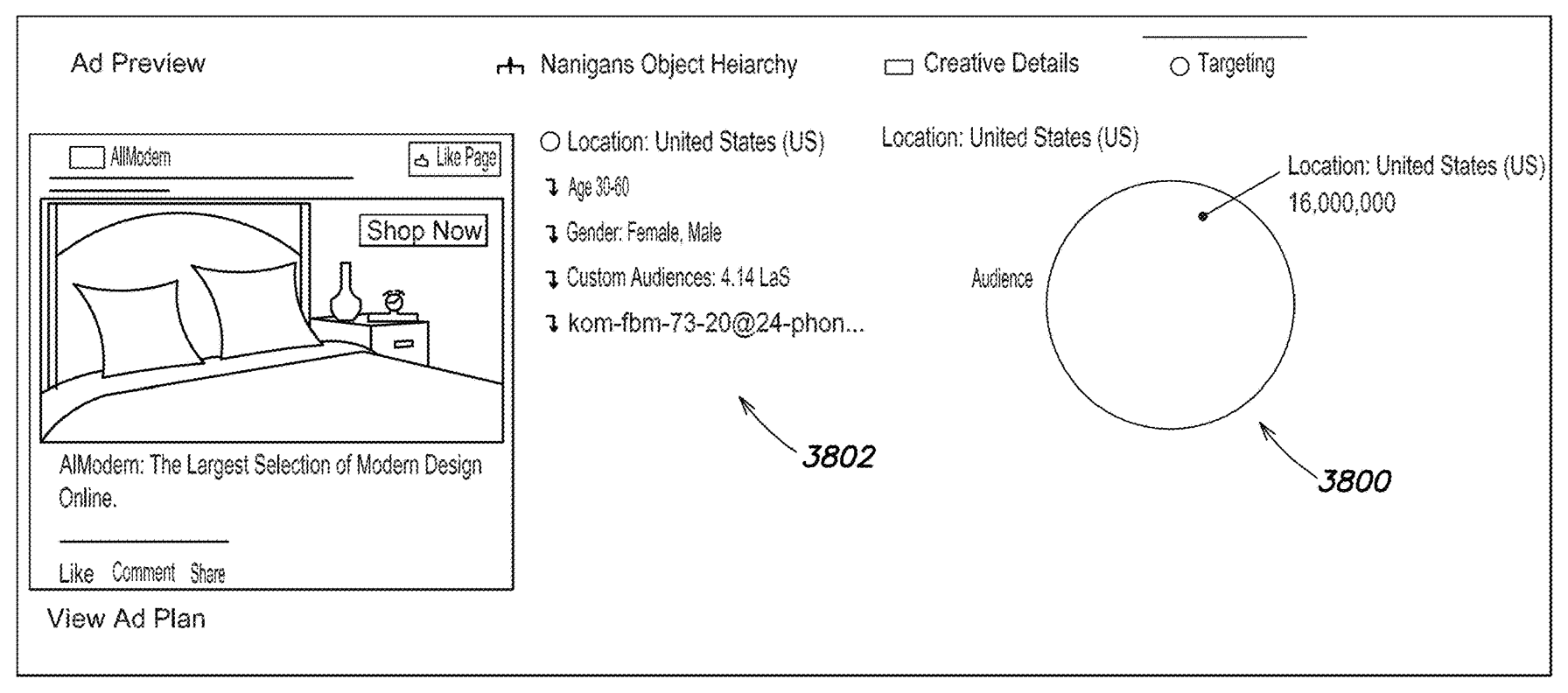
Figure 39:
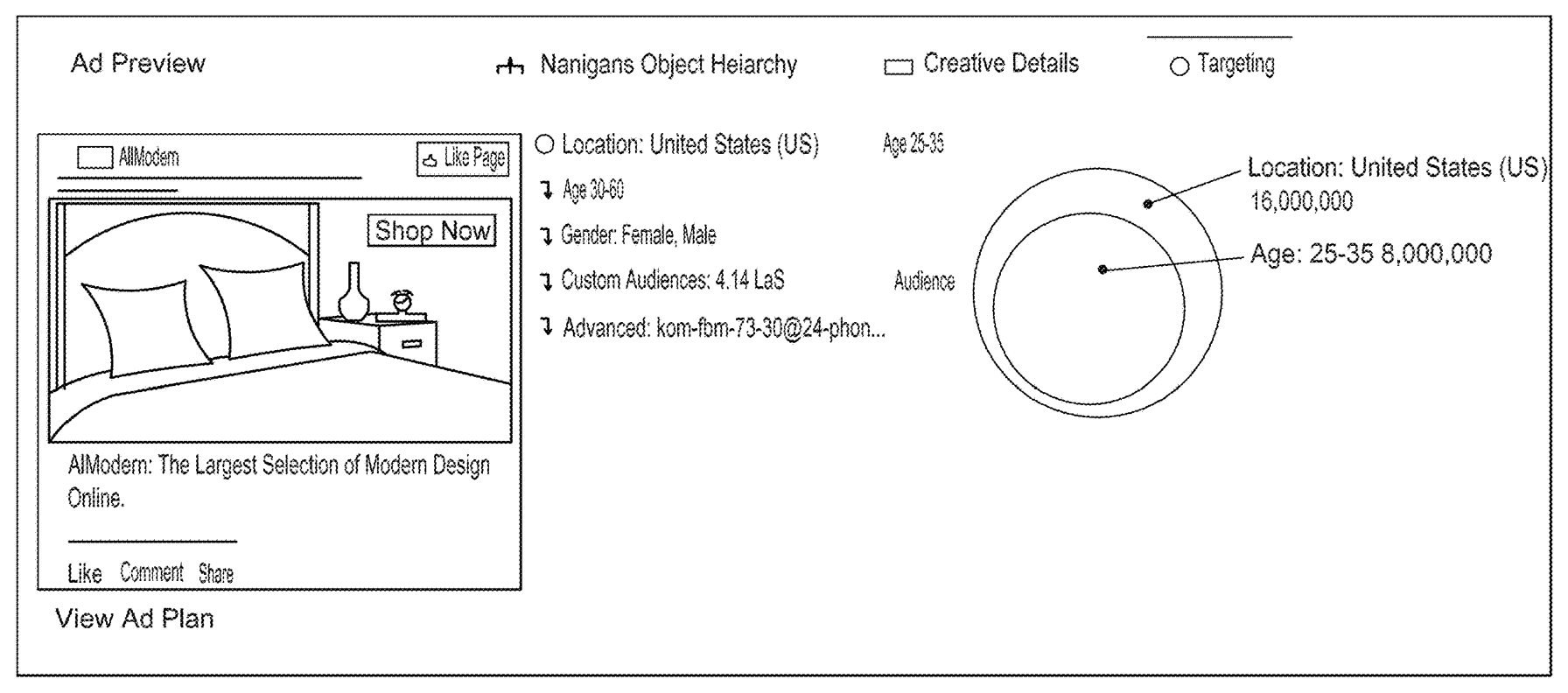
Figure 40:
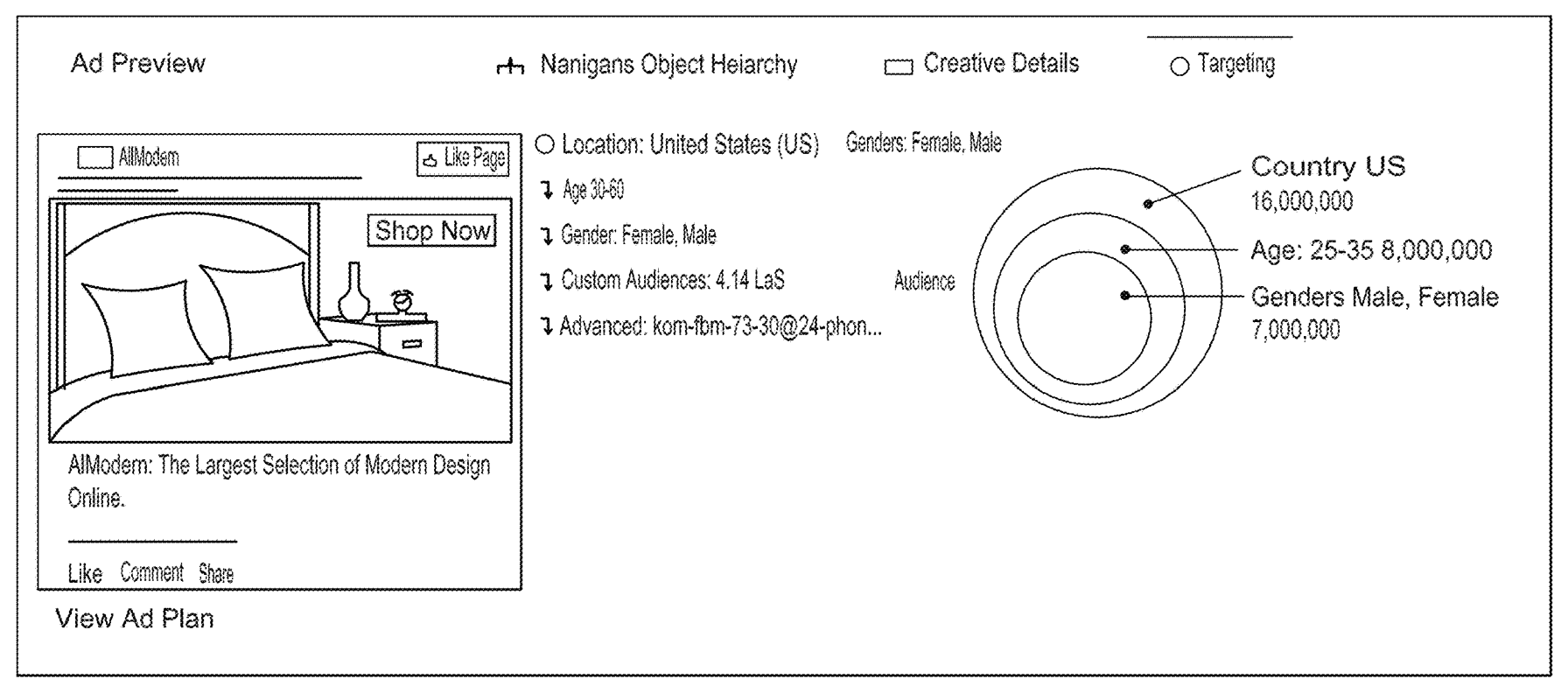
Figure 41:
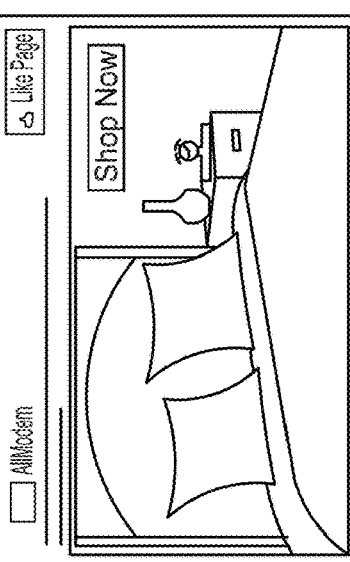
Figure 42:
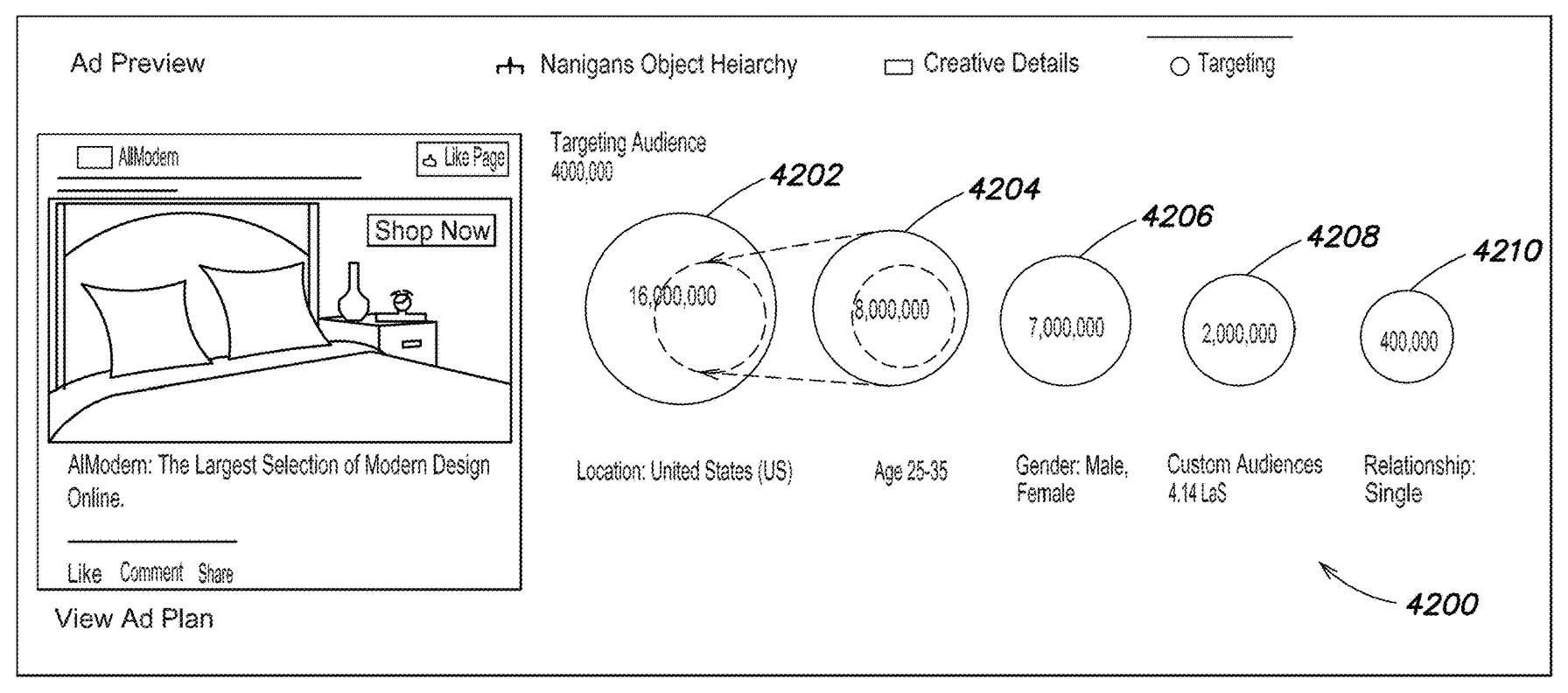

Additional views summarize the targeting information for a viewing user differently (e.g., 3600, FIG. 36). Each categorization is selectable to view information on categories (e.g., view 3700, FIG. 37) and can be navigated via selection in the user interface at 3702. View 3800, FIG. 38 shows the information associated with selection of Location 3802. FIGS. 39-41 likewise show views associated with selection of respective hierarchical groups. FIG. 42 is another example view of targeting information 4200. View 4200 displays information on each applicable hierarchical group and membership information on each group via a visual indicator associated with each group. In one example, each visual indicator (e.g., 4202-4210) can be sized relative to the associated information (e.g., membership numbers).

According to other embodiments, the user interface can include additional detailed displays of advertising metrics and/or data associated with managing an advertising network or campaign. FIGS. 43-52 illustrate various examples of user interfaces and organization of detailed advertising metrics.

Figure 45A:
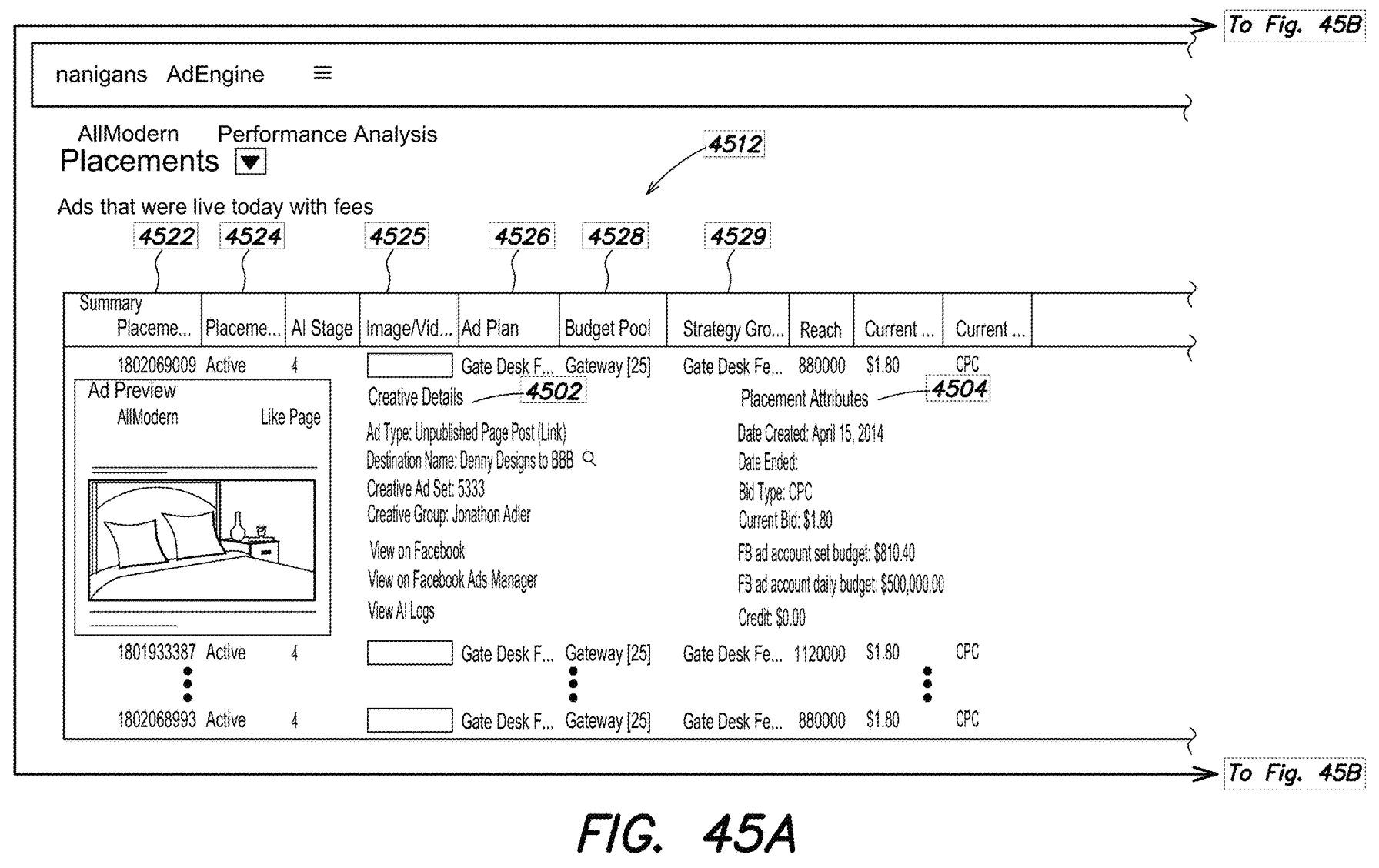
Figure 45B:
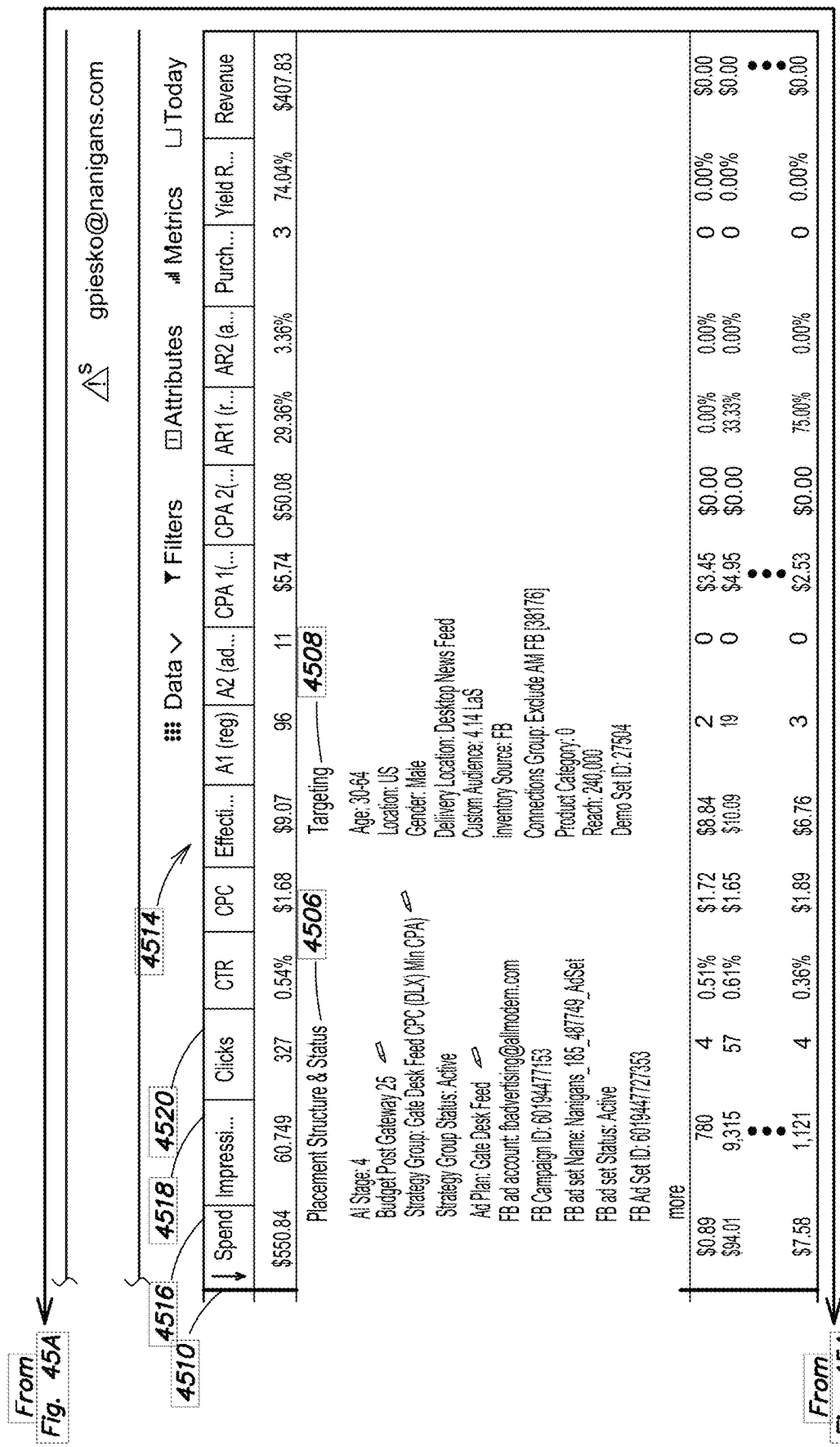
Figure 48A:
Figure 49A:
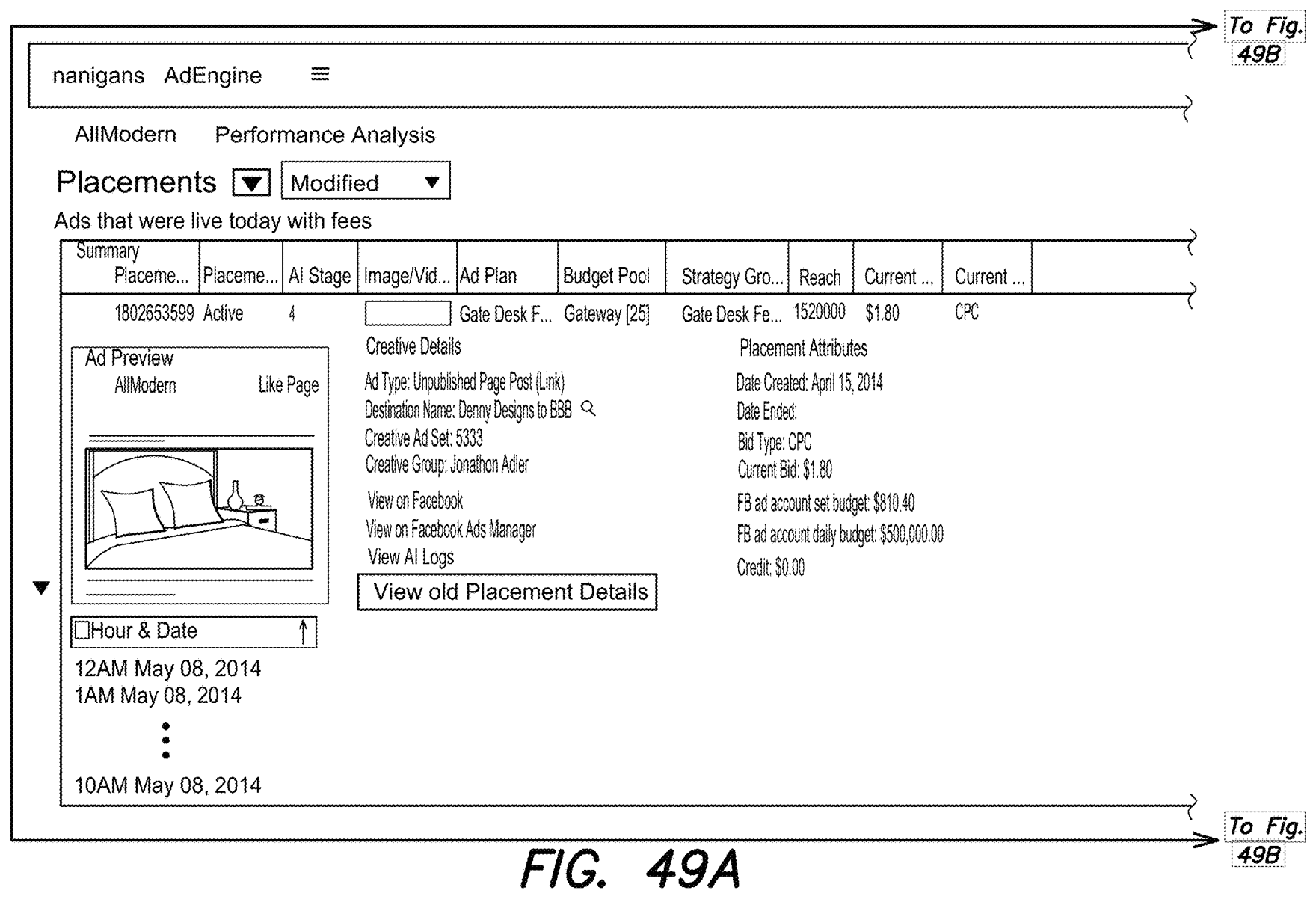

Shown FIGS. 45-49 are examples of summary inline displays that can be accessed by users while in the detailed views. Notably, FIG. 43 shows a performance view within a pivot table that is configured to show performance data associated with particular advertisements. Actions may be performed with particular entries based on the selected ad placement. For example, in the interface shown in FIG. 43, a right click of a pointing device over a particular selected placement, one or more actions may be performed. For instance, a "Placement Summary" action may be selected that permits the user to see specific information associated with a particular ad (e.g., FIG. 45 shows the result of a selection of the "Placement Summary" option within the interface). Such a summary may include a preview of the ad, details relating to the creative, placement attributes, placement structure and status, and targeting information associated with this particular ad, among other ad summary information. According to some embodiments, the user interface is configured to generate and integrate the summary view inline, so that the system can present the summary information in context and without leaving the current pivot table display.

Other actions may be selected, including a menu option to access detailed logging activity. In one examples, a menu titles can specify "AI Logs," which transitions the system to detailed logging information tracked by the system showing the automatic placement of ads according to artificial intelligence functions. More generally, various embodiments of the system are configured to tailor machine learning algorithms based on prior user's data. In one example, selections made in the user interface are tracked by the system constrained by a current state of the system that is associated with each selection. Machine learning matching and/or fitting can be used to predict what information subsequent users will find useful by matching similar or same states to various subsequent user contexts. The system can be configured to include matching information fields based on such learning algorithms. In some examples, user interface views can be tailored to highlight such fields, and/or tailored to include or exclude information fields based on matching.

Further, other actions may be performed, such as applying additional filters to the display (e.g., via the "Add Filters" action), isolating or eliminating certain ad placements from the display (e.g., via the "Only show this Placement ID" action or the "Exclude this Placement ID" action), or displaying detailed placement performance relating to the selected ad placement (e.g., via the "Placement Performance" action).

The summary displays aggregate the information being viewed in the detailed view organized based on the management function (e.g., FIG. 45 Creative Details 4502, Placement Attributes 4504, Placement Structure & Status 4506; and Targeting 4508) for a selected advertisement. FIG. 45 illustrates an in-line user interface element introduced into a table based visualization of placement data. As shown the inline display is configured to span the length of a row and expand automatically the height of a row to accommodate the in-line display. Multiple in-line displays can be accessed in the user interface and can facilitate direct comparison without requiring the user to navigation through other screens to have access to the same comparison information. The inline display can also be configured to be navigable, for example, FIGS. 25B-42 show additional embodiments of example inline displays that can be access from table based views similar to FIG. 45.

FIG. 45 illustrates an example in-line user interface element introduced into a table based visualization of placement data (e.g., data-centric pivot table). As shown the inline display is configured to span the length of a row and expand automatically the height of a row to accommodate the in-line display. Multiple in-line displays can be accessed in the user interface and can facilitate direct comparison without requiring the user to navigated through other screens to have access to the same comparison information. The inline display can also be configured to be navigable, for example, FIGS. 25B-42 show additional embodiments of example displays that can be access from table based views and inline line displays similar to FIG. 45. In other embodiments, the views shown in FIG. 25B-42 can be displayed as an overlay window, shown in proximity (e.g., just below or above) a row in a table based view of associated detailed placement data so that the detailed placement data is shown as context in conjunction with the overlay windows.

According to one embodiment, a visual indication of a separator bar 4510 is shown. The user interface can be configured to be responsive to user actions associated with repositioning the separator 4510, so that a first portion of the display 4512 and a second portion of the display 4514 can be dynamically manipulated. For example, in response to the translation of the separator 4510 (e.g., moving the separator 4510 left or right in the display), additional advertisement data or metrics can be hidden or displayed in either of the first portion 4512 or the second portion of the display 4514. FIG. 45 shows advertisement metrics 4516-4520 as including spend data 4516, impressions 4518, and clicks 4520, among other data columns of the tabular display. The first portion of the display can include metrics such as placement identifier 4522, placement status 4524, image 4525, Ad Plan

4526 (e.g., hierarchical grouping of placements and budget groups), budget pool 4528 (e.g., hierarchical grouping of placements based on common budget), strategy group (e.g., hierarchical grouping of placements under common management control), audience information 4530 (e.g., reach—showing number of discrete or not users shown placement), current bid 4532, and current spend limit basis 4534 (e.g., cost per click).

In some embodiments, translation of the separator 4510 can trigger the user interface to automatically resize information displayed in the first and/or second portion of the view in the display, and in some examples, enable the user interface to continue to visualize the current advertising parameters 4516-4520, while introducing additional relevant information in the first portion of the display by manipulating the separator 4510. In some embodiments, detailed information fields are ordered automatically by the system and responsive to manipulations of the separator 4510, the detailed information is introduced into the display based on the system based ordering (e.g., spend 4516, impressions 4518, clicks 4520, etc.). In some alternatives, the system and/or user interface retains information on any modifications to a view that and end user selects, including for example, user specified ordering of column and/or selection/exclusion of columns to be displayed. In one example, the modifications to the view (e.g., data ordering, selected data elements, removed data elements, separator position, etc.) can be retained as a temporary view. The temporary view can be preserved across multiple logins, etc. but can also be subject to any latter modifications. In further embodiments, any changes a user wishes to maintain can be saved as user named views and made accessible through the user interface.

According to one embodiment, the operation/translation of separator bar 4510 is configured to operate only on the first portion and second portion of the user interface. In one example, the separator 4510 does not affect the display of an integrated summary view regardless of resizing the first portion and/or second portion of the display.

Figure 53:
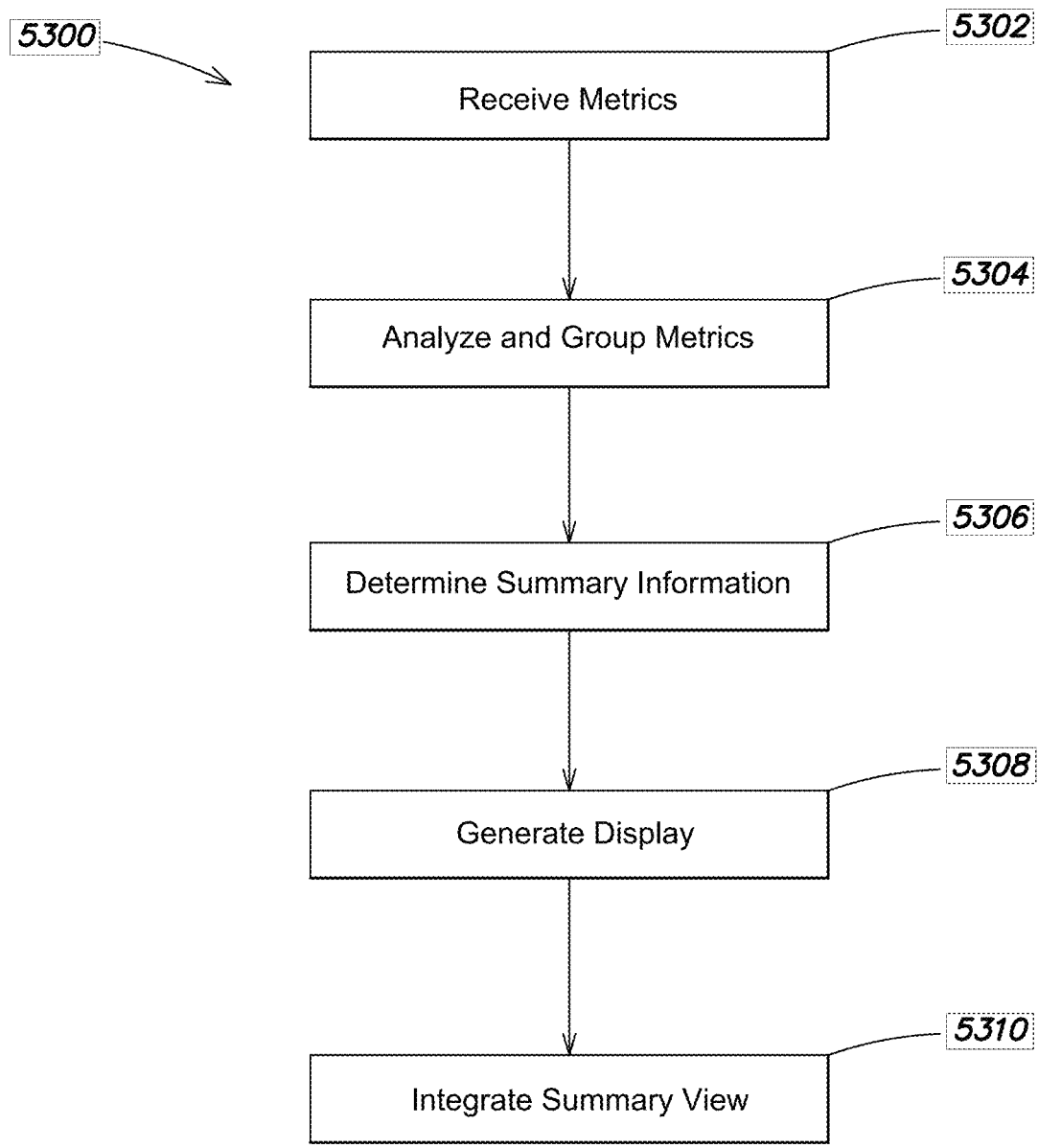
FIG. 53 is an example process flow, according to one embodiment.

FIG. 53 illustrates an example process for displaying summary information contextually. Process 5300 beings with receiving, advertising metrics from at least one API connected to a third party content provider at 5302. Where the metrics can be analyzed and grouped at 5304 into an advertising demographic hierarchy. In some embodiments, part of the analysis at 5304 can include determining summary information for the advertising metrics in each level of the advertising demographic hierarchy (e.g., advertising location, advertising target, advertising type, age group, budget pool, strategy group, ad set, individual placement, gender, custom audience, relationship, among others) or in others determining summary information can be a separate step 5306. Process 5300 continues with generating a navigable user interface display at 5308 comprising at least one selectable drawer associated with a hierarchical group of advertising metrics (e.g., site, budget pool, strategy group, ad set, placement, among other options), wherein the at least one selectable drawer includes a display of a title of a respective hierarchical group. When selected the at least one selectable drawer is associated with a respective summary view of the advertising metrics within the hierarchical group that is then displayed. In one embodiment, responsive to selection of a view summary data control, process 5300 continues at 5310 with integrating the summary view into a first display of advertising metrics arranged in a tabular format. In one example, integrating occurs responsive to user selection in the user interface (e.g., of a view summary data control), In another example, the act of integrating into the first display optionally includes expanding a row of the tabular format to accommodate the summary view, and spanning the summary view across a plurality of columns of the first view.

Figure 50:
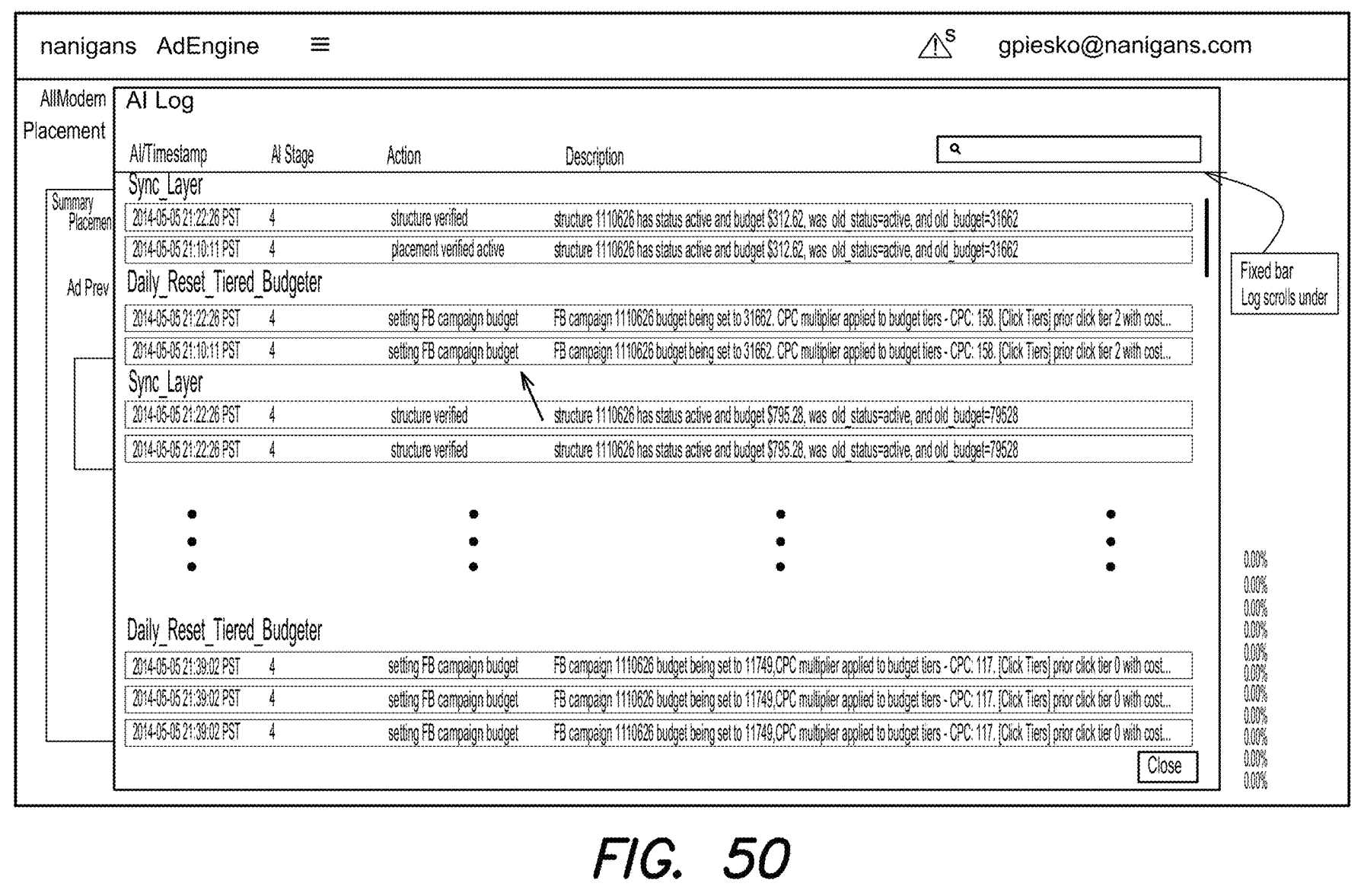
Figure 51:
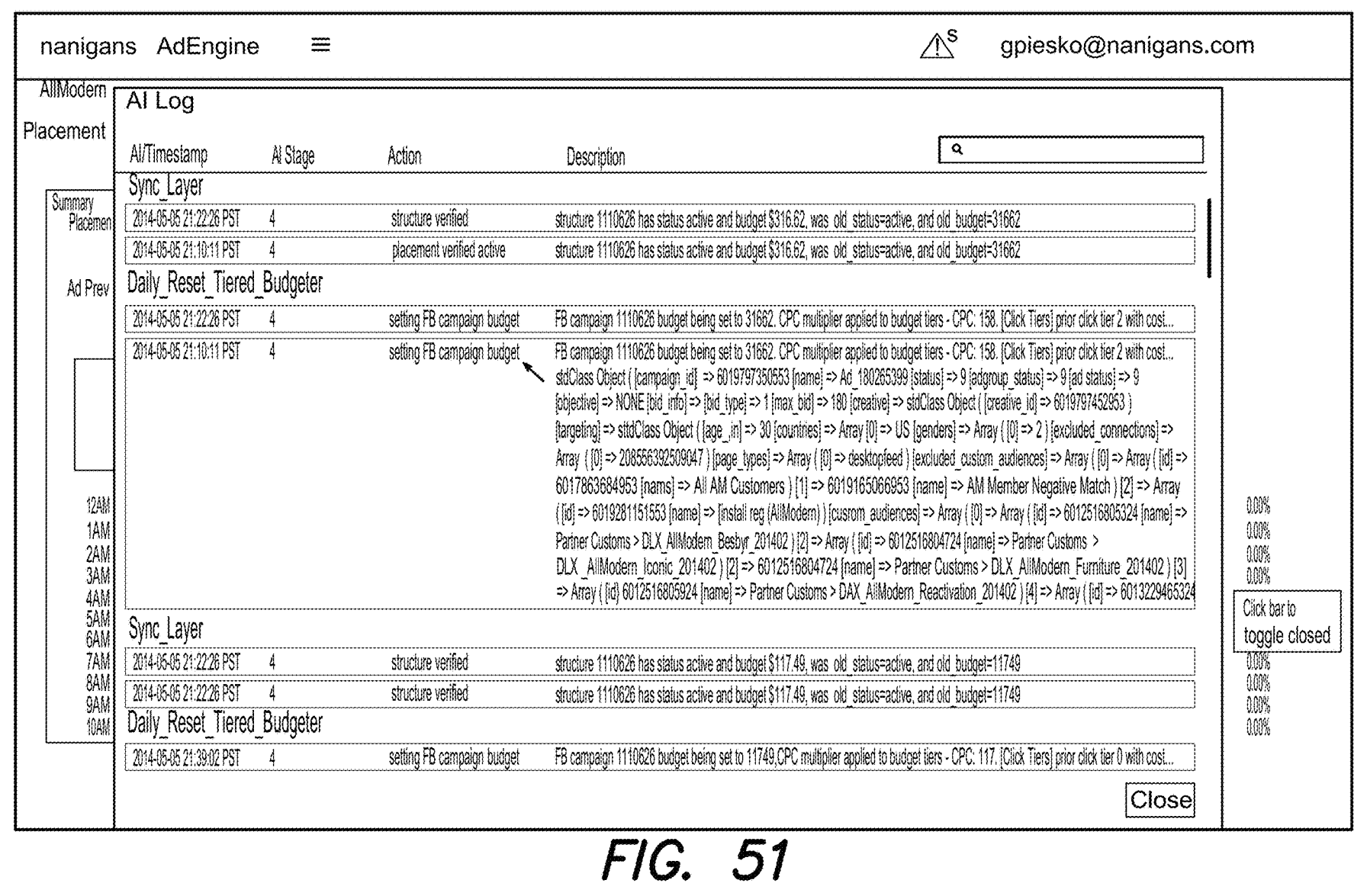

FIG. 47 illustrates another example display structure for a display focused on reducing information overload by only displaying information in one group selected at 4702, which can be displayed responsive at 4704 to selection of that group. FIGS. 50-51 display example views of detailed information for a particular advertisement or advertising group based on received advertising metrics that are analyzed and/or summarized by the system into the preceding displays.

Figure 52B:
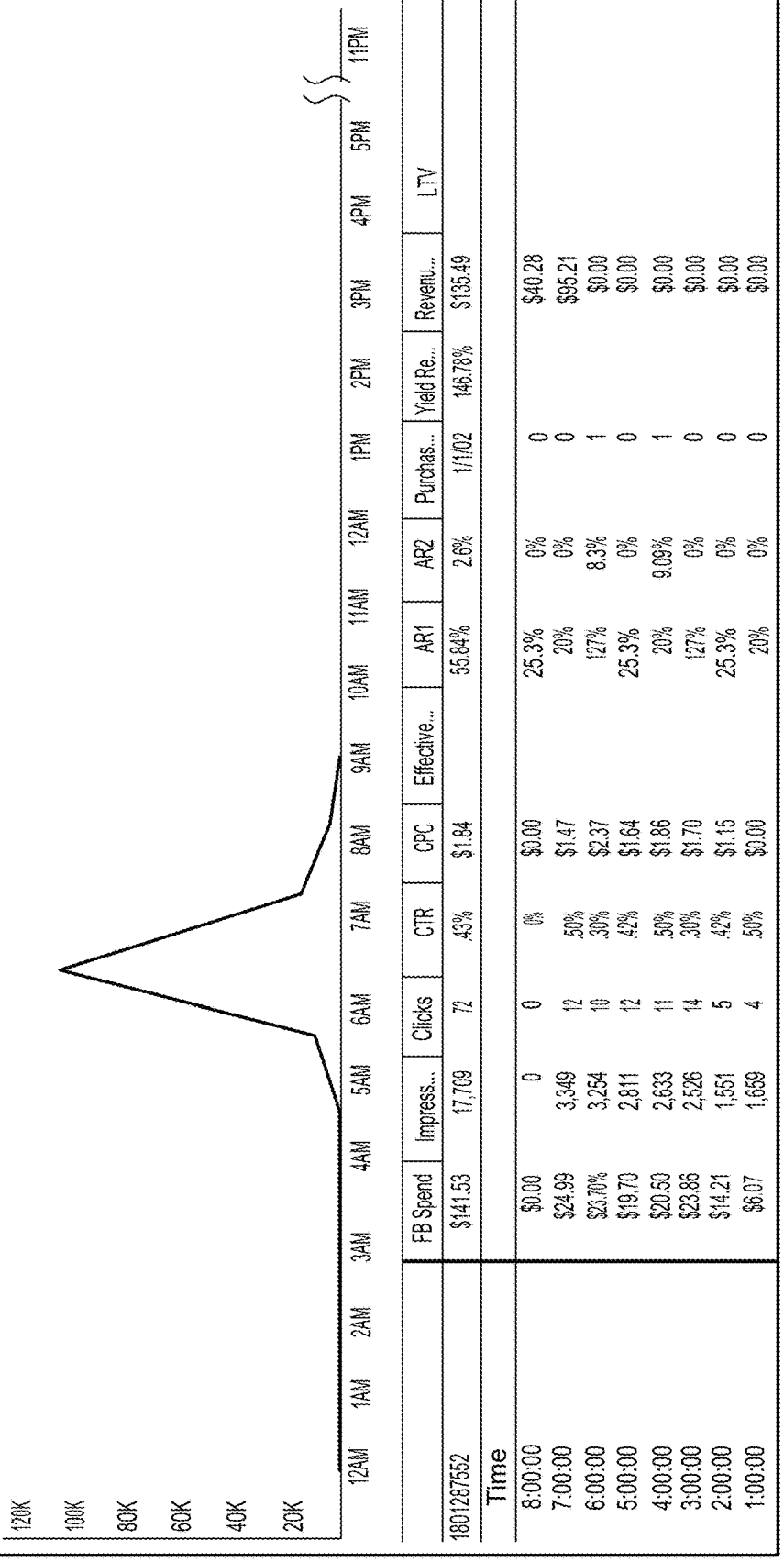

In other examples, summary information views can be combined with other graphical summarization information. For example, FIG. 52 illustrates and example view 5200 combining summary information views with detailed graphical analysis of a particular advertisement. The user interface simplifies comparison of summary information (which can be used as a benchmark) with individual performance (e.g., over time).

In some examples, the system and/or user interface facilitates the consumption of large volumes of data associated with advertisement placement and execution. For example, the user interface provides a placement summary (e.g., FIG. 45) that users can access to view granular information on the creative (e.g., 4502), placement attributes (e.g., 4504, ad structure (e.g., 4506), and targeting (e.g., 4508) detail for individual ads. When comparing ad performance, the placement summary can be used to view attributes of any ad such as, delivery location, audiences you are targeting, bid type, bid amount, among other information.

Another option provided in some embodiments includes visualizations of the performance of an individual placement over time. In one example, selection in the user interface triggers the system to display a table and chart of how that ad placement performed over time. The display can dynamically refresh during viewing as additional advertising metrics are received by the system. In one example, the placement summary also provides additional information such as, AI Logs that allow a user to see more detail about optimization logic applied to a placement. In addition, the user can also view ad placement on advertising platforms (e.g., Facebook) to see comments, likes, and shares.

According to another aspect, generation of logical groupings of advertising types provides selectable options in the user interface that facilitate advertising management. Each grouping is responsive to mouse over operations to display information for matching. The Ad Type grouping remain the same across any view, and are selectable within the UI to display how each ad will be presented on Facebook.

In various examples, extremely long urls are handled by the system by creating shorter visualizations of the long urls.

Interfaces to such a system may include functions such as those discussed above in relation to FIGS. 1-17 for performing advertisement generation, optimization, and viewing analytics for data driven ad management. The interfaces may be browser-based applications written in a variety of programming language including, but not limited to Java, Javascript, PHP, among others. Such an architecture (e.g., the Data Analytics and Workflow Architecture) may be designed to handle many events in a scalable manner. Raw data may be stored in a relational database (e.g., MySQL) as the vast majority of the data is relational in nature and databases such as MySQL provide ACID transactions. To achieve the performance required and support multi-tier pivoting, the system 1900 may be configured to load all of the required MySQL data into memory. In one embodiment, the system may break the information into three types, as described above:

Content metadata (i.e., creative parameter)
Audience based metadata (i.e., audience parameter)
Placement based data (i.e., context parameter).

Placement metadata may be stored in memory and, according to one embodiment, the data is immutable. Loading this data often requires joins across many tables and can be slow; however, it is appreciated that once in memory, the data can be accessed very quickly. Recent metadata may be kept in memory while older data is retained based on user access. The data may be refreshed regularly, or changes to data may be streamed into the architecture to ensure the query results represent real-time metrics.

The query engine acts upon the data in memory using data agnostic actions (i.e. group, sort, where, having). It is noted that, according to one implementation, the data model and data access layers are completely decoupled from the query engine. The paths given to the query engine refer to fields within the object using reflection and support expressions against those fields. This allows for using the architecture to analyze other future data objects beyond just placements.

The query engine may use a procedural language to process the data. Below is an example:
GET(1234)
WHERE(EQUAL,placement.audience.minage,15)
GROUP(placement.audience.gender,placement.creative.title)
SORT(0,placement.creative.image,DESC,placement.bidtype,ASC)
ATTACH(1234,TODAY,HOUR)
HAVING(1,GREATER_THAN,placementperformance.clicks/placementperformance.impressions,0.5)

In this case, placement metadata for site 1234 is utilized and first filters out any placements whose audience minimum age is 15. The results are then grouped by audience gender and creative title and sorted by image and bid type. Attach then combines metadata with today's time based performance data and groups it by hour. Finally, the having step filters any aggregate data for each hour to only include those whose click through rate is greater than 50%. Data is represented as a tree with aggregate summaries at each non-leaf node. The result is that loading Placement Analysis for a customer in a conventional architecture with 1 million placements would take between 20-30 minutes, while the data analytics and workflow architecture is capable of executing a more complex query in under 2 seconds.

In FIG. 19, the advertisement build layer 1904 is adapted to receive definition a plurality of build parameters of a new advertisement. In various embodiments, the plurality of build parameters includes a creative parameter, an audience parameter, and a context parameter. The build parameters may be defined according activation of build tools provided in a build panel displayed by the user interface component coextensive with the advertisement data. At the advertisement build layer 1904, the user interface component is configured to provide a visual representation of the one or more build tools, each build tool selectable and adapted to define a particular advertisement parameter. As described above, each build tool may include one or more selectable objects or options the selection of which specifies an attribute of the particular advertisement parameter. For instance, each build tool may include a drop down menu of listed attributes, a text based search, a series of buttons, a series of check boxes, or any other tool that includes advertisements parameter attributes. As discussed above, each advertisement parameter may include a plurality of attributes each configured to define and specify the particular advertisement parameter. In at least one embodiment, advertisement parameters defined for a new advertisement may include one or more advertisement parameters imported from a pre-existing advertisement.

Accordingly, the cross-channel generics layer 1910 is interconnected with the advertisement build layer 1904. The cross-channel generics layer 1910 is adapted receive user selected advertisement parameters and advertisement parameter attributes and deliver the received parameters and attributes to the advertisement representation layer 1912. For instance, in one embodiment, data is passed between the advertisement build layer 1904 and the cross-channel generics layer 1910 based on a JSON-RPC, wherein parameters are passed as an array or object. Accordingly, in one or more embodiments, one or more components at the cross-channel generics layer 1910 are adapted to capture advertisement data from the data analytics layer for at least one of the creative parameter, audience parameter, and context parameter for the new advertisement. Varying destination channels will have different organizations of advertisement attributes into parameters, and may have different representations of the attributes themselves. For example, a FACEBOOK channel may not provide a context parameter, and although the FACEBOOK and a TWITTER channel may both provide for language targeting, they may use different representations for the language attribute. The cross-channel generics layer 1910 provides translation of advertising parameters and a unified representation of attributes to support data transfer between the advertisement build layer 1904 and the channel-specific advertisement representation layer 1912 and the channel translation layer 1914. Accordingly, the cross-channel generics layer 1910 provides a common API and grammar rules for interfacing across destination channels, as well as defining a single set of representations for attributes that are common in meaning across channels (like country, gender, age, language, keyword targeting) but have channel-specific encoding.

The advertisement representation layer 1912 is interconnected with at least the cross-channel generics layer 1910 and data analytics layer 1902. In various embodiments, the advertisement representation layer 1912 is adapted to assemble the new advertisement based on the defined advertisement parameters and advertisement parameter attributes. In particular, each advertisement parameter or attribute may include a generic data object. For instance, one or more build subsystem, such as the build subsystem of FIG. 18, may be adapted to generate the advertisement based on the defined parameters and attributes. Using a broader format (i.e., more inclusive data model) enables functionality across a plurality of advertising systems. When the destination system (e.g., Nanigans' AdEngine) deploys ads, the ads are compiled or pushed from the generic data objects into the FACEBOOK data model through the channel translation layer 1914, which may include a plurality of channel specific modules. Ingestion reverses this approach and translates FACEBOOK's data model into the generic form of the destination system. The campaign/ad representation layer 1912 further provides structured storage for both the general advertisement attributes selected in the advertisement build layer 1904, the specific channel objects used by the channel translation layer 1914, and definition of display-appropriate representations of the identifiers used by the data management layer 1908.

In FIG. 19, the campaign configuration layer 1906 is adapted to define a rules-based campaign configuration. In various embodiments, campaigns may include groupings of advertisements associated with a particular campaign name, id, objective, and status. The user interface component may provide a user with one or more interactive selections to generate or interact with campaign data. According to one embodiment, users may use a pivot table of the user interface to view, sort through, and visualize multiple dimensions of campaign data. Such tables, according to various embodiments, are configured with the attributes and metrics that matter by adding predefined audiences, creative elements, data-related attributes or placement details, followed by the metrics that determine campaign success. Once the selections within the interface have been made, the user may be permitted to simply drag and drop to re-order metrics to create a customized campaign dashboard. Such interfaces may be modified to include a summary view associated with a specific ad within the table based on specific user selections within the pivot table. This permits, for example, a user to selectively create a dashboard using certain metrics while at the same time seeing the specific ad placements and their associated summaries according to the configured dashboard. For instance, if an advertiser wants to see which creative was performing the best, the user is permitted to sort by key metrics (e.g., ROI, LTV, CTR, CPC, etc.) and locate specific summary view information relating to those placements.

Figure 20:
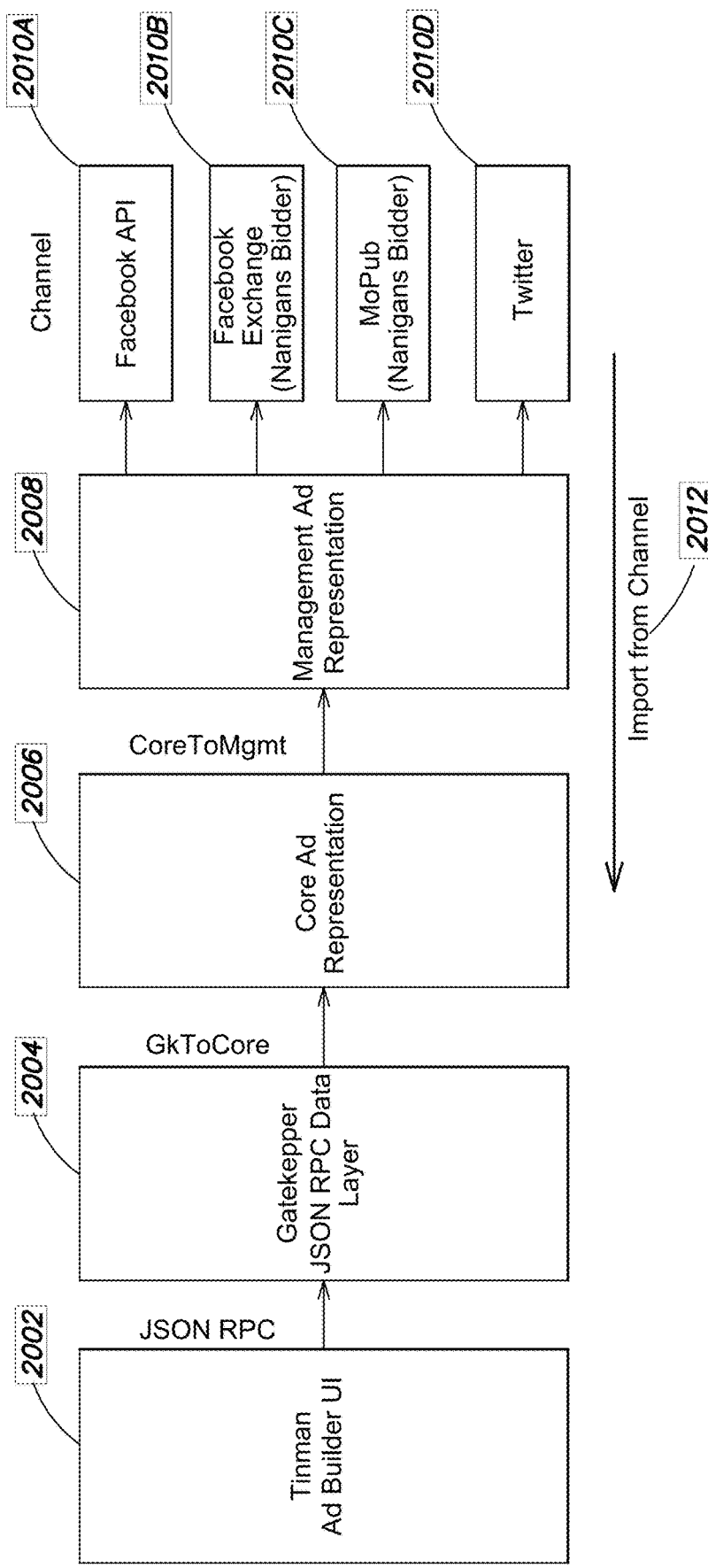
FIG. 20 shows an example data flow of a system for incorporating various aspects and embodiments.

In various embodiments, the system 1900 includes a predictive, analytics, and optimization layer 1916 interposed between the advertisement representation layer 1912 and the campaign configuration layer 1906. The predictive, analytics, and optimization layer 1916 may be adapted to provide one or more advertisement parameter suggestions. In various embodiments the destination format is configured to enable predictive optimizations on the execution and management of individual advertisements, groups of advertisements, and entire advertising campaigns. In some embodiments, after receiving advertising campaigns, a new management system can operate on historical data to predict performance and/or optimize execution of advertisements and/or make one or more suggestions. Automation enables the system to distinguish between ads that have good value (methods and systems for determining value are described in Co-Pending U.S. patent application Ser. No. 14/324,992, entitled PREDICTING CONSUMER LIFETIME VALUE, filed on Jul. 7, 2014, which is incorporated by reference herein in its entirety), and ads that are likely throwing money away—equally important, in some examples, is that the system can convey high volumes of data to an end user, understandably and manageably, through customized displays. FIG. 20 shows an alternate view of data flow through the processing layers of an integrated system of one embodiment, such as the processing layers of the system infrastructure shown in FIG. 19. In one embodiment, an ad builder UI 2002 FIG. 20 enables definition of advertising parameters for an ad placement. As discussed above the UI can include contextual displays of a plurality of existing placements and the associated data can be captures and used to population data fields for the parameters for an ad placement. As the parameters are defined they can be passed through a gatekeeper server 2004, which can be configured to reduce the received parameters to a core ad or placement representation 2006, which can be used to establish a management ad representation 2008 configured to enable management of a plurality of channel specific ads or placements and/or associated functions, where the placements can be generated from the core representation. In one example, the management placement representation is configured to enable management across, for example FACEBOOK via an API 2010A, FACEBOOK EXCHANGE 2010B, MOPUB 2010C, TWITTER 2010D, etc. Each modification to the placement and/or execution of a management function (e.g., bid up, bid down, pause, re-target audience, re-deploy placement, etc.) can return performance information from the respective channels (e.g., at 2012). The UI can be configured to visualize the returned information, for example, using the management placement representation.

Example Media Object Data and Metric Organization

As described above, various embodiments include systems for high volume data visualization, and in particular, systems including a user interface component adapted to dynamically generate a visual display of high data volumes, the data including advertising data corresponding to at least a one advertisement. In at least one embodiment, advertising data includes advertising data metrics, and the user interface component is further adapted to analyze and group the advertising data metrics into an advertising demographic hierarchy (e.g., advertising location, advertising target, advertising type, age group, budget pool, strategy group, ad set, individual placement, gender, custom audience, relationship, among others) adapted for display in the visual display of the high data volumes. The user interface component may be further adapted to dynamically generate information dimension visual displays on historical advertising metrics responsive to user selection of information dimensions associated with the at least first advertisement.

In at least one embodiment, advertisement data or metrics are provided in one or more recursive row groupings. For example, if a "row group" of advertisement data is visible in the user interface and spans more than 10 rows, instead of filling memory or the user interface with all the advertisement data, the system subdivides the main row group into subsidiary "row groups" again. At each stage of data loading and/or visualization of each large group of data can be divided into a first hierarchical level, a first sub-level, a second sub-level, and further sub-levels until a manageable number of rows is achieved. In some embodiments, by applying this algorithm recursively, the system reduces need for large amounts of DOM elements down to an efficient level of DOM elements utilized in a display that allows users to access exceedingly large number of rows.

In further embodiments, searching for row groups that should be loaded into memory or shown the user interface is executed by the system as a tree search that generates and returns results efficiently. In one example, the system reduces the problems associated with loading and displaying a million rows into a logarithmic solution. In terms of a logarithmic solution, increasing the data size handled by the recursive row group solution by 10 fold adds only 10 new DOM elements to the execution. Thus, the problem is resolved up and until the point that backend delivery sets a processing ceiling, and also where the maximum height of a page that a browser can render is limited to approximately 32 million pixels.

In some embodiments, the underlying functions of row rendering and height approximation can be implemented with a variety of solutions. For example, there are many approaches for rendering that can include traditional table elements, sized "divs," or more complex solutions like "display:box." The various approaches can be integrated with recursive row grouping to build, load, and display massive lists of arbitrary elements.

In some embodiments, one or more filters provided by the user interface can include hierarchy aware filters. In one example, the filters listed are determined by the system based on a position in the hierarchical display of the data in the main body of the user interface 7202. In further embodiments, the filer bar 7204 includes a search tool for accessing a filter, sub-filter, or custom filter executable against the current data set. Selected filters are shown are the bottom of bar 7204 at 7210. The selected filters can be edited (e.g., via selection of 7212 or removed 7214. In other embodiments, filtering can be applied at any level of the data hierarchy.

As discussed above, information may be aggregated and for use in pivot tables that can be presented to users within a management interface. Such pivot tables may access a tree-like data structure having multi-layer aggregation that permits attribute and metric filtering at any layer. To this end, a custom procedural query engine may be provided that is capable of generating this tree-like structure. The infrastructure itself may be underpinned by a dynamically balanced fault tolerant server structure. For example, a load balancer may be provided that distributes load to one or more nodes which performs various functions (such as tree generation/management and SQL operations on a MySQL database).

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Example Display Process

Figure 21:
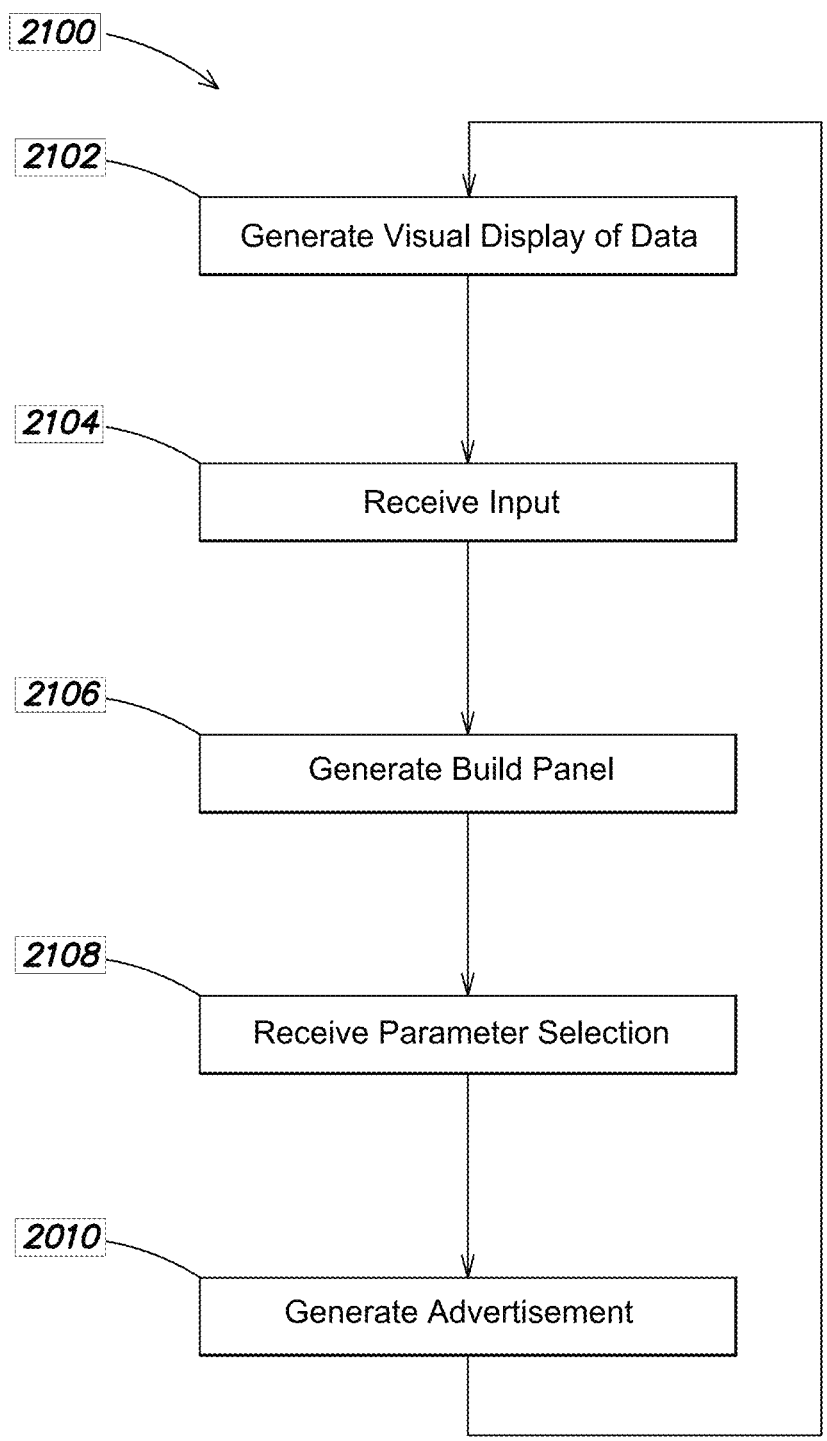
FIG. 21 shows one example of a process flow for providing a user interface according to aspects and embodiments.

As described above with reference to FIGS. 1-20, several embodiments perform processes that provide a user interface for interaction with advertisement data and generation of new advertisements. In some embodiments, these processes are executed by an integrated system, such as the systems described above with reference to FIG. 19 and FIG. 20. One example of such a process is illustrated in FIG. 21. According to this example, the process 2100 includes the acts of generating a visual display of advertisement data or metrics, receiving an input, generating and visualizing a build panel, receiving selection of an advertisement parameter, and generating an advertisement. As discussed above, embodiments augment the executional efficiency of the system via build panel displays that are introduced into contextually relevant information displays. Based on the integration of the displayed information and build functions, various embodiments improve execution efficiency of the system. For example, various embodiments reduce the number of screens that need to be displayed corresponding to a reduction, for example, in memory requirements, processing requirements, among other options. In memory requests by the system are likewise reduced as in other systems the user interface would replace the advertising data currently in memory with build function displays, forcing repeated loading of advertisement data in order have access to same information being displayed by the integrated user interface.

According to other embodiments, automated transitions in the user interface reformat and/or resize displayed data to incorporate build panel functions, integrating information access previously maintained separately. The dynamic integration and automatic display operations reduces the number of screens and/or system transitions that need to be visualized by the system, and thereby reduces the processing and memory required to perform the same operations with access to the same information over conventional approaches.

In various embodiments, the process 2100 includes the act of generating a visual display of high volumes of advertising data or metrics (act 2102). As described above with reference to FIG. 1, the visual display may include a summary view tailored for understanding and summarizing metrics associated with advertisement data associated within individual advertisements. The visual display may include a main display including a listing of advertisement data for individual advertisements, in which each advertisement is organized by one or more advertisement parameters, such as a creative parameter, an audience parameter, and a context parameter. As shown in FIG. 1, the main display may include a listing of advertisement data arranged in rows and columns for each advertisement. In particular, each advertisement may include a selectable group of advertisements which may be expanded in the user interface via selection. Within each grouping, additional levels of advertisements and corresponding data may exist. In various embodiments, generating a visual display of high volumes of data includes providing a selectable build indicator, such as a selectable "Build Now" indicator.

In act 2104, the process 2100 may include the act of receiving an input. For instance, in various embodiments receiving an input includes receiving user selection of the build indicator. As shown in the view of FIG. 1, the build indicator may be arranged in a substantially upper-right side of the visual display generated by the user interface; however, in further embodiments any suitable indicator and placement may be used.

In act 2106, responsive to the receipt of input (e.g., user selection of the build indicator), the process 2100 may include the act of generating and visualizing a build panel. In various embodiments, the build panel is displayed coextensively with advertisement data or metrics, such as advertisement data or metrics included in the main display of the user interface. In various embodiments, generating and visualizing the build panel includes positioning the build panel along a perimeter of the user interface, such that a user may effectively review and/or manage advertisement data or metrics within the main body while generating a new advertisement within the build panel. As described above with reference to the view of a user interface shown in FIG. 3, generating and visualizing the build panel may include resizing and/or reconfiguring the main display, in addition to advertisement data or metrics within the main display. While in some embodiments, the build panel may be delivered "on top of" the main display, in various other embodiments, the user interface performs one or more functions to reorganize advertisement data or metrics within the main display, such that view of the contents of the main display is not obstructed. Such embodiments are further described above with reference to at least FIG. 3.

In act 2108, the process 2100 may include receiving selection of a build tool corresponding to generation of a new advertisement. In various embodiments, the build panel provides one or more build tools adapted to define advertisement parameters of a new advertisement to be generated. Each build tool may include one or more selectable objects or options the selection of which specifies the advertisement parameter, or in further embodiments, an attribute of an advertisement parameter. In various embodiments, the process 2100 may include defining a particular advertisement parameter (audience parameter, context parameter, or creative parameter) responsive to receipt of a parameter selection. In various embodiments, receiving a parameter selection includes receiving a selection from a user. Further processes for receiving selection of an advertisement parameter or attribute are described below with reference to FIG. 22.

In act 2110, the process 2100 may include generating an advertisement based on at least the defined advertisement parameters. In various embodiments, act 2110 may include generating an advertisement based on a user defined creative parameter, context parameter, and audience parameter. Such advertisements parameters may be created according to user specified attributes, or captured from one or more advertisements within the main display of the user interface. Accordingly, various aspects and embodiments improve the user experience of a conventional data management system by increasing organization and access to more relevant detailed metrics and analytics, while also fundamentally improving the functioning of the data management system itself (i.e., speed and efficiency). That is, various embodiments permit a user to view and interact with advertisement data and metrics while concurrently generating a new advertisement.

Figure 22:
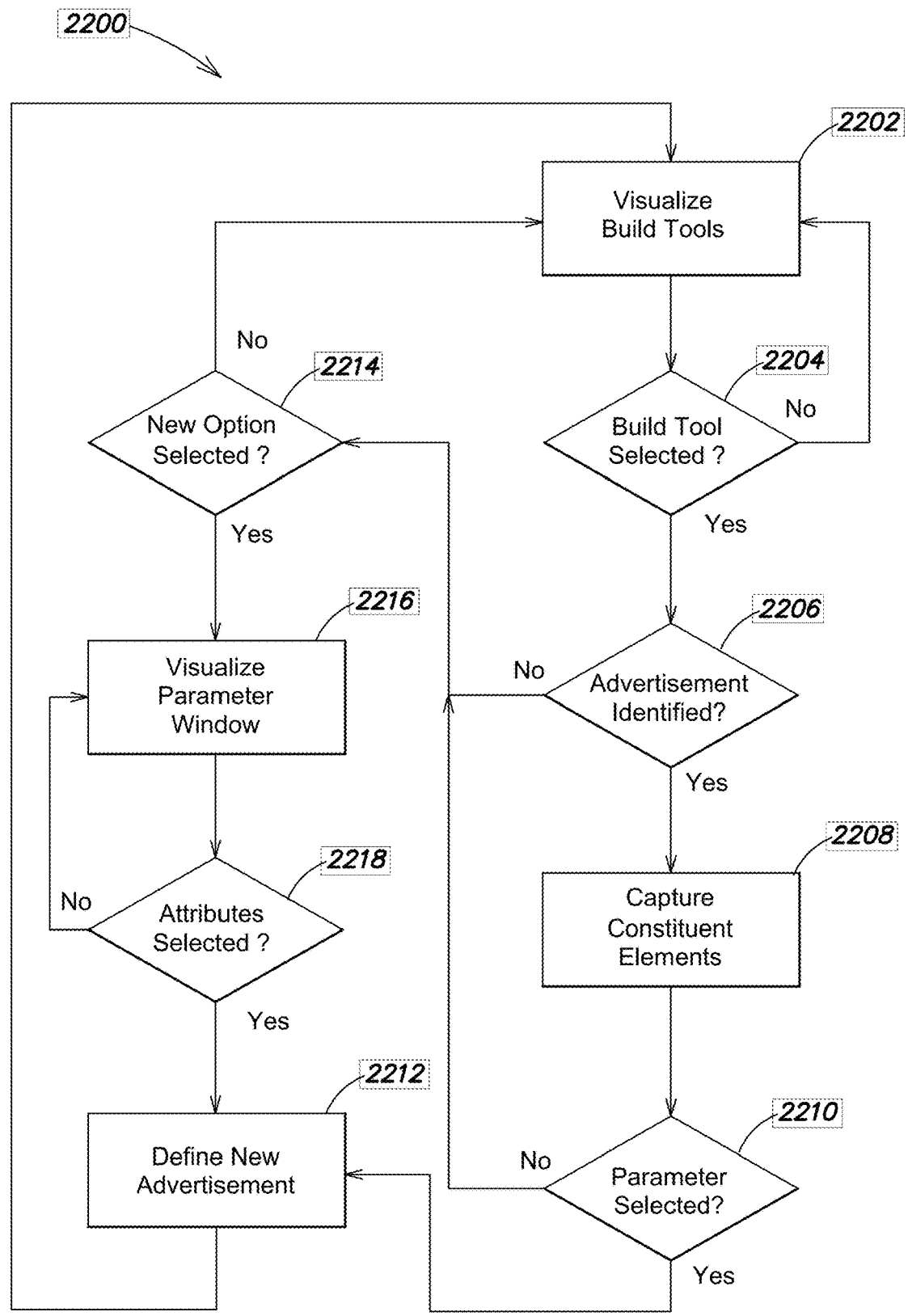
FIG. 22 shows one example of a process flow for generating an advertisement according to aspects and embodiments.

Turning now to FIG. 22, shown is one example of a process flow for generating an advertisement according to aspects and embodiments. In particular, process 2200 shows an example process flow for receiving parameter selection and transitioning a visual display of a user interface according to various embodiments. Acts described with reference to FIG. 22 may be performed by one or more components of the integrated system of FIG. 21 or 22, for example.

In various embodiments, process 2200 includes the act of visualizing at least one build tool within a build panel of a user interface. As described herein, build tools are adapted to define advertisement parameters for a new advertisement. In various embodiments, visualizing at least one build tools includes visualizing a build tool for a creative parameter, a context parameter, an audience parameter, or attributes thereof. Build tools of various embodiments may include drop down menus, text based searches, series of buttons, series of check boxes, or any other tools capable of selecting an advertisement parameter. Similarly, the each build tool may include a drop down menu of attributes, a text based search, a series of buttons, a series of check boxes, or any other tool that is capable of selecting an advertisements parameter attribute.

At decision block 2204, the process 2200 includes determining whether a build tool has been selected. If a build tool has been selected, the process 2200 proceeds to decision block 2206. If a build tool has not been selected, the process 2200 returns to act 2202. At decision block 2206, the process 2200 includes determining whether a previously created advertisement, or group of advertisements, has been identified. In various embodiments, this may include determining whether the user has identified an advertisement within the main display of the user interface. If the system determines an advertisement or group of advertisements has been identified within the main display of the user interface, the user interface captures the constituent elements of the selected advertisement(s) (act 2208). In various embodiments, act 2208 may include importing from the main display one or more advertisement parameters or advertisement parameter attributes of the identified advertisements. For instance, the imported advertisement parameters may be displayed as selectable options within a drop down menu of a build tool.

At decision block 2210, the process 2200 includes determining if one or more of the parameters or attributes of a build tool have been selected. In various embodiments, selection of an advertisement parameter or advertisement parameter attribute may include selection within a drop down menu, for example. If a parameter or attribute has been selected, the process 2200 proceeds to act 2212 where the selected parameter is defined for the new advertisement. The process 2200 then returns to act 2202 and the user interface awaits selection of an advertisement parameter for another build tool.

If at decision block 2206 an advertisement has not been identified, or if at decision block 2210 no parameter or attribute has been selected, the process 2200 includes determining if a new option has been selected (decision block 2214). As discussed above with reference to at least FIG. 5, the build tools of various embodiments may include a selectable new option. For instance, the user interface may provide within the build panel a "new" option in addition to the drop down menu, or other input mechanism, of a build tool. If a new option has not been selected, the process 2200 returns to act 2202 where the build tools are visualized within the build panel. However, if a new option has been selected, the process 2200 proceeds to act 2216 where the user interface transitions the visual display to a display of a more detailed menu permitting the user to specify the attributes of the advertisement parameter corresponding to the selected build tool. For example, FIG. 9A shows one implementation of an advertisement parameter attribute window at which a user may select one or more attributes of a new advertisement parameter.

At decision block 2218, the process 2200 include determining if one or more attributes within the advertisement parameter attribute window have been selected. If attributes have been selected, the process proceeds to 2212 where the advertisement parameter of the new advertisement is defined based on the selected attributes within the advertisement parameter attribute window. In various embodiments this may include transitioning the visual display to terminate the advertisement parameter attribute window and return to a visual display of the build panel coextensive with advertisement data. However, if attributes have not been selected, the process returns to act 2216 where the user interface displays the advertisement parameter window.

Various aspects and functions described herein may be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 54:
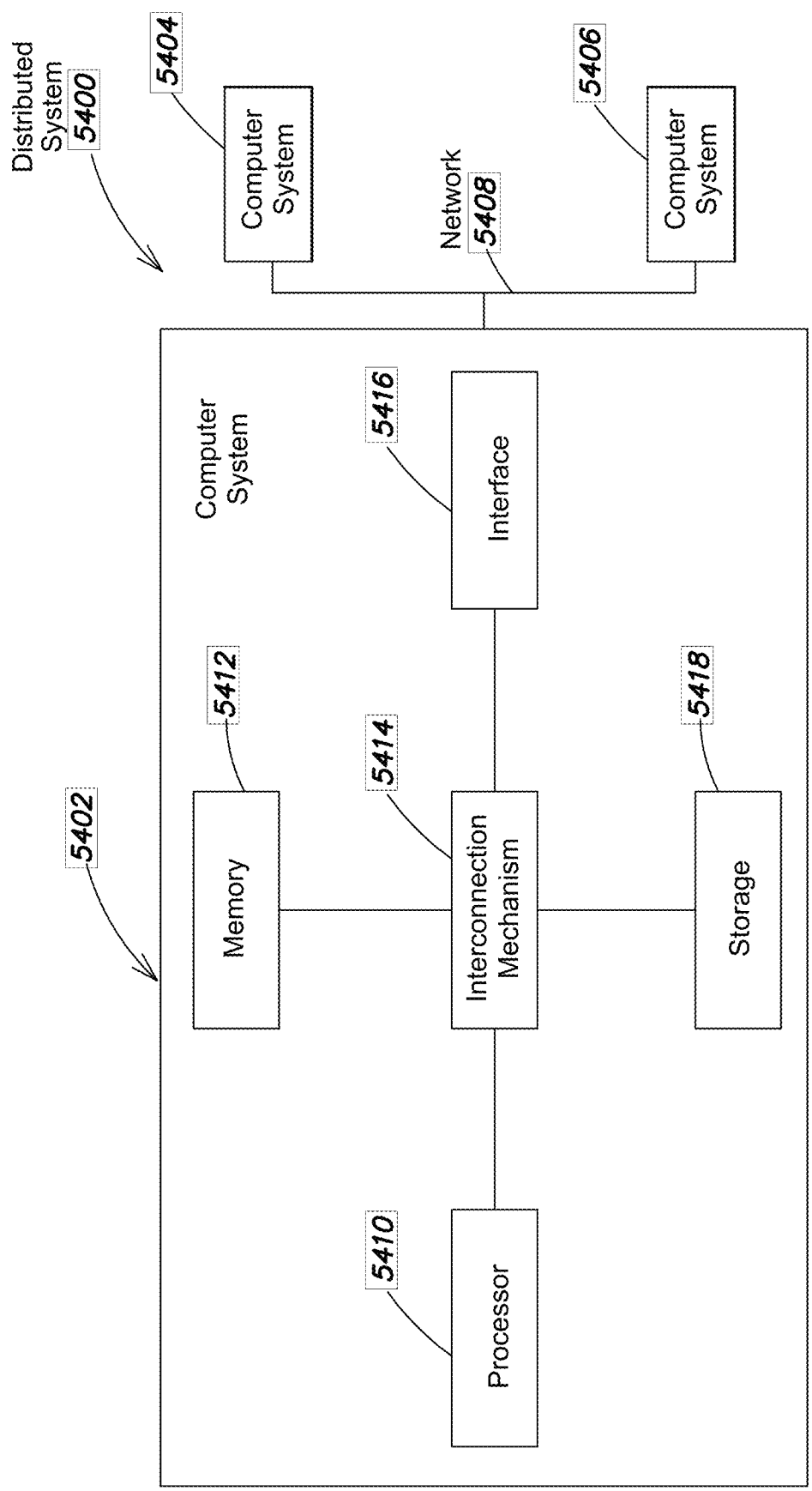
FIG. 54 is a block diagram of an example specialized computer system, according to one embodiment.

For example, various aspects, functions, and processes may be distributed among one or more computer systems configured to provide a service to one or more client computers, or to perform an overall task as part of a distributed system, such as the distributed computer system 5400 shown in FIG. 54. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 54, there is illustrated a block diagram of a distributed computer system 5400, in which various aspects and functions are practiced. As shown, the distributed computer system 5400 includes one or more computer systems that exchange information. More specifically, the distributed computer system 5400 includes computer systems 5402, 5404, and 5406. As shown, the computer systems 5402, 5404, and 5406 are interconnected by, and may exchange data through, a communication network 5408. The network 5408 may include any communication network through which computer systems may exchange data. To exchange data using the network 5408, the computer systems 5402, 5404, and 5406 and the network 5408 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 5402, 5404, and 5406 may transmit data via the network 5408 using a variety of security measures including, for example, SSL or VPN technologies. While the distributed computer system 5400 illustrates three networked computer systems, the distributed computer system 5400 is not so limited and may include any number of computer systems and computing devices, networked using any medium and communication protocol.

As illustrated in FIG. 54, the computer system 5402 includes a processor 5410, a memory 5412, an interconnection element 5414, an interface 5416 and data storage element 5418. To implement at least some of the aspects, functions, and processes disclosed herein, the processor 5410 performs a series of instructions that result in manipulated data. The processor 5410 may be any type of processor, multiprocessor or controller. Example processors may include a commercially available processor such as an Intel Xeon, Itanium, Core, Celeron, or Pentium processor, an AMD Opteron processor, an Apple A4 or A5 processor; a Sun UltraSPARC processor, an IBM Power5+ processor; an IBM mainframe chip; or a quantum computer. The processor 5410 is connected to other system components, including one or more memory devices 5412, by the interconnection element 5414.

The memory 5412 stores programs (e.g., sequences of instructions coded to be executable by the processor 5410) and data during operation of the computer system 5402. Thus, the memory 5412 may be a relatively high performance, volatile, random access memory such as a dynamic random access memory ("DRAM") or static memory ("SRAM"). However, the memory 5412 may include any device for storing data, such as a disk drive or other nonvolatile storage device. Various examples may organize the memory 5412 into particularized and, in some cases, unique structures to perform the functions disclosed herein. These data structures may be sized and organized to store values for particular data and types of data.

Components of the computer system 5402 are coupled by an interconnection element such as the interconnection element 5414. The interconnection element 5414 may include any communication coupling between system components such as one or more physical busses in conformance with specialized or standard computing bus technologies such as IDE, SCSI, PCI and InfiniBand. The interconnection element 5414 enables communications, including instructions and data, to be exchanged between system components of the computer system 5402.

The computer system 5402 also includes one or more interface devices 5416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 5402 to exchange information and to communicate with external entities, such as users and other systems.

The data storage element 5418 includes a computer readable and writeable nonvolatile, or non-transitory, data storage medium in which instructions are stored that define a program or other object that is executed by the processor 5410. The data storage element 5418 also may include information that is recorded, on or in, the medium, and that is processed by the processor 5410 during execution of the program. More specifically, the information may be stored in one or more data structures specifically configured to conserve storage space or increase data exchange performance. The instructions may be persistently stored as encoded signals, and the instructions may cause the processor 5410 to perform any of the functions described herein. The medium may, for example, be optical disk, magnetic disk or flash memory, among others. In operation, the processor 5410 or some other controller causes data to be read from the nonvolatile recording medium into another memory, such as the memory 5412, that allows for faster access to the information by the processor 5410 than does the storage medium included in the data storage element 5418. The memory may be located in the data storage element 5418 or in the memory 5412, however, the processor 5410 manipulates the data within the memory, and then copies the data to the storage medium associated with the data storage element 5418 after processing is completed. A variety of components may manage data movement between the storage medium and other memory elements and examples are not limited to particular data management components. Further, examples are not limited to a particular memory system or data storage system.

Although the computer system 5402 is shown by way of example as one type of computer system upon which various aspects and functions may be practiced, aspects and functions are not limited to being implemented on the computer system 5402 as shown in FIG. 54. Various aspects and functions may be practiced on one or more computers having a different architectures or components than that shown in FIG. 54. For instance, the computer system 5402 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 5402 may be a computer system including an operating system that manages at least a portion of the hardware elements included in the computer system 5402. In some examples, a processor or controller, such as the processor 5410, executes an operating system. Examples of a particular operating system that may be executed include a Windows-based operating system, such as, Windows NT, Windows 2000 (Windows ME), Windows XP, Windows Vista or Windows 7, 8, or 10 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 5410 and operating system together define a computer platform for which application programs in high-level programming languages are written. These component applications may be executable, intermediate, byte-code or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C # (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover one selection from A, B, C (e.g., A), two selections from A, B, C (e.g., A and B), three selections (e.g., A, B, C), and multiples of each selection.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for high volume data visualization, the system comprising:
    at least one processor operatively connected to a memory, the at least one processor adapted to execute a plurality of system layers, wherein the system layers include:
    a data analytics layer adapted to organize recursive placement data hierarchies such that the recursive hierarchies define sub-sets of hierarchical placement data, the recursive placement data hierarchies to be displayed in a user interface;
    a placement build layer adapted to receive a definition of a plurality of build parameters of a new placement, the plurality of build parameters including a creative parameter, an audience parameter, and a context parameter, the build parameters defined according to activation of build tools provided in one or more build panels to be displayed in the user interface with the recursive placement data hierarchies;
a campaign configuration layer adapted to define a rules-based campaign configuration; and
a visualization layer adapted to:
dynamically generate a visual display of the recursive placement data hierarchies organized by the data analytics layer in the user interface;
generate a display of a menu in the user interface, the menu including one or more selectable options, each selectable option of the one or more selectable options corresponding to a build panel for at least one build parameter of the plurality of build parameters;
in response to receiving a user selection of a selectable option in the menu, introduce a display of the build panel into the user interface, the display of the build panel integrated with the visual display of the recursive placement data hierarchies, the generating including:
automatically persist and resize at least a portion of the display of the recursive placement data hierarchies to create a space in the user interface for the display of the build panel; and
generate the display of the build panel in the created space, the display of the build panel including one or more selectable build tools corresponding to the selectable option and adapted to define one or more of the plurality of build parameters for the new placement.

2. The system of claim 1, wherein the recursive placement data hierarchies are organized into further categorization hierarchies, and the user interface is configured to display the categorization hierarchies and rows in a dynamic table that contain the recursive hierarchies.

3. The system of claim 2, wherein the user interface is further configured to accept user specification of the categorization hierarchies to filter display of placements.

4. The system of claim 2, wherein the user interface is further configured to render the categorization hierarchies by indenting each hierarchical layer organized within another hierarchical layer.

5. The system of claim 4, wherein the user interface is further configured to render a first one of the sub-sets of hierarchical placement data, wherein the first sub-set is organized and displayed as rows associated with individual placements having associated performance information displayed as columns in the rows.

6. The system of claim 5, wherein the visualization layer is adapted to manage display of the sub-sets of the hierarchical placement data such that a currently visualized sub-set can be communicated and displayed on a browser within a display threshold.

7. The system of claim 5, wherein the visualization layer is adapted to manage transitions between the sub-sets of the hierarchical placement data.

8. The system of claim 7, wherein the visualization layer is adapted to manage the transitions between the sub-sets of the hierarchical placement data sequentially, responsive to scrolling actions in the user interface.

9. The system of claim 1, wherein the system layers include a data management layer interconnected with the data analytics layer, the data management layer being adapted to manage placement data metrics corresponding to the recursive placement data hierarchies.

10. The system of claim 9, wherein the system layers include a cross-channel generics layer interconnected with the placement build layer and the data analytics layer, the cross-channel generics layer adapted to import placement data from data analytics layer to define at least one of the creative parameter, audience parameter, and context parameter for the new placement.

11. The system of claim 10, wherein the system layers include a placement representation layer interconnected with at least the cross-channel generics layer, the placement representation layer adapted to assemble the new placement based on the defined placement parameters, wherein each placement parameter includes generic field data.

12. The system of claim 11, wherein the system layers include a channel translation layer, the channel translation layer adapted to translate the generic field data to a format of a channel destination.

13. The system of claim 12, where the system layers include a predictive, analytics, and optimization layer interposed between the placement representation layer and the campaign configuration layer, the predictive, analytics, and optimization layer adapted to provide one or more placement parameter suggestions.

14. A system for generating and displaying a graphical user interface for high volume data, the system comprising:
at least one processor operatively connected to a memory, the at least one processor when executing, adapted to:
analyze and group placement data into a placement demographic hierarchy;
determine summary information for the placement data in each level of the placement demographic hierarchy; and
generate a navigable user interface display including:
a visual display of the placement demographic hierarchy; and
one or more build panels including one or more selectable build tools corresponding to generation of at least a first new placement wherein generating the navigable user interface display comprises:
generate a display of a menu in the user interface display, the menu including one or more selectable options, each selectable option of the one or more selectable options corresponding to a build panel for at least one build parameter; and
in response to receiving a user selection of a selectable option in the menu, integrating the build panel into the navigable user interface display, the integrating including:
automatically resize the visual display of the placement demographic hierarchy to create space for the build panel; and
generate the build panel in at least a portion of the space created by resizing the visual display of the placement demographic hierarchy, the build panel including at least one selectable build tool corresponding to the selectable option.

15. The system of claim 14, wherein the placement data includes placement metrics.

16. The system of claim 15, wherein the build panel is viewable coextensive with the visual display of the placement demographic hierarchy along a perimeter of the visual display of the placement demographic hierarchy.

17. A system for generating and displaying a graphical user interface for high volume data, the system comprising:
at least one processor operatively connected to a memory, the at least one processor when executing, adapted to:
analyze and group placement data into a placement demographic hierarchy;

determine summary information for the placement data in each level of the placement demographic hierarchy; and generate a navigable user interface display including:
  a visual display of the placement demographic hierarchy; and
  one or more build panels including one or more selectable build tools corresponding to generation of at least a first new placement;

wherein the at least one processor is configured to:
  generate a display of a menu in the user interface display, the menu including one or more selectable options, each selectable option of the one or more selectable options corresponding to a build panel for at least one build parameter; and
  in response to receiving a user selection of a selectable option in the menu:
    generate a visualization of the build panel in the navigable user interface display, the generating including:
      displaying a transition whereby the build panel is dynamically introduced into the navigable user interface display, and
      automatically resize the visual display of the placement demographic hierarchy in the navigable user interface display to incorporate the visualization of the build panel, the build panel including at least one selectable build tool corresponding to the selectable option.

18. The system of claim 17, wherein the at least one processor is adapted to:
  automatically generate an editing panel including one or more selectable edit tools, wherein the edit tools capture and provide prefilled data fields corresponding to the at least a first new placement or data structure visually selected in a main body of the navigable user interface display; and
  automatically generate and visualize the build panel responsive to activation of a build indicator associated with the editing panel, wherein the main body of the navigable user interface display resizes responsive to the visualization of the build panel.

19. The system of claim 18, wherein the at least one processor is adapted to:
  render the editing panel as an element of the build panel; and
  enable navigation between the build panel elements and the editing panel responsive to selection of respective tabs displayed in the build panel.

20. The system of claim 17, wherein the at least one processor is adapted to display the placement data corresponding to the at least a first new placement in a selectable pivot table display.

* * * * *